US007210938B2

(12) United States Patent
Packard et al.

(10) Patent No.: US 7,210,938 B2
(45) Date of Patent: May 1, 2007

(54) SYSTEM AND METHOD OF VIRTUAL SCHOOLING

(75) Inventors: Ronald Packard, McLean, VA (US); Bror Valdemar Haug Saxberg, Beverly Hills, CA (US)

(73) Assignee: K12.Com, Herndon, VA (US)

( * ) Notice: Subject to any disclaimer, the term of this patent is extended or adjusted under 35 U.S.C. 154(b) by 992 days.

(21) Appl. No.: 09/851,421

(22) Filed: May 9, 2001

(65) Prior Publication Data

US 2002/0169822 A1 Nov. 14, 2002

(51) Int. Cl.
*G09B 23/00* (2006.01)

(52) U.S. Cl. ........................ 434/365; 706/927; 706/926

(58) Field of Classification Search ................ 709/217, 709/201, 203; 434/350, 365, 323; 717/176; 705/36 R; 706/927, 926
See application file for complete search history.

(56) References Cited

U.S. PATENT DOCUMENTS

| | | | | |
|---|---|---|---|---|
| 5,310,349 | A | 5/1994 | Daniels et al. | |
| 5,727,950 | A | 3/1998 | Cook et al. | |
| 5,774,660 | A * | 6/1998 | Brendel et al. | 709/201 |
| 5,788,508 | A | 8/1998 | Lee et al. | |
| 5,907,831 | A | 5/1999 | Lotvin et al. | |
| 5,974,446 | A | 10/1999 | Sonnenreich et al. | |
| 6,002,915 | A * | 12/1999 | Shimizu | 434/350 |
| 6,023,684 | A * | 2/2000 | Pearson | 705/36 R |
| 6,039,575 | A * | 3/2000 | L'Allier et al. | 434/323 |
| 6,149,441 | A * | 11/2000 | Pellegrino et al. | 434/350 |
| 6,347,333 | B2 * | 2/2002 | Eisendrath et al. | 709/217 |
| 2001/0044728 | A1 * | 11/2001 | Freeman et al. | 705/1 |
| 2002/0194584 | A1 * | 12/2002 | Suorsa et al. | 717/176 |

* cited by examiner

*Primary Examiner*—Le Hien Luu
(74) *Attorney, Agent, or Firm*—Venable LLP; Caroline J. Swindell

(57) ABSTRACT

A system and methods of virtual schooling, which provide an Internet-based elementary and secondary school that is committed to offering a complete and comprehensive education to all pupils. The curriculum used in the system and methods is Web-deployed and database-driven. Its subjects include, but are not necessarily limited to History/Civics/Geography, Language Arts, Math, Music, Science, and Visual Arts. Preferably, lessons should integrate on-line and off-line instructional materials for a well-rounded learning experience.

23 Claims, 26 Drawing Sheets

| Subjects | Art | History | Lang. Arts | Math | Music | Phonics | Science |
|---|---|---|---|---|---|---|---|
| # Lessons that can be skipped | 1 | 1 | 1 | 1 | 1 | 1 | 1 |
| # Lessons that have been skipped | 0 | 0 | 0 | 0 | 0 | 0 | 0 |
| % Needed for Lesson Mastery | 80% | 80% | 80% | 80% | 80% | 80% | 80% |
| Current mastery % | 90% | 90% | 90% | 90% | 90% | 90% | 90% |

SYSTEM AND METHOD OF VIRTUAL SCHOOLING

BACKGROUND OF THE INVENTION

1. Field of the Invention

The present invention relates generally to distance learning, and more particularly to a system and methods of virtual schooling via the Internet.

2. Statement of the Prior Art

Various systems and methods of distance learning are known in the art. However, none of those systems or methods provides a complete and comprehensive curriculum for home-schooled pupils where the caring adult is not a licensed teacher. They also do not provide the ability to have a personalized approach to on-line education.

SUMMARY OF THE INVENTION

The system and methods of the present invention, however, provide an Internet-based elementary and secondary school, which is committed to offering a complete and comprehensive education to all pupils—no matter where they live, what kind of school they attend, or their financial status. It provides a unique and unprecedented instruction and assessment program comparable to that of the best public and private schools. It fuses time-tested methods of learning and traditional academic content with powerful technology to deliver a world-class personalized educational experience.

The curriculum used in the system and methods of the present invention is Web-deployed and database-driven. Its subjects include History/Civics/Geography, Language Arts, Math, Music, Science, and Visual Arts. Preferably, lessons should integrate on-line and off-line instructional materials for a well-rounded learning experience.

The system and methods of the present invention will appeal to any caring adult who seeks a complete and comprehensive education for a child. Its major target audiences are: (a) virtual charter schools; (b) home schoolers; (c) caring adults who want to supplement their child's education; (d) urban centers that link children, computers, and caring adults; (e) people in the military; (f) expatriates and foreign nationals; (g) public schools; (h) corporate adult media; and (i) summer school. The adults teaching in these environments are generally well intended but inexperienced. Most instructors will concurrently teach from 1 to 6 pupils at varying academic levels. The learning environment will vary (e.g., it may be someone's home, a church basement, or a more traditional school environment). When developing lessons for use with the system and methods of the present invention it is important to balance instructor-led and independent work activities to facilitate a successful balance of teaching activities for multi-grade/multi-pupil situations.

Certain assumptions should be made in using the system and methods of the present invention. With respect to the users of such system and methods, a first assumption is that the caring adults can read at *USA Today* level. The adults should be comfortable with basic addition, subtraction, and multiplication facts and skills. Moreover, they should have enough familiarity with a personal computer to be able to log on and run a browser sufficiently well to perform basic tasks (e.g., purchase a book from Amazon, send and receive e-mail, and print from the computer). There is no presumption that the caring adults (or helpers) have any teaching experience or skills. In other words, the system and methods of the present invention themselves will provide the information, techniques, and support needed to deliver a world-class education without such teaching experience or skills.

It is also assumed that the caring adult for younger pupils (e.g., kindergarten through the second grade) will want to be present and involved for most interaction with the personal computer (e.g., to read material, to ask questions about what's going on, to get the child to repeat sounds or copy drawings or patterns, and to signal to the system when the child is ready to move to the next item). Key areas of the curriculum will be reinforced with interactive work for the child, but these will not detract from the child becoming proficient with paper and pencil.

Other objects, advantages, and novel features according to the present invention will become more apparent from the following detailed description of a preferred embodiment, when considered in conjunction with the accompanying drawings wherein:

BRIEF DESCRIPTION OF THE DRAWINGS

FIG. 10(*b*) is another browser window for taking attendance in accordance with an alternative embodiment of the present invention;

DETAILED DESCRIPTION OF A PREFERRED EMBODIMENT

Figure 1:
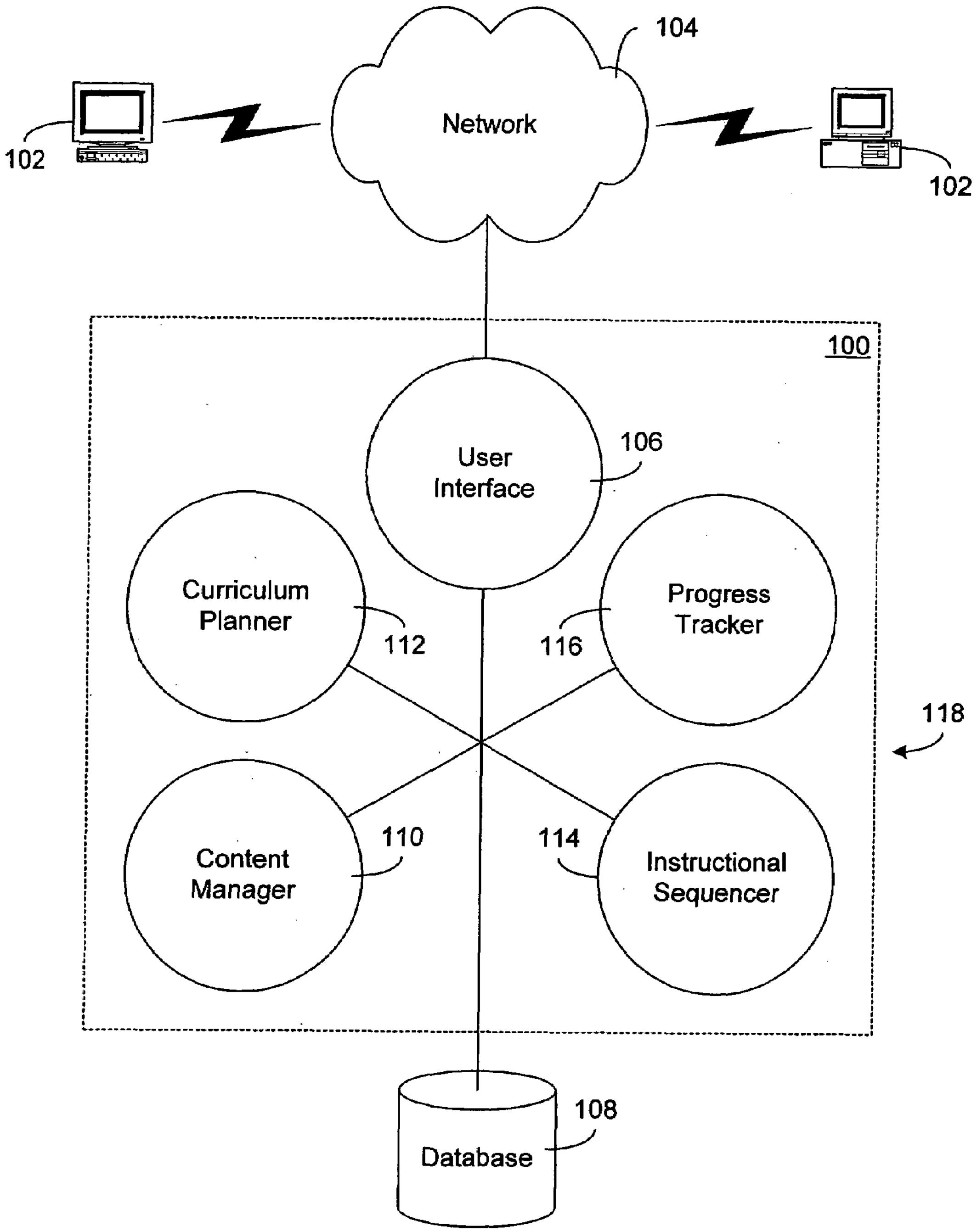
FIG. 1 is a block diagram of a virtual school system according to the present invention.

Referring now to the drawings, wherein like reference numerals and characters represent like or corresponding parts and steps throughout each of the many views, there is shown in FIG. 1 a schematic diagram of a system 100 that provides virtual schooling in accordance with the present invention.

System 100 is adapted to be accessed by pupils and/or their caring adults using a plurality of clients 102. Such clients 102, in turn, suitably comprise one or more conventional personal computers and workstations, operating either as a "fat" client or a "thin" client. It should be understood, nevertheless, that other clients 102, such as Web-enabled hand-held devices (e.g., the Palm V™ organizer manufactured by Palm, Inc., Santa Clara, Calif. U.S.A., Windows CE devices, and "smart" phones), which use the wireless access protocol, and Internet appliances fall within the spirit and scope of the present invention.

Clients 102 of the above types suitably access system 100 by way of a network 104. By use of the term "network", it should be understood that the foregoing is not intended to limit the present invention to any particular wireline or wireless network, such as local area networks (LANs), metropolitan area networks (MANs), or wide area networks (WANs). Network 104 preferably comprises the Internet (also known as the "World Wide Web"), but it may similarly comprise intranets, extranets, and virtual private networks (VPNs) and the like. In accordance with a presently preferred embodiment of the invention, system 100 is suitably comprised of a user interface 106, a database 108, a content manager 110, a curriculum planner 112, an instructional sequencer 114, and a progress tracker 116. Collectively, user interface 106, content manager 110, curriculum planner 112, instructional sequencer 114, and progress tracker 116 comprise a virtual schooling application 118.

Figure 2:
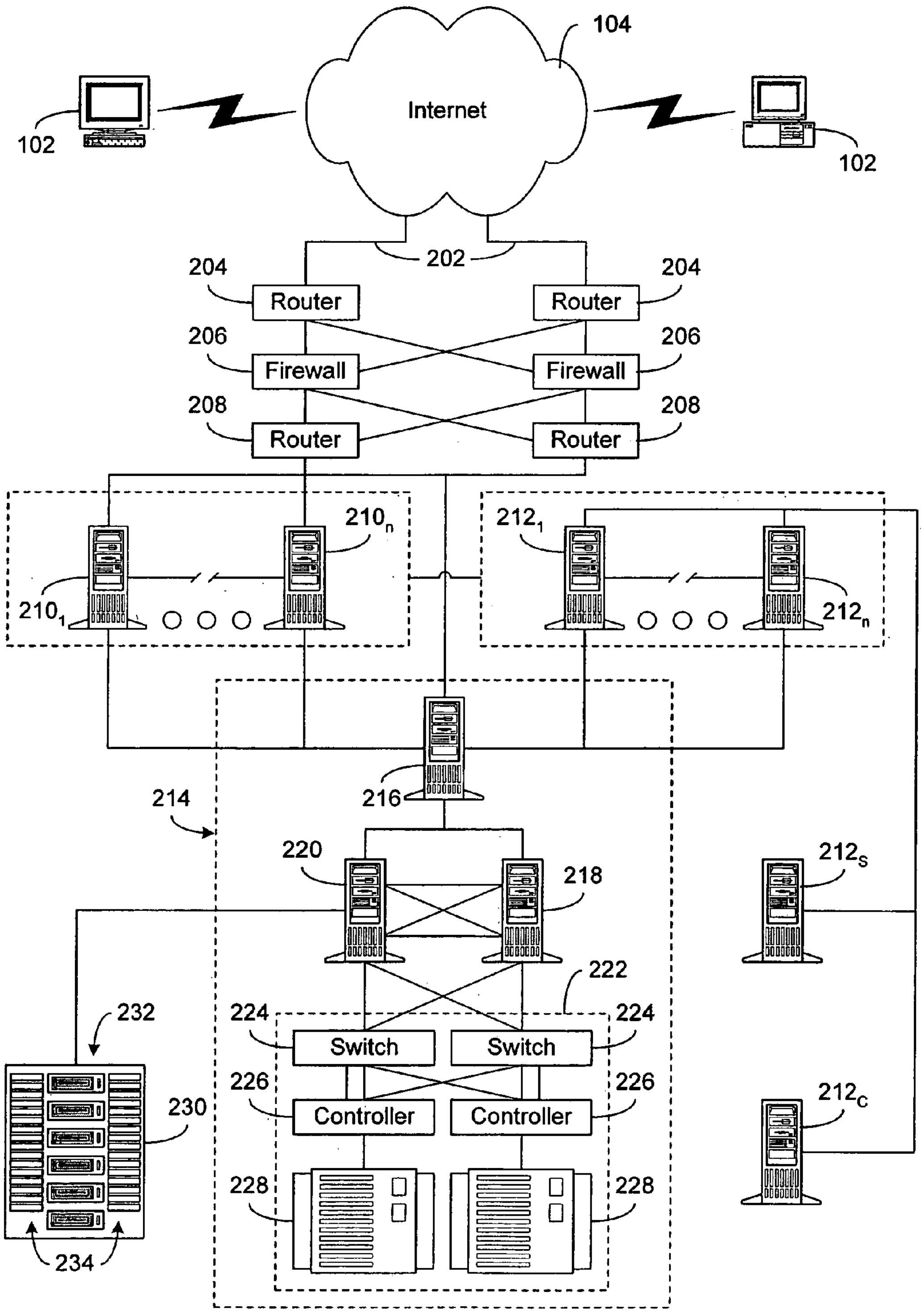
FIG. 2 is a block diagram illustrating the architecture of the virtual school system shown in FIG. 1.

As shown in FIG. 2, the architecture of system 100 further comprises a pair of Internet access lines 202 (e.g., primary and shadow conventional T3 lines), which are cross-connected from the backbone of Internet 104 to one or more, and preferably, a pair of redundant routers 204, 208. Incoming traffic from the first of such routers 204 is then suitably directed through a firewall 206 to the second of such routers 208. Even more preferably, and for the sake of redundancy, two firewalls 206 are cross-connected as shown in FIG. 2. A presently preferred router 204 is the SmartSwitch Router 8000, which is manufactured by the Enterasys Networks division of Cabletron Systems, Andover, Mass. U.S.A. Moreover, a presently preferred firewall 206 is an IP network application platform (e.g., the IP650, IP440, or IP330 firewall platforms, which are manufactured by Nokia Group, Espoo, Finland).

A plurality of web servers $\mathbf{210}_1$, $\mathbf{210}_2$, . . . $\mathbf{210}_n$ is, thus, conveniently load balanced by use of the foregoing configuration. That is, the load of incoming traffic from the Internet 104, through the routers 204, 208 and firewalls 206, is balanced among each of the web servers $\mathbf{210}_1$, $\mathbf{210}_2$, . . . $\mathbf{210}_n$, such that: (1) certain incoming traffic is routed to a particular web server $\mathbf{210}_1$, $\mathbf{210}_2$, . . . $\mathbf{210}_n$, where that particular web server $\mathbf{210}_1$, $\mathbf{210}_2$, . . . $\mathbf{210}_n$ had been recently used by a given user whose information had been cached on that particular web server $\mathbf{210}_1$, $\mathbf{210}_2$, . . . $\mathbf{210}_n$ and, as a result, it would be more efficient to continue to use that particular web server $\mathbf{210}_1$, $\mathbf{210}_2$, . . . $\mathbf{210}_n$; or (2) no single one of the web servers $\mathbf{210}_1$, $\mathbf{210}_2$, . . . $\mathbf{210}_n$ would become overburdened.

In a particularly preferred embodiment of the present invention, there are three such web servers. Each of the web servers $\mathbf{210}_1$, $\mathbf{210}_2$, . . . $\mathbf{210}_n$ is, in turn, preferably comprised of a Dell™ PowerEdge™ 2450 server (manufactured by Dell Computer Corporation, Austin, Tex. U.S.A.), with a 733 MHz Pentium III processor, 256 MB RAM, and dual, mirrored 9.1 GB fixed disk drives. Moreover, each of the web servers $\mathbf{210}_1$, $\mathbf{210}_2$, . . . $\mathbf{210}_n$ preferably further comprises a Microsoft® Windows® NT operating system, and Netscape Enterprise Server, Release 3.6.3 (developed by Netscape Communications, a subsidiary of America Online, Inc., Dulles, Va. U.S.A.). Optionally, Netscape's Certificate Server may also be installed on each of the web servers $\mathbf{210}_1$, $\mathbf{210}_2$, . . . $\mathbf{210}_n$ to facilitate core digital certificate-issuance and management services, as well as distribution of certificates and certificate-revocation lists to clients and other servers. Other forms of certificate servers (e.g., web certificate servers and wireless certificate servers, which are available from VeriSign, Inc., Mountain View, Calif. U.S.A.) may likewise be deployed on each of the web servers $210_1$, $210_2$, . . . $210_n$.

System 100 further comprises a plurality of application servers $212_1$, $212_2$, . . . $212_n$, coupled to the web servers $210_1$, $210_2$, . . . $210_n$. In the preferred embodiment of the present invention, there are six such application servers. Each of the application servers $212_1$, $212_2$, . . . $212_n$ is, like the web servers $210_1$, $210_2$, . . . $210_n$, preferably comprised of a Dell PowerEdge 2450 server, with a 733 MHz Pentium III processor, 256 MB RAM, and dual, mirrored 9.1 GB fixed disk drives. Moreover, each of the application servers $212_1$, $212_2$, . . . $212_n$ preferably further comprises a Microsoft Windows NT operating system, and the Total-e-Business™ platform (developed by Bluestone Software, Inc., Philadelphia, Pa. U.S.A., and including the Total-e-Business Server [formerly known as "Sapphire/Web"]). Bluestone's Universal Business™ Server, Release 7.0, for example, may be used to manage the virtual school system and methods of the present invention, while running on each of the application servers $212_1$, $212_2$, . . . $212_n$. At the same time, Bluestone's Load Balance Broker (LBB) may be loaded on each of the web servers $210_1$, $210_2$, . . . $210_n$, to facilitate balancing of the load of communications between each of the web servers $210_1$, $210_2$, . . . $210_n$ and each of the application servers $212_1$, $212_2$, . . . $212_n$.

For example, when a request within the virtual schooling application 118 is intended for one of the application servers $212_1$, $212_2$, . . . $212_n$, it can go to one of potentially many instances of the application, which may reside on different machines. The task of ensuring that simultaneous requests are distributed evenly across multiple instances, in order to ensure efficient processing, falls to the LBB.

Before one of ordinary skill can understand how the LBB performs its load balancing, one must first understand its internal storage mechanism (i.e., how information about applications and their instances is stored therein. In essence, the following four fields are used to store information about all the instances in a specific application: (1) Host: the hostname of the instance, as contained in $SAPPHIRE/config/apserver.txt; (2) Port: the port allocated to this instance, also as contained in $SAPPHIRE/config/apserver.txt; (3) Usage: the number of requests currently being processed by this instance; and (4) Failed: whether or not communication to the host in general or the instance in specific has met with failure. At this juncture, somewhat more detailed descriptions of the Usage and Failed fields may be merited here.

Usage is the number of requests that are currently being handled by this instance. It is the primary factor used to ensure that the load is balanced evenly. Initially, a count of zero (0) is assigned to the Usage field for all instances, because the maximum number of possible requests an instance may process at any given time is limited only by system resources. The usage count is incremented every time a request is passed off to the corresponding instance and is decreased once the request has been processed.

Failed is a flag which, if true (or on), means that communication to the application server instance failed on the last attempt. Initially, the status of this field is set to false (i.e., off) for all instances, because it is turned on only if the following sequence of events unfolds: (1) the LBB attempts to contact the instance and fails; (2) the LBB contacts a Dynamic Application Launcher (DAL) on the instance's machine to have the instance started; and (3) the LBB attempts to contact the instance and fails again. Once an instance has been marked as failed, it gets moved to the bottom of the list of instances to ensure that time is not wasted attempting to contact it any time soon. Also, the hostname of the instance gets added to a separately maintained list of failed hosts. Failed instances are ignored during the LBB's instance selection phase.

There are two ways a failed instance can be returned to "active duty" (i.e., its failed status is reset, allowing the instance to be reconsidered for future requests. Each failed instance has a timer that is started when the instance is marked as failed. After a certain amount of time has elapsed, the instance's failed flag is reset. This allows for situations where the communication problem might be temporary in nature. Once an instance is contacted, its hostname is removed from the list of failed hosts and any other failed instances going to the same hostname are also reset. At this point, the assumption is that communication problems tend to be network or server-related (i.e., the entire host machine tends to be down, not just a specific port thereon.

There are two versions of a load balancing algorithm that may be used by the LBB, one for use without session affinity and one with. In the former case (i.e., without session affinity), when a request is received, the entire list of instances is sequentially searched, starting from the first instance in the list and ignoring any failed instances. The entire list of valid instances, then, is searched for the instance with the lowest usage count. If multiple instances have the same low value, the first one found is used. The only time the search ends prematurely is if an instance with a usage count of zero (0) is found. This is because it is not possible to improve upon this usage count and, thus, this instance is used automatically. At this point in time, the usage count of the instance that is used is incremented.

In the latter case (i.e., with session affinity), the usage count of an instance goes up by one (1) every time it is used to process a request. However, when the request is done, the usage count goes back down by one (1). In high load situations where multiple requests are submitted with little time in between, multiple instances of the application automatically handle these requests. However, in situations where the requests are somewhat further apart, the usage count of an instance might have time to go back down by the time the next request comes in, allowing a very small number of application server instances to process all the requests. This works well in cases where there is no session affinity. However, because of the characteristic of session affinity always ensuring the same instance of the application to a particular browser session, it would not be prudent to have a small number of application server instances handling multiple requests simply because they are not in quick succession. Toward this end, the LBB has an index pointer into the list of instances in case of session affinity.

When a request comes in and a session cookie is attached (i.e., it is not a first time user), it gets the very same instance which processed the request the last time. There is no load balancing to be performed here. If, however, the request is from a new session, the load balancing algorithm is much the same as without session affinity with a slight modification. The search for the least used application server instance starts with the instance pointed to by the index pointer instead of at the top of the list. Once an instance is used, the index pointer is incremented to point to the next instance in the list, with wrap-around capability, to ensure that the same instance is not bombarded with multiple requests. If a request with a session cookie points to an instance which has failed (or fails at this time) after three (3) retries, the request is treated as if it were a new request and a new session cookie is assigned after load balancing is performed.

There is one primary difference between using session affinity and not doing so as far as load balancing is concerned. Without session affinity, load balancing occurs at each request. The load balancing process with session affinity, however, only occurs at the very first request, since subsequent requests get routed automatically to the same instance every time. Therefore, one of ordinary skill in the art will appreciate the circumstances under which the virtual school system 100 of the present invention require load balancing with or without session affinity.

Referring again to FIG. 2, it can be seen that beneath the layer of web servers $\mathbf{210}_1$, $\mathbf{210}_2$, . . . $\mathbf{210}_n$ and application servers $\mathbf{212}_1$, $\mathbf{212}_2$, . . . $\mathbf{212}_n$ is a storage area network (SAN) 214. SAN 214 generally comprises a cluster server 216 that is connected to receive incoming Internet traffic through each of the application servers $\mathbf{212}_1$, $\mathbf{212}_2$, . . . $\mathbf{212}_n$, and to transmit outgoing Internet traffic through the routers 204, 208 and firewall 206, from the SAN 214 by way of either a file server 218 or a database server 220. File server 218 and database server 220 each is preferably comprised of a Sun Enterprise™ 420R server (manufactured by Sun Microsystems, Inc., Palo Alto, Calif. U.S.A.). In the case of the former, file server 218 further comprises a pair of 450 MHz UltraSPARC-II processors with 2 GB ECC memory. Database server 220, on the other hand, further comprises four 450 MHz UltraSPARC-II processors with 4 GB ECC memory. Accordingly, both file server 218 and database server 220 preferably run in a Solaris™ operating environment. Database server 220 also preferably comprises Oracle 8i™, Release 2. System 100 may further comprise a state server $\mathbf{212}_S$ and a content management server $\mathbf{212}_C$.

In accordance with an especially preferred embodiment of the present invention, SAN 214 also comprises a fiber channel switched network or fabric. It is known, for example, that such networks provide a high-performance, any-to-any interconnect for server-to-server or server-to-storage traffic. Fiber channel switched networks also combine the characteristics of traditional networks (e.g., large address space, scalability) and I/O channels (e.g., high speed, low latency, hardware error detection) on a single infrastructure. Additionally, fiber channel switched networks facilitate multiple protocols for networking (e.g., IP), storage (e.g., SCSI) and messaging (e.g., VIA) over a single infrastructure. This infrastructure can, therefore, be easily used to create SAN 214, in which peripheral devices such as disk storage 228 and tape libraries 232 can be attached to the network and shared among attached nodes. Some of the more desirable features of this approach to organizing the servers and storage of the present invention will now be described herein below.

Fiber channel fabrics such as SAN 214 provide a switched 100Mbytes/second full duplex interconnect. In addition, block-level I/O is handled with substantially better efficiency when compared to networking traffic. A single SCSI command can transfer many megabytes of data with very little protocol overhead, including CPU interrupts. As a result, relatively inexpensive hosts and storage devices can achieve very good utilization and throughput on the network. SAN 214 also uses a 24-bit addressing scheme, thereby permitting 16 million devices to be addressed. In an especially preferred embodiment of the present invention, SAN 214 further comprises a pair of cross-connected SilkWorm™ fiber channel switches 224 (manufactured by Brocade Communications Systems, Inc. San Jose, Calif. U.S.A.).

Traditional storage interconnects are limited in the length of cable that can attach hosts and storage units. Fiber channel allows links up to 10 kilometers, which vastly increases the options for the server administrator. SAN 214 allows a number of servers to utilize sections of SAN-attached storage devices. This allows for cost efficiencies that come from purchasing storage in large units. In addition, this arrangement makes it possible to ensure consistent quality and support across the entire server population. Externalizing the storage from the server also makes it a first class asset in its own right. Servers can, thus, be upgraded while leaving storage in place. Storage can be added at will and dynamically allocated to servers without downtime. Because the SAN 214 is extensible, it allows incremental deployment of features such as fault tolerance and hot backup sites.

In a presently preferred embodiment, cluster server 216 comprises Veritas Cluster Server™ (developed by Veritas Software Corporation, Mountain View, Calif. U.S.A.). File server 218 and database server 220 are also redundantly configured. That is, in the event that either of the servers goes down during a session, the other can assume control of that session with the assistance of the cluster server 216. VERITAS Database Edition™ for Oracle®/HA may, alternatively, be used. As a result, the database service may be composed of one or more logical network addresses (e.g., IP), RDBMS software, an underlying file system, a logical volume manager and a set of physical disks being managed by the volume manager. If this service, typically called a service group, needs to be migrated to another node for recovery purposes, all of its resources must be migrated together to re-create the service on another node. A single large node may host any number of service groups, each providing a discrete service to networked clients who may or may not know that they physically reside on a single node.

Service groups can, thus, be managed to maintain service availability through an intelligent availability management tool. Given the ability to test a service group to ensure that it is providing the expected service to networked clients and an ability to automatically start and stop it, such a service group can be made highly available. If multiple service groups are running on a single node, then they must be monitored and managed independently. Independent management allows a service group to be automatically recovered or manually idled (e.g., for administrative or maintenance reasons) without necessarily impacting any of the other service groups running on a node.

At the most basic level, the fault management process includes monitoring a service group and, when a failure is detected, restarting that service group automatically. This could mean restarting it locally or moving it to another node and then restarting it, as determined by the type of failure incurred. In the case of local restart in response to a fault, the entire service group does not necessarily need to be restarted; perhaps just a single resource within that group may need to be restarted to restore the application service. An agent typically monitors application services, which is a small, application-specific fault management program. Given that service groups can be independently manipulated, a failed node's workload can be load balanced across remaining cluster nodes, and potentially failed over successive times (i.e., due to consecutive failures over time) without manual intervention.

Application servers $\mathbf{212}_1$, through $\mathbf{212}_n$, in concert with the web servers $\mathbf{210}_1$, $\mathbf{210}_2$, . . . $\mathbf{210}_n$, file server 218, database server 220, and the clients 102, provide a conventional three-tiered architecture. As with similar such three-tiered architectures, application servers $\mathbf{212}_1$ through $\mathbf{212}_n$ handle most of the application processing, such as business logic processing and database integrity processing. The clients 102 only handle interface processing, while the file server 218 and database server 220 only handle database processing. As seen in FIG. 2, the hardware comprising system 100 is substantially completed with the addition of high-availability storage 222 cross-connected to the file server 218 and database server 220. One suitable such high-availability storage 222 comprises the fiber channel switches 224, a pair of disk controllers 226, and a pair of disk arrays 228. Each of the disk controllers 226 preferably comprises a SCSI controller (e.g., a Symbios® SYM53C1010 Ultra160 SCSI controller, manufactured by LSI Logic Corporation, Milpitas, Calif. U.S.A.). In a presently preferred embodiment, the disk arrays 228 each comprise twenty 36GB LVD (i.e., low voltage differential) disk drives which are configured to be mirrored RAID 5. Suitable such LVD drives are, for example, the Ultrastar 36ZX hard disk drives manufactured by IBM Corporation, Armonk, N.Y. U.S.A.

System 100 further comprises a tape library 230, which includes a plurality of advanced intelligent tape drives 232 (preferably AIT2 tape drives) and a plurality storage positions 234 for the AIT2 tapes. In a presently preferred embodiment, the tape library 230 comprises a TLS-4000 automated tape library (manufactured by Qualstar Corporation, Canoga Park, Calif. U.S.A.), which can incorporate up to 12 AIT2 tape drives and has storage for at least 60 AIT2 tapes. Such tape library 230, furthermore preferably comprises suitable software (e.g., Veritas Netbackup™) to control reading and writing of data to the tape library 230.

In accordance with a presently preferred embodiment of the invention, system 100 will allow for the importation of data surrounding user accounts from the standard network security structure in place. Users of the system will be required to login in order to access the system. Preferably, such login will consist of a User Name and Password. After three unsuccessful login attempts, the system will lock out the user account attempting to login. An administrative level user will then be required to restore a locked out account. Moreover, an active session should timeout if no activity with the system is detected for 30 minutes. The system must log user activity and be capable of reporting user statistics.

Preferably, system 100 should support the use of the XML markup language. It should also support an extensive array of file types including graphic (e.g., JPEG, GIF, BMP, etc.), audio (e.g., WAV, MP3, etc.), video (e.g., QIC, Real, AVI, MPEG, etc.), and Mixed Media (e.g. SWF, etc.).

Various aspects relating to the use of system 100 and virtual schooling application 118 will now become more apparent from the following description of the browser windows in FIGS. 3–20. It should be readily apparent to those of ordinary skill in the art that system 100 may be accessed over the network 104 by any suitable means, such as by logging on with a user name and password. In a similar manner, it should also be readily apparent to those of ordinary skill in the art that such log on step may be preceded (e.g., in the case where system 100 is accessible over the Internet, intranets, extranets, or VPNs) by entry of a Uniform Resource Locator or URL (e.g., www.k12.com). Those steps being notoriously well known and in need of no further illustration, it should be understood that the following description of FIGS. 3–20 assumes such steps have been taken.

It should also be noted at this juncture that the functions of planning and tracking are almost inseparable. This is especially true in light of the fact that system 100 is adapted to insist that all pupils in its service can achieve mastery by spending enough time and effort on the content. Different caring adults will want to track and use progress of a pupil in different ways. Depending on what is going on at home, they may want to change how they measure progress, and how they plan for the future. Some caring adults may insist the calendar is most important, and will modify the instructional week to finish by a certain date; others are constrained by their weeks, but not so concerned about when a pupil finishes. Moreover, caring adults are just as likely to want to jump immediately to lessons after seeing their progress, or alter their calendar based on their progress. A more detailed description of virtual schooling application 118, and more particularly its content manager 110, curriculum planner 112, instructional sequencer 114, and progress tracker 116, is set forth below. For simplicity in understanding the operation of system 100, the detailed description of content manager 110 will follow immediately after the detailed descriptions of curriculum planner 112, instructional sequencer 114, and progress tracker 116.

Curriculum Planner

Pupils, especially virtual charter school pupils, will preferably follow a lesson sequence that is consistent with the school year and calendar defined by the virtual charter school. Deviations from the virtual charter school pacing must have administrative approval. Other pupils may adjust the lesson pacing and sequence at the caring adult's discretion. Skipping lessons requires administrative approval for virtual charter school pupils, while other pupils may skip lessons at the caring adult's discretion. However, there should be an established maximum number of lessons that can be skipped if the pupil is seeking a certificate.

The caring adults must be able to plan an academic calendar for progressing through a school year for each of their pupils. Additionally, the caring adults must be able to access an overview of the curriculum for all subjects for the entire year. The curriculum overview must outline the subjects taught and primary concepts being taught.

Virtual charter school pupils must follow the lesson sequence and schedule set forth by the virtual charter school as closely as possible. The caring adults of pupils in a virtual charter school must be able to access an overview of the yearly, monthly and weekly schedule recommended by system 100. Non-virtual charter school pupils will be provided with the same recommended lesson sequence and schedule as virtual charter school pupils, but they may change this schedule at the discretion of the caring adult.

The caring adult must be able to view and adjust a personal calendar that covers the entire school year. The following variables must be presented as recommendations on this calendar:

School year start date
School year end date
Holidays and non-teaching days
Teaching days per week
Lessons taught per week The caring adults must have the flexibility to modify these variables, and the system can provide optimized recommendations to meet the constraints set. The caring adults of virtual charter school pupils will have to receive administrative approval in order to make these changes.

The caring adults must have the ability to design a typical week. They must be able to specify what subjects they will teach on each day (e.g., 1 math, 1 science, 1 history on Monday, 2 Math, 1 language arts on Tuesday, etc.)

At any given time during the school year, the caring adults must have the ability to determine whether or not they can achieve their planned yearly schedule given their start date, end date, holidays and typical week. The caring adult must be able to modify their typical week and see what the impact would be on their ability to achieve their desired end date. The caring adult must be able to personalize their weekly schedule by changing the number of teaching hours in the day or teaching days in the week.

The user (whether caring adult or pupil) must be able to select and navigate to a particular lesson or assessment. The user must be able to view a list of all possible lesson choices and navigate to a specific lesson. Lessons should be viewable according to their status. Such status indicators comprise:

Not yet delivered
Delivered
Skipped
Marked for review
Assessment passed
Assessment failed The next recommended lesson for a given subject should be clearly indicated, although the user may select other lessons if they want to review, or skip lessons.

Lesson, unit, mid-course and placement assessments must be listed together in a central location so that the user can easily select and navigate to a specific assessment. The user must also be able to navigate to a lesson assessment from within a specific lesson. Assessment should be viewable according to their status. Such assessment status variables comprise:

Completed
Not-completed
Passed
Failed
Needs to be completed

The caring adult must have access to information that will help them prepare for delivering lessons ahead of time. For example, insofar as yearly planning is concerned, the caring adults must be able to:

See what supplies are needed for the year
Check off what they have on hand
Make a shopping list
Make a master purchasing list
Make an inventory sheet
Make an education budget
Go to specific lessons to see why, where and when material is needed.

The caring adults, for monthly planning purposes, also must be able to:

See what supplies are needed for the month
Make a monthly shopping/library list
Update their master purchasing list
Update their inventory
Check lesson to integrate upcoming events Insofar as weekly planning is concerned, the caring adults must be able to:

Preview lessons
Get teaching tips from system 100 or members of the community for specific subjects
Check related upcoming events and outside resources
Print lesson materials and worksheets ahead of time The caring adults, for daily planning purposes, also must be able to:

Preview lessons
Print lesson materials and worksheets ahead of time

Figure 3:
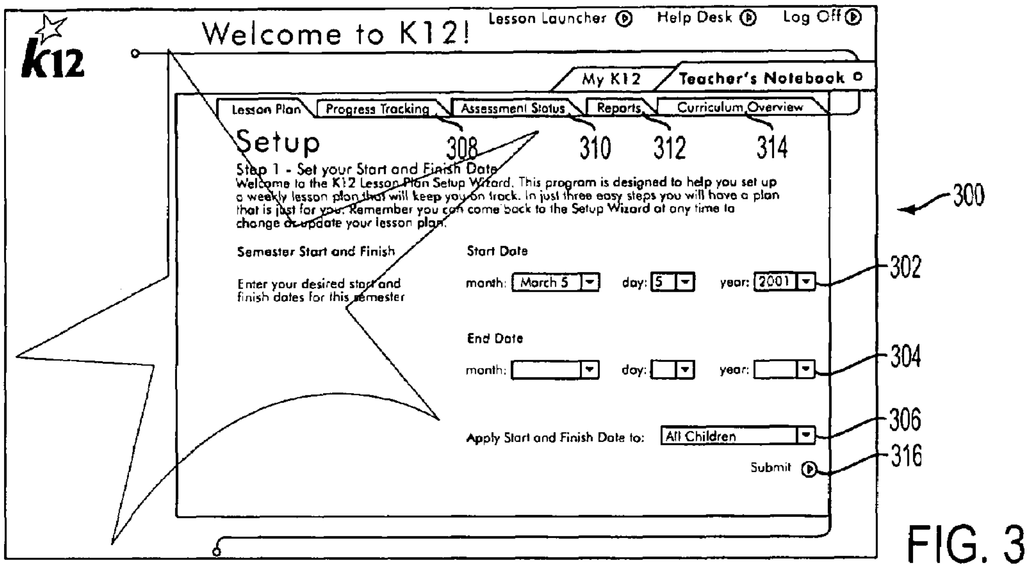
FIG. 3 is a first browser window illustrating use of the curriculum planner shown in FIG. 1.

The browser window 300 shown in FIG. 3 comprises a first browser window illustrating use of the curriculum planner 112 shown in FIG. 1. Conventionally, it comprises a document stored in the database 108, which is rendered by the user interface 106. A caring adult uses this browser window 300 to help set up a weekly lesson plan that will keep the caring adult on track. The caring adult merely selects a start date using the drop down lists 302, an end date using the drop down lists 304, and the pupil for whom this lesson plan will be associated from the drop down list 306. At any point in time, the caring adult may navigate to other portions of the application 118 by selecting an appropriate tab 308, 310, 312, or 314. Otherwise, if the caring adult has finished selecting the data from drop down lists 302, 304, and 306, the submit button 316 may be selected to navigate the caring adult to the second step in this planning process.

At that point, a second browser window 400 (FIG. 4) will appear. Browser window 400 comprises a means to select planned holidays and expected days off. To indicate such planned holidays and expected days off, the caring adult need only select those days with the calendar 402 and a mouse (not shown). The pupil for whom this lesson plan will be associated is also selected from the drop down list 404. If done, the submit button 406 may be selected to navigate the caring adult to the third step in this planning process. At any point in time, the caring adult may navigate to other portions of the application 118 by selecting an appropriate tab 408, 410, 412, or 414. Also, a back button 416 may be selected to return to the previous browser window 300.

Figure 4:
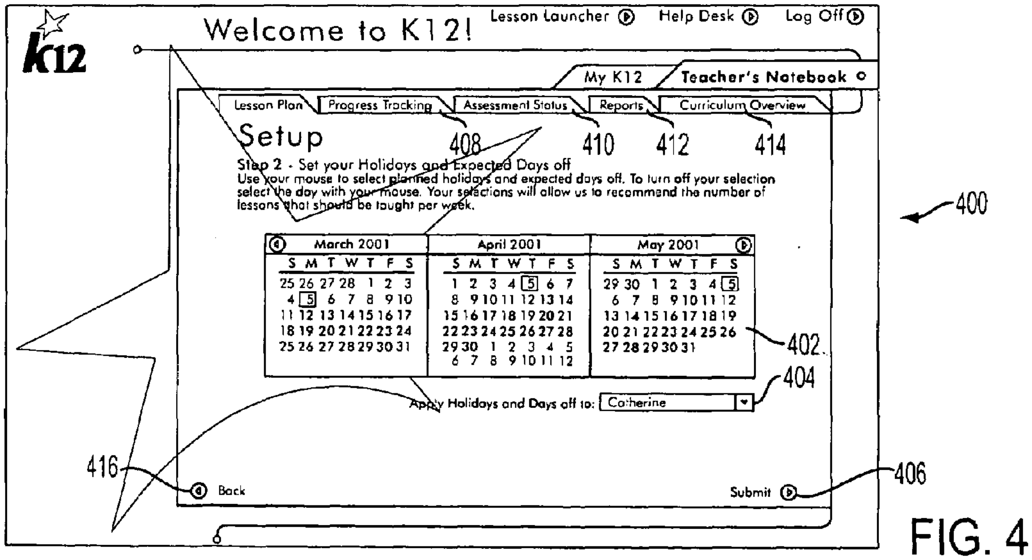
FIG. 4 is a second browser window illustrating use of the curriculum planner shown in FIG. 1.
Figure 5:
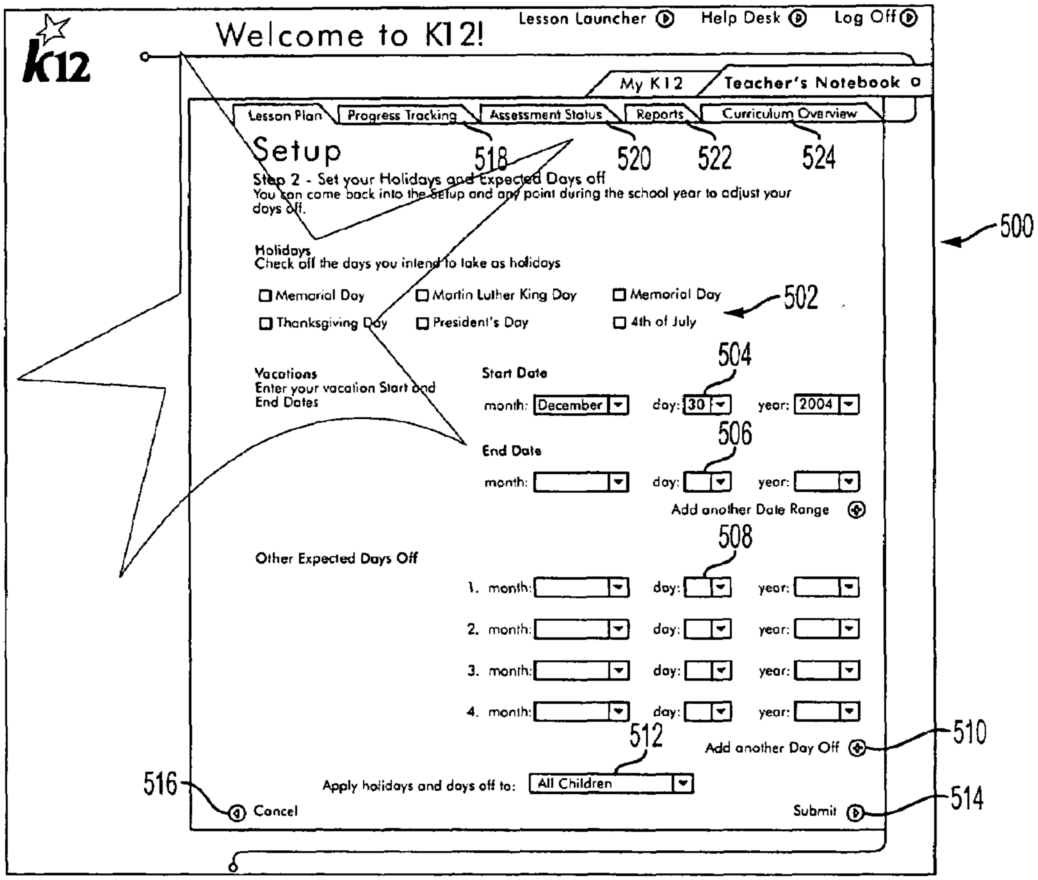
FIG. 5 is an alternative to the second browser window shown in FIG. 4.

An alternative to the second browser window 400 shown in FIG. 4 is shown in FIG. 5. In this case, browser window 500 comprises a plurality of check boxes 502 to check off the planned holidays, drop down lists 504, 506 for selecting a start date and an end date, a plurality of other drop down lists 508 for selecting other expected days off, means 510 for selecting additional expected days off in excess of the ones selected by drop down lists 508, and another drop down list 512 for selecting the pupil for whom this lesson plan will be associated. If done, the submit button 514 may be selected to navigate the caring adult to the third step in this planning process, or the process may be cancelled by selecting the cancel button 516. At any point in time, the caring adult may navigate to other portions of the application 118 by selecting an appropriate tab 518, 520, 522, or 524.

Figure 6:
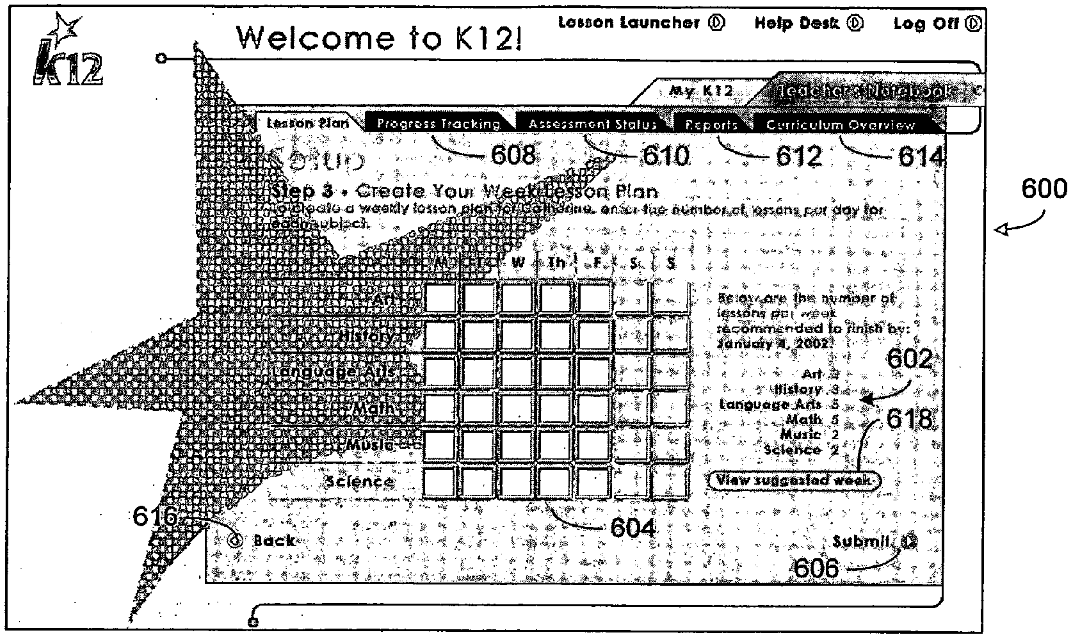
FIG. 6 is a third browser window illustrating use of the curriculum planner shown in FIG. 1.
Figure 7:
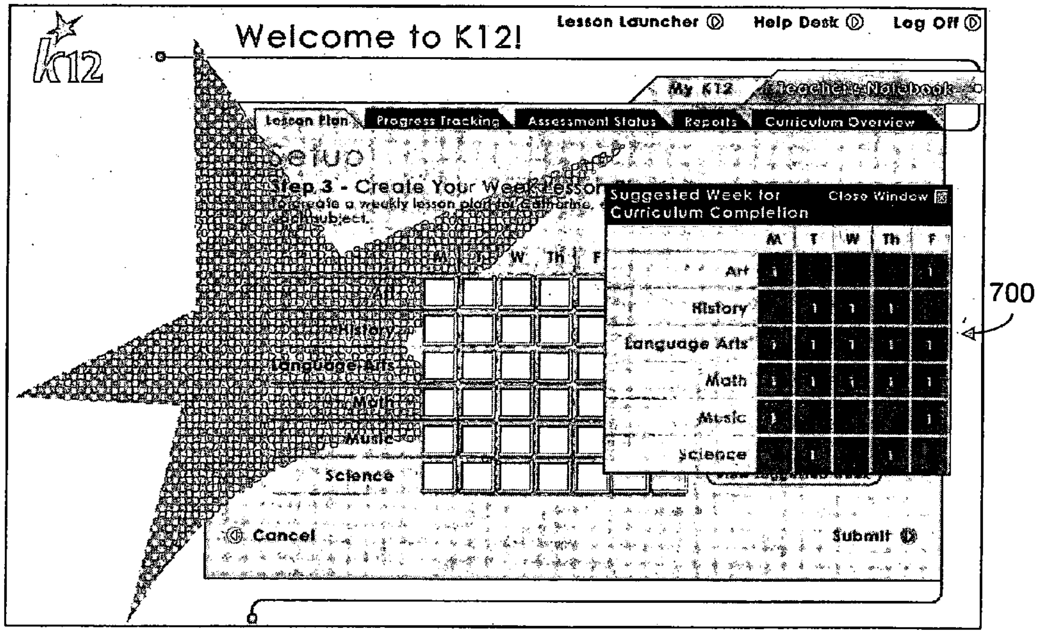
FIG. 7 is a fourth browser window illustrating use of the curriculum planner shown in FIG. 1.

FIG. 6 is a third browser window 600 illustrating use of the curriculum planner 112 shown in FIG. 1. Browser window 600 appears as a result of the caring adult's selecting either of the submit buttons 406, 514 shown in FIG. 4 or 5. It comprises a plurality of the suggested numbers of lessons per week 602 and means 604 for entering which of the suggested lessons will be taught in the coming week. If done, the submit button 606 may be selected to navigate the caring adult to the fourth and final step in this planning process. At any point in time, the caring adult may navigate to other portions of the application 118 by selecting an appropriate tab 608, 610, 612, or 614. Also, a back button 616 may be selected to return to the previous browser window 400 or 500. In the event that the caring adult would require assistance with this lesson plan, a "view suggested week" button 618 may be selected to display the pop-up window 700 shown in FIG. 7.

Figure 8:
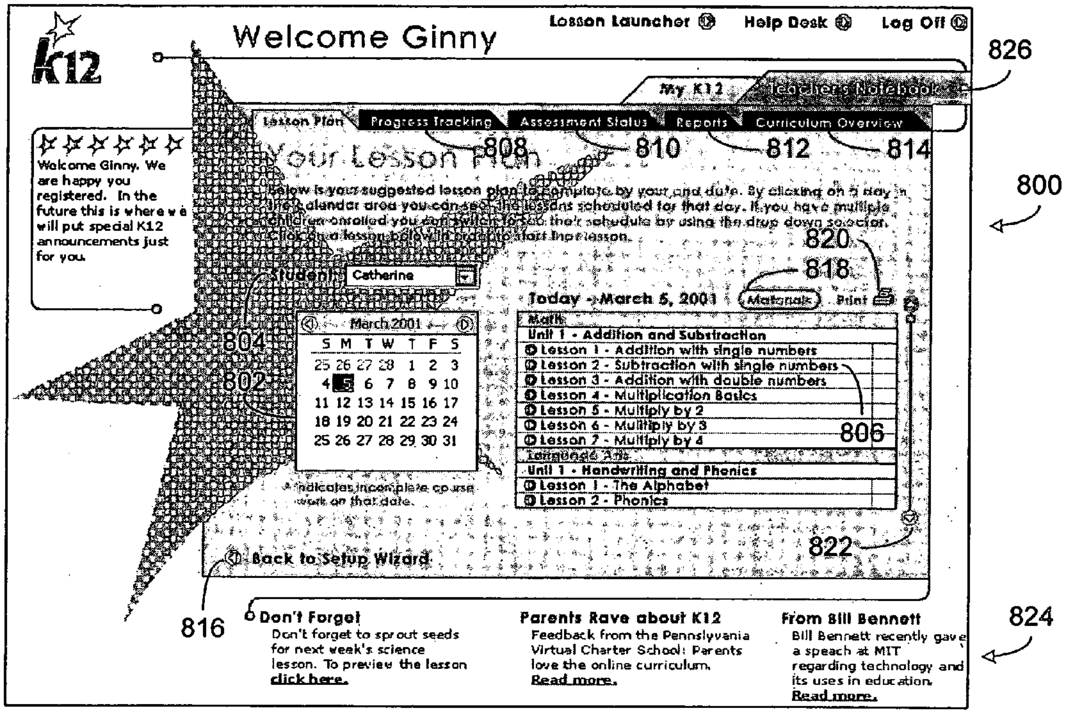
FIG. 8 is a fifth browser window illustrating use of the curriculum planner shown in FIG. 1.

Once the caring adult has selected the submit button 606 shown in FIG. 6, a fifth browser window 800 will appear as shown in FIG. 8. Browser window 800 sets forth a final lesson plan to complete by the end date selected. By clicking on a day in the calendar area 802, the caring adult can see the lesson scheduled for that day. If the caring adult has multiple children enrolled in the virtual school, the caring adult can switch to see their individual schedules by using the drop down selector 804. Clicking on a particular lesson (e.g., "Lesson 2—Subtraction with single numbers" 806) will be used to start that lesson. At any point in time, the caring adult may navigate to other portions of the application 118 by selecting an appropriate tab 808, 810, 812, or 814. Also, a back button 816 may be selected to return to the setup wizard browser window 300. Browser window 800 further comprises a "materials" button 818 to view a list of materials needed in the ensuing curriculum, a "print" icon 820 which may be used to print a hard copy of the lesson plan, a scroll bar 822 with which the caring adult may scroll down the list of lessons for further selection, and a plurality of announcements 824 which may be individually viewed.

Figure 9:
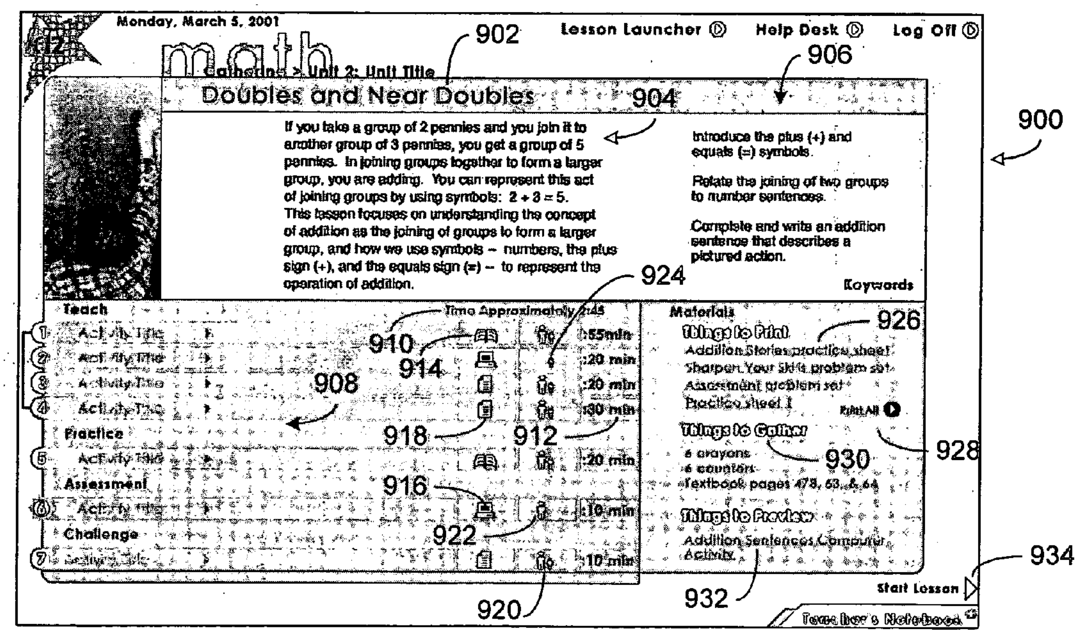
FIG. 9 is a sixth browser window illustrating use of the curriculum planner shown in FIG. 1, particularly with respect to an exemplary lesson.

If, for example, the caring adult selected "Lesson 2—Subtraction with single numbers" by clicking on the lesson 806 shown in FIG. 8, a sixth browser window 900 will appear as shown in FIG. 9. Browser window 900 constitutes the final step in use of curriculum planner 112. It generally comprises a unit title 902, a field 904 describing the focus of the unit, and a plurality of objectives 906 of the unit. It also comprises a plurality of activities 908, and an indication 910 of the total time to complete such activities 908. Each of the activities 908, in turn, comprises an indication 912 of the time expected to complete that activity, and a plurality of icons 914, 916, 918, 920, 922, and 924 indicating what type of activity is involved and who would be expected to participate in such activity. For example: icon 914 is used to indicate that the primary emphasis of activity #1 would be reading; icon 916 is used to indicate that the primary emphasis of activity #6 would be done on-line; and, icon 918 is used to indicate that the primary emphasis of activity #4 would be done off-line. Similarly, icon 920 is used to indicate that both caring adult and pupil would be expected to participate in activity #7; icon 922 is used to indicate that only the caring adult would be expected to participate in activity #6; and, icon 924 is used to indicate that only the pupil would be expected to participate in activity #2.

Browser window 900 further comprises a plurality of reminders 926, 928, 930, and 932 for the caring adult. Reminder 926, for example, comprises a plurality of "things to print". Each of those things to print is accessible individually by way of, for example, a hyperlink. Thereafter, they may be printed one-by-one, or altogether by pressing the "print all" button 928. Reminder 930 comprises a plurality of "things to gather". Finally, reminder 932 comprises a plurality of "things to preview". Such things to review may be accessible individually by way of, for example, a hyperlink. Lastly, the caring adult may start the lesson by selecting the "start lesson" button 934.

Figure 10A:
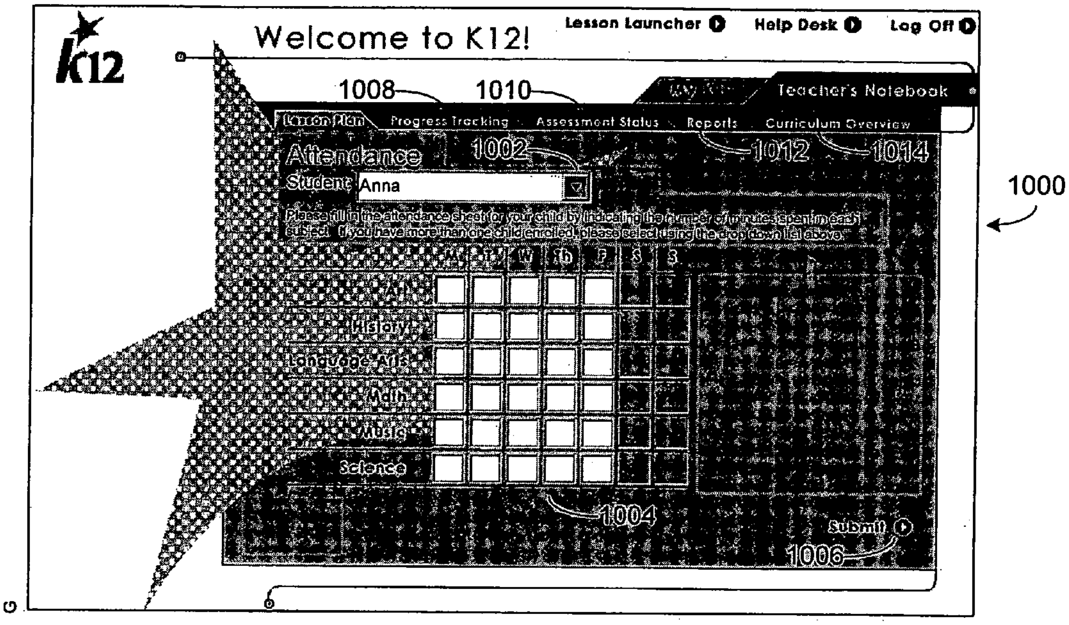
FIG. 10(*a*) is a browser window for taking attendance in accordance with one embodiment of the present invention.
Figure 10B:
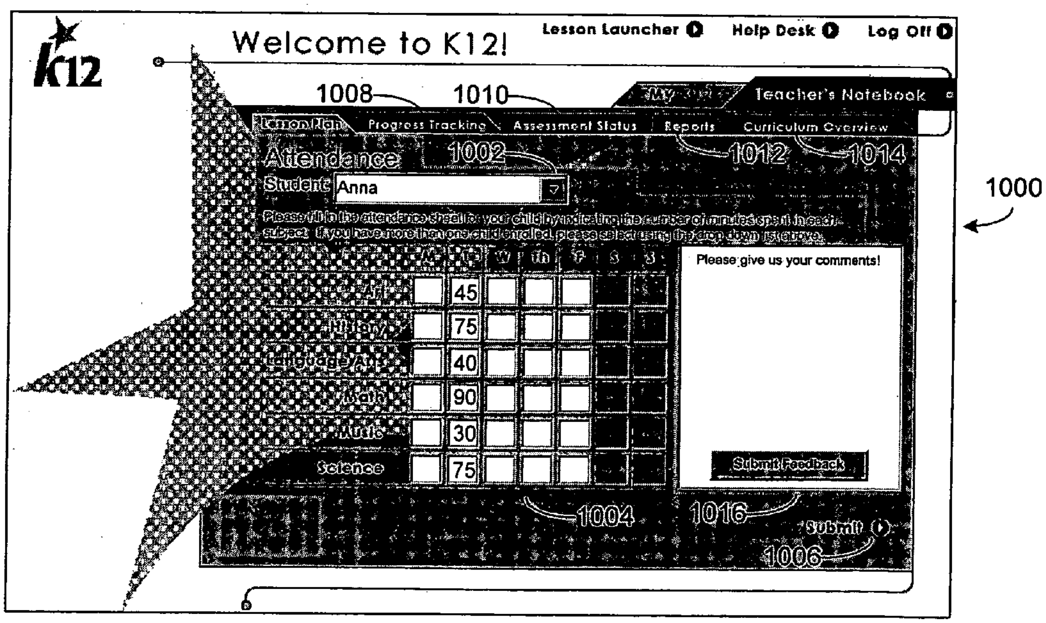

Referring now to FIGS. 10(*a*) and 10(*b*), alternative embodiments of a browser window 1000 are shown by which attendance may be taken in order to satisfy state/local requirements. Browser window 1000, as shown in FIG. 10(*a*), simply comprises a drop down list 1002 with instructions to fill in the attendance sheet for a particular child. Where the caring adult is teaching more than one child, attendance should be filled in for all such children. Blank means 1004 is presented to fill in the unit of time (e.g., number of minutes) spent on each of a plurality of subjects taught the preceding day. After the caring adult has filled in the appropriate units of time, a "submit" button 1006 is selected to enter that time in the system 100.

Alternatively, and referring now more specifically to FIG. 10(*b*), means 1004 may be conveniently pre-populated by the system 100 based on the units of time allotted by the curriculum planner 112 for the preceding day. The caring adult may simply highlight the unit of time for any given subject area, and change that unit of time according to the actual amount spent during the preceding day. Moreover, browser 1000 may include input means 1016 by which the caring adult may provide feedback to the system 100. Both of the browser windows 1000 shown in FIGS. 10(*a*) and 10(*b*) may also suitably include means for the caring adult, at any point in time, to navigate to other portions of the application 118 by selecting an appropriate tab 1008, 1010, 1012, or 1014.

Instructional Sequencer

Lesson Assessment—Generally

Within system 100, lessons are preferably organized in a hierarchy, structured from top to bottom as follows: (a) grade; (b) subjects; (c) semesters; (d) units; and (e) lessons and alternate (or "back-up") lessons. A recommended lesson sequence is provided for all pupils. During a given grade year, for each subject a pupil will have a recommended next lesson or assessment. The rules governing the determination of this next lesson or assessment are defined immediately herein below.

The major goals in language arts and mathematics are mastery of almost all lessons. The major goal in history and science is significant retention of key lesson objectives over time. The major goals in art and music are exposure to and familiarity with lesson content.

Pupils using system 100 will be allowed to miss or skip some lessons, including the lesson assessments. The caring adults and pupils will not be prevented from proceeding if they skip or fail a lesson. However, at the start of each lesson, system 100 will be used to inform the caring adults about missing or incomplete lessons and about the number of lessons that must be completed to earn a certificate. At any point, the caring adult and pupil can choose to review a lesson studied previously.

Language Arts, Mathematics, Science, and History

If assessment results have not been reported for one or more lessons, the caring adult is notified at beginning of a lesson regarding assessments that need to be completed. The caring adult then selects from a menu that includes: (a) next lesson; (b) skip lesson; (c) lessons marked for review; (d) lessons marked as "skipped"; (e) any unit assessment marked for retake; (f) previously completed lessons; and (g) future lessons. A warning also appears if too many lessons have already been skipped and the pupil will not pass the course unless the number is reduced. System 100 may provide an option to turn this warning off.

The pupil first takes the lesson with a caring adult. Then, the pupil completes a lesson assessment. If the caring adult does not enter assessment results immediately, system 100 is adapted to give a reminder at the end the day and at the beginning of the next lesson. If the assessment is off-line, the caring adult reports the results on-line by indicating which responses are correct and incorrect. The system 100 then computes a score (e.g. percent correct). If the assessment is on-line, the caring adult does not have to enter responses; system 100 merely computes score.

If the score on a lesson assessment is 80% or higher, system 100 gives the option to do one of the following: (a) move to next subject in daily schedule or end the day (default); (b) continue immediately with the next lesson in same subject (c) review lesson and retake assessment; (d) take a back-up lesson and assessment if available; (e) if available, contact a system teacher by email and ask for help or (f) review lesson later. If option (f) is chosen, this lesson is then added to the menu of lessons marked for review, and the caring adult will be prompted to choose from first two options (i.e., options (a) or (b)).

If the score on a lesson assessment is less than 80%, system 100 gives the option to do one of the following: (a) review the lesson and retake the assessment (the default if a back-up lesson is not available); (b) take a back-up lesson and assessment if available. (the default if available); (c) if available, contact a system teacher by email and ask for help; (d) review the lesson later. This lesson will then be added to the menu of lessons marked for review. They do not figure in the total of skipped lessons; however, the pupil will not receive a certificate unless they are either completed successfully (i.e., 80% or higher), or become allowable skipped lessons. System 100 will then prompt the caring adult to choose from the final two options below:

Skip lesson. Add this lesson to menu of skipped lessons. Skipped lessons are counted against the total of allowable skipped lessons and, as above, a warning will appear when too many lessons are skipped. Prompt the caring adult to choose from the following two options.

Move to next subject in daily schedule or end the day.

Continue immediately with next lesson in same subject.

If the pupil retakes a lesson or takes an additional lesson, and scores 80% or higher, system 100 will give the option to do one of the following: (a) move to the next subject in the daily schedule or end the day (default); (b) continue immediately with the next lesson; (c) review the lesson and retake the assessment (and after retake, prompt the caring adult to choose from first two options); (d) take a back-up lesson and assessment if available; (e) if available, contact a system teacher by email and ask for help; and (f) review the lesson later (at which point system 100 will add this lesson to the menu of lessons marked for review, and the caring adult will be prompted to choose from the first two options).

If the pupil retakes lesson or takes additional lesson, and scores less than 80%, system 100 will give the option to do one of the following: (a) review the lesson and retake assessment (default if backup lesson not available); (b) take a back-up lesson and assessment if available (default if available); (c) if available, contact a system teacher by email and ask for help; (d) review the lesson later—at which point system 100 will add this lesson to the menu of lessons marked for review, and the caring adult will be prompted to choose one of these options: (i) move to the next subject in daily schedule or end the day (default); or (ii) continue immediately with the next lesson; (e) skip the lesson—at which point system 100 will add this lesson to menu of skipped lessons, and prompt the caring adult to choose one of these options: (i) move to the next subject in the daily schedule or end the day (default); or (ii) continue immediately with the next lesson. Under option (d) above, these lessons do not figure in the total of skipped lessons; however, the pupil will not receive a certificate unless these are either completed successfully (i.e., 80% or higher), or become allowable skipped lessons. Under option (e) above, skipped lessons are counted against the total of allowable skipped lessons as above, and a warning will appear if too many lessons have already been skipped. If the pupil takes same lesson two times without success, system 100 notifies a system teacher.

Art and Music

If assessment results have not been reported for one or more lessons, the caring adult is notified at beginning of lesson about assessments that need to be completed. The caring adult then selects from a menu that includes: (a) next lesson; (b) skip lesson; (c) lessons marked for review; (d) lessons marked as “skipped”; (e) any unit assessment marked for retake; (f) previously completed lessons; and (g) future lessons. A warning also appears if too many lessons have already been skipped and the pupil will not pass the course unless the number is reduced. Alternatively, an option may be provided to turn this warning off.

The pupil first takes the lesson with the caring adult. Then, the pupil completes the lesson assessment. If the caring adult does not enter the assessment results immediately, system 100 gives a reminder at the end the day and at the beginning of the next lesson. If the assessment is off-line, the caring adult then reports the assessment’s results on-line by indicating which responses are incorrect. After that, system 100 computes the score (i.e., percent correct). If the assessment is on-line, the caring adult does not have to enter response, and system 100 computes the score.

After the lesson assessment, system 100 gives the caring adult the option to do one of the following: (a) move to the next subject in daily schedule or end the day (default); (b) continue immediately with the next lesson in same subject; (c) review the lesson and retake the assessment (after which, system 100 will prompt the caring adult to choose from first two options); or (d) review the lesson later (at which point, system 100 adds this lesson to the menu of lessons marked for review, and the caring adult will be prompted to choose from first two options).

Unit Assessment

Language Arts and Mathematics

When the pupil reaches a unit boundary, system 100 will prompt the caring adult to have the pupil take a unit test. It may permit the pupil to take the first part of the unit test at the end of the last (i.e., review) lesson in the unit. Alternatively, it may give the caring adult the option to continue immediately with the second half of unit test, or take it at the beginning of the next lesson. If the unit test score is 80% or higher, system 100 will give the caring adult the option to: (a) move to the next subject in the daily schedule or end the day (default); (b) continue immediately with the first lesson of the next unit; (c) review any lessons from the following list, and then retake the unit test:

Lessons previously marked for review;

Lessons with missed items on unit test;

Backup lessons if available; or

Skipped lessons.

If the unit test score is less than 80%, system 100 will give the caring adult the option to: (a) review any lessons from the list below, and then retake unit test (default):

Lessons previously marked for review;

Lessons with missed items on unit test;

Backup lessons if available; or

Skipped lessons.

(b) move to the next subject in the daily schedule or end the day (default); or (c) continue immediately with the first lesson of the next unit.

If the pupil retakes the unit test, and scores 80% or higher, system 100 will give the caring adult the option to do one of the following: (a) move to the next subject in the daily schedule or end the day (default); (b) continue immediately with the next lesson; or (c) review the lessons and retake the unit assessment (at which point, system 100 will prompt the caring adult to choose from the first two options.

If the pupil retakes the unit assessment, and scores less than 80%, system 100 will give the caring adult the option to do one of the following: (a) review the lessons and retake the unit assessment (default if backup lesson not available);

(b) take back-up lessons and assessment if available (default if available); (c) if available, contact a system teacher by email and ask for help; or (d) review the lessons later. System 100 will add this lesson to the menu of lessons marked for review. These lessons do not figure in the total of skipped lessons; however, the pupil will not receive a certificate unless these are either completed successfully (i.e., 80% or higher), or become allowable skipped lessons. Then, system 100 will prompt the caring adult to choose from first three options. If the pupil takes the unit assessment two times without success, system 100 notifies a system teacher, if available.

Science, History, Art (Grade 2), and Music (Grade 2)

When the pupil reaches a unit boundary, system 100 will prompt the caring adult to have the pupil take a unit assessment. The caring adult may then choose to have the pupil take the first part of the unit test at the end of the last (i.e., review) lesson in that unit. Alternatively, the caring adult will have the option to continue immediately with the second half of unit assessment, or take it at the beginning of the next lesson.

After the unit assessment, system 100 will give the caring adult the option to: (a) move to the next subject in the daily schedule or end the day (default); (b) continue immediately with the first lesson of the next unit; (c) review any lessons previously taken then retake the unit assessment; or provide a list of the lessons for possible review, based on item scores on unit assessment. In the event of a unit assessment retake, after such unit assessment retake, system 100 will give the caring adult the option to: (a) move to the next subject in the daily schedule or end the day (default); (b) continue immediately with the first lesson of the next unit; or (c) review any lessons previously taken then retake assessment. A list of lessons for possible review may be provided, based on item scores on unit assessment.

Mid-Course Assessment (Grade 2)

Language Arts and Mathematics

When the pupil reaches a mid-course boundary, system 100 will prompt the caring adult to have the pupil take a mid-course assessment. If the mid-course assessment score is 80% or higher, system 100 will give the caring adult the option to: (a) move to the next subject in the daily schedule or end the day (default); or (b) review any lessons from the list below, and then retake the mid-course assessment:

Lessons marked for review;
Lessons with missed items on mid-course test;
Backup lessons if available; or
Skipped lessons.

If the mid-course assessment score is less than 80%, system 100 will give the caring adult the option to: (a) review any lessons from the list below, and then retake the mid-course assessment (default):

Lessons previously marked for review;
Lessons with missed items on mid-course test;
Backup lessons if available; or
Skipped lessons.

(b) move to the next subject in the daily schedule or end the day.

If the pupil retakes the mid-course assessment, and scores 80% or higher, system 100 will give the caring adult the option to do one of the following: (a) move to the next subject in the daily schedule or end the day (default); or (b) review any lessons from the list below, and then retake the mid-course assessment:

Lessons marked for review;
Lessons with missed items on mid-course test;
Backup lessons if available; or
Skipped lessons.

If the pupil retakes the mid-course assessment, and scores less than 80%, system 100 will give the caring adult the option to: (a) review any lessons from the list below, and then retake the mid-course assessment (default)

Lessons previously marked for review.
Lessons with missed items on mid-course test.
Backup lessons if available.
Skipped lessons.

(b) move to the next subject in the daily schedule or end the day.

If the pupil takes mid-course assessment two times without success, system 100 will notify a system teacher, if available.

Science, History, Art, and Music

When the pupil reaches a mid-course boundary, system 100 will prompt the caring adult to have the pupil take a mid-course assessment. After that mid-course assessment, system 100 will give the caring adult the option to: (a) move to the next subject in the daily schedule or end the day (default); (b) review any lessons previously taken, and then retake assessment (in which case system 100 will provide a list of lessons for possible review, based on item scores on mid-course assessment); or (c) after the mid-course assessment retake, move to the next subject in the daily schedule or end the day.

Figure 11:
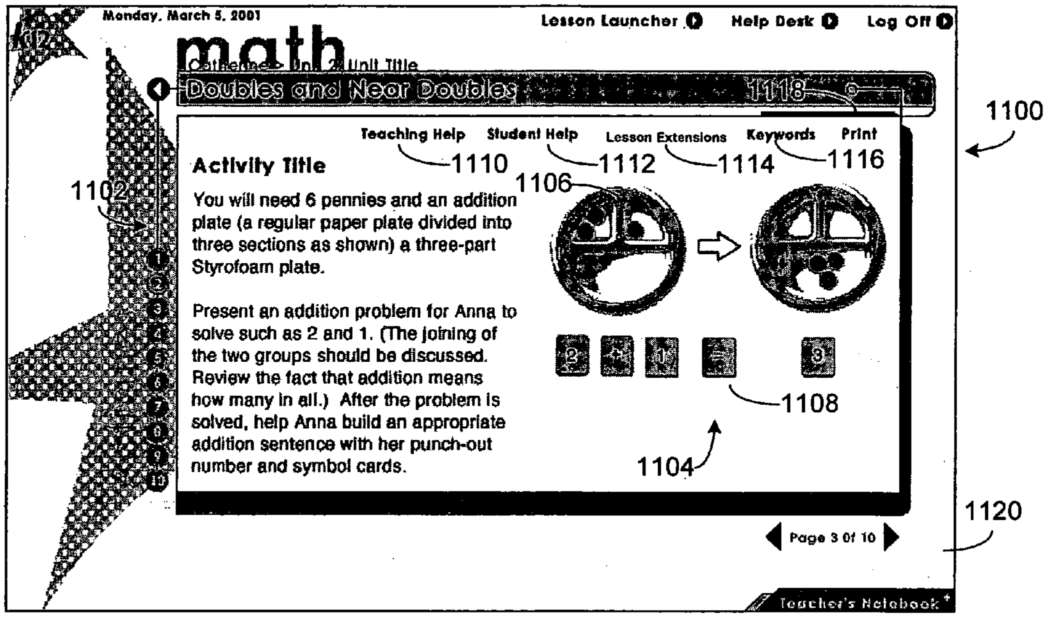
FIG. 11 is a first browser window illustrating use of the instructional sequencer shown in FIG. 1, particularly with respect to the exemplary lesson shown in FIG. 9.

Every lesson within a subject will have a status at any given time. The combined status of these lessons will serve as data inputs into the logic for the instructional sequencer 114. Such status indicators comprise:

Not yet delivered
Delivered
Skipped
Marked for review
Assessment passed
Assessment failed FIG. 11 is a first browser window 1100 illustrating use of the instructional sequencer 114 shown in FIG. 1, particularly with respect to the exemplary lesson shown in FIG. 9. It generally comprises a field 1102, which describes the particular activity, and graphical means 1104 for illustrating the problem presented by the activity. The graphical means 1104 includes iconic means 1106, and corresponding textual means 1108 for demonstrating the activity. Browser window 1100 further comprises a plurality of hyperlinks 1110, 1112, 1114, 1116, and 1118 to assist the caring adult in carrying out this particular activity. For example, hyperlink 1110 permits the caring adult to access teaching help, while hyperlink 1112 accesses student help. Hyperlink 1114 accesses lesson extensions, while hyperlink 1116 accesses a plurality of keywords associated with the activity. Finally, hyperlink 1118 permits the caring adult to print out the activity for offline use. By selecting the forward and backward buttons 1120, the caring adult may access previous or following pages in the particular activity.

Figure 12:
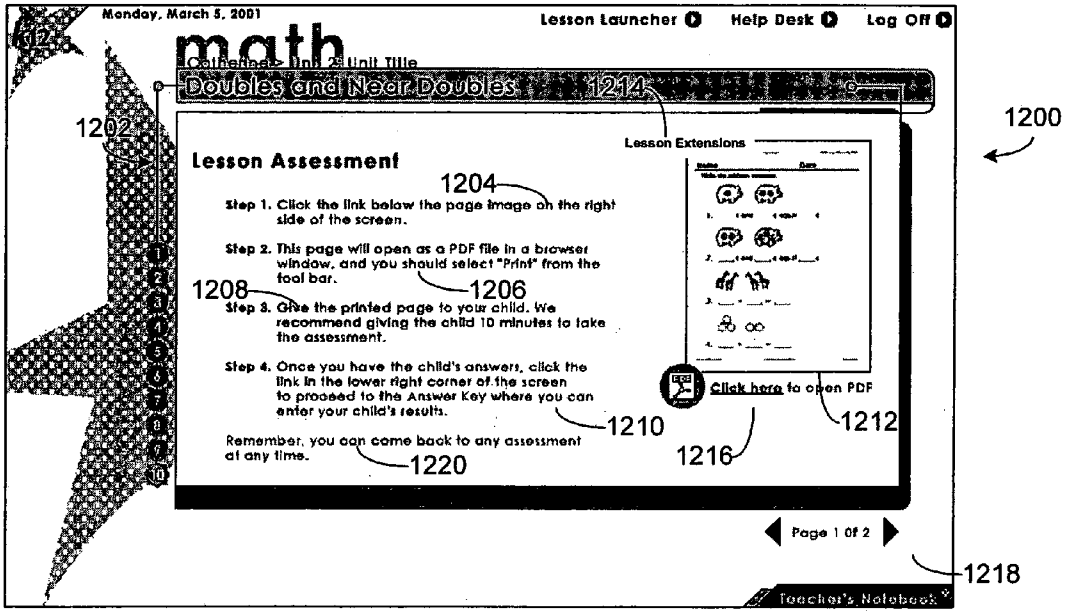
FIG. 12 is a second browser window illustrating use of the instructional sequencer shown in FIG. 1, particularly with respect to an assessment of the exemplary lesson shown in FIG. 9.

FIG. 12 is a second browser window 1200 illustrating use of the instructional sequencer 114 shown in FIG. 1, particularly with respect to an assessment of the exemplary lesson shown in FIG. 9. In this case, it should be assumed that the caring adult has selected through and to the last page in the activity. The next logical function (i.e., after the pupil has completed the activity, whether online or offline) is to assess the pupil's performance. Browser window 1200 provides that means. It generally comprises a field 1202, which contains the steps 1204, 1206, 1208, and 1210 for assessing the pupil's performance of the activity. Those steps 1204, 1206, 1208, and 1210 provide explicit and easy to understand instructions for the caring adult to assess the pupil's performance of the activity. The first step 1204, for example, directs the caring adult to "Click the link below the page image on the right side of the screen." In the event that the caring adult would follow that direction by clicking on the page image 1212, the page will open as a PDF file in a browser window as noted in the second step 1206. The caring adult is then directed to "select 'Print' from the browser toolbar (not shown), at which point the page image for "Lesson Extensions" 1214 will print out. Alternatively, the caring adult may select hyperlink 1216 to open the PDF file corresponding to page image 1212.

The third step 1208 directs the caring adult to "Give the printed page to your child." It also recommends "giving the child 10 minutes to take the assessment." The fourth step 1210 then directs the caring adult "Once you have the child's answers, click the link in the lower right corner of the screen [i.e., forward button 1218 as shown in FIG. 12] to proceed to the Answer Key where you can enter your child's results." In any event, the caring adult is also reminded at field 1220 to "come back to any assessment at any time."

Figure 13:
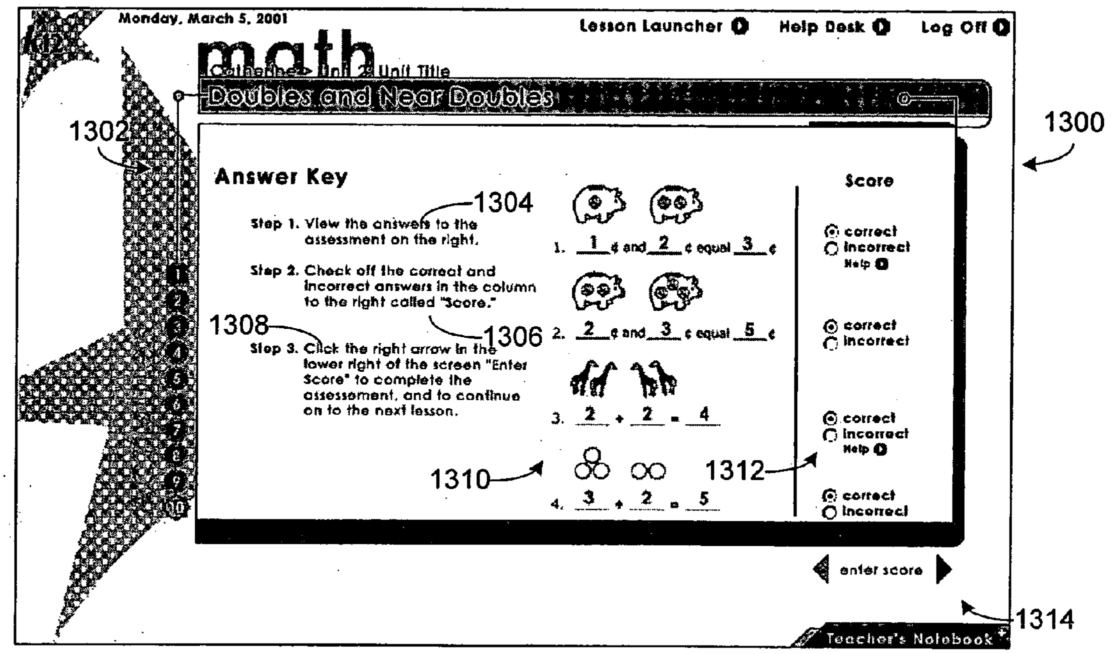
FIG. 13 is a third browser window illustrating use of the instructional sequencer shown in FIG. 1, particularly with respect to an answer key for the exemplary lesson shown in FIG. 9.

FIG. 13 is a third browser window 1300 illustrating use of the instructional sequencer 114 shown in FIG. 1, particularly with respect to an answer key for the exemplary lesson shown in FIG. 9. Browser window 1300 generally comprises a field 1302, which includes a plurality of steps 1304, 1306, and 1308 for the caring adult to complete the Answer Key. For example, the first step 1304 directs the caring adult to "View the answers to the assessment on the right [i.e., in the area of graphical means 1310 for illustrating the answer shown in FIG. 13]." The second step 1306 directs the caring adult to "Check off the correct and incorrect answers in the column to the right called 'Score' [i.e., column 1312 as shown in FIG. 13]." Column 1312 includes a plurality of radio buttons to indicate whether the pupil's answer was right and wrong, as well as means for accessing "help" from the system 100 should the caring adult need it. Finally, the third step 1308 directs the caring adult to "Click the right arrow in the lower right of the screen [ie., arrow 1314] 'Enter Score' to complete the assessment, and to continue on to the next lesson."

Figure 14:
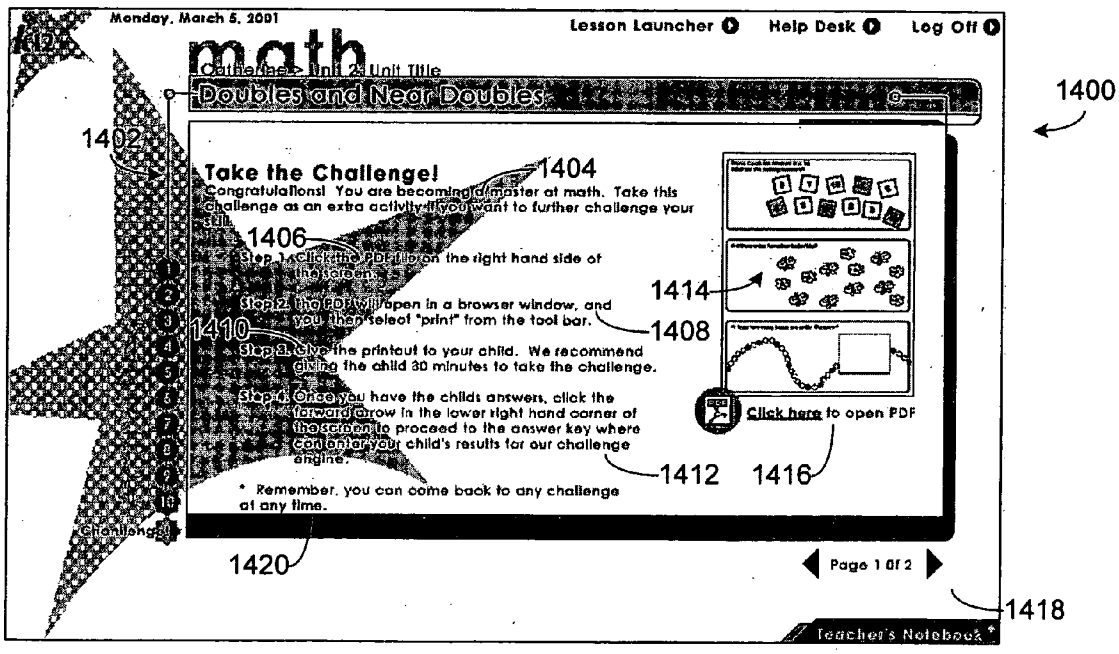
FIG. 14 is a fourth browser window illustrating use of the instructional sequencer shown in FIG. 1, particularly with respect to a challenge adapted for use with the exemplary lesson shown in FIG. 9.

System 100 will then prompt the caring adult to have the pupil take a challenge by displaying a fourth browser window 1400 as shown in FIG. 14. Browser window 1400 illustrates the use of the instructional sequencer 114 shown in FIG. 1, particularly with respect to the challenge adapted for use with the exemplary lesson shown in FIG. 9. It generally comprises a field 1402, which includes instructions 1404, 1406, 1408, 1410, and 1412 for taking the challenge. The first instruction 1404 is general in nature, and notifies the pupil that "Congratulations! You are becoming a master at math. Take this challenge as an extra activity if you want to further challenge your skill." In the event that the caring adult/pupil chooses to accept the challenge, the second instruction 1406 directs the caring adult/pupil to "Click the PDF file on the right hand side of the screen [i.e., page image 1414 as shown in FIG. 14]." The next instruction 1408 informs the caring adult/pupil that "The PDF file will open in a browser window, and you then select 'print' from the tool bar." Alternatively, the caring adult/pupil may select hyperlink 1416 to open the PDF file. The fourth instruction 1410 then directs the caring adult to "Give the printout to your child" and recommends "giving the child 30 minutes to take the challenge." Of course, other lengths of time may be appropriate, and fall within the spirit and scope of the present invention, depending on the complexity of the challenge. The last instruction 1412 directs the caring adult [i.e., once the pupil has answered the challenge] to "click the forward arrow in the lower right hand corner of the screen [i.e., arrow 1418] to proceed to the answer key", where the caring adult can enter the pupil's results for this challenge engine portion of the instructional sequencer 114. A reminder 1420 reminds the caring adult that return to any challenge is possible at any time.

Figure 15:
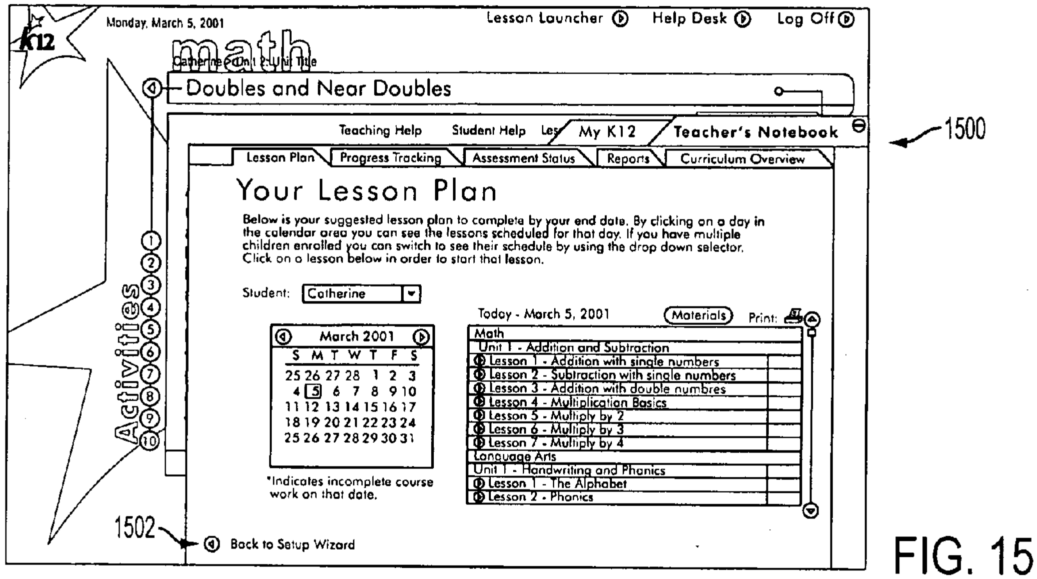
FIG. 15 is a fifth browser window illustrating use of the instructional sequencer shown in FIG. 1, particularly with respect to the exemplary lesson shown in FIG. 9.

FIG. 15 is a fifth browser window 1400 illustrating use of the instructional sequencer 114 shown in FIG. 1, particularly with respect to the exemplary lesson shown in FIG. 9. In the event that the caring adult selects at any time the "Teacher's Notebook" tab (e.g., that which is shown in FIG. 8), a pop-up lesson plan 1502 will appear as shown in FIG. 15.

Figure 16:
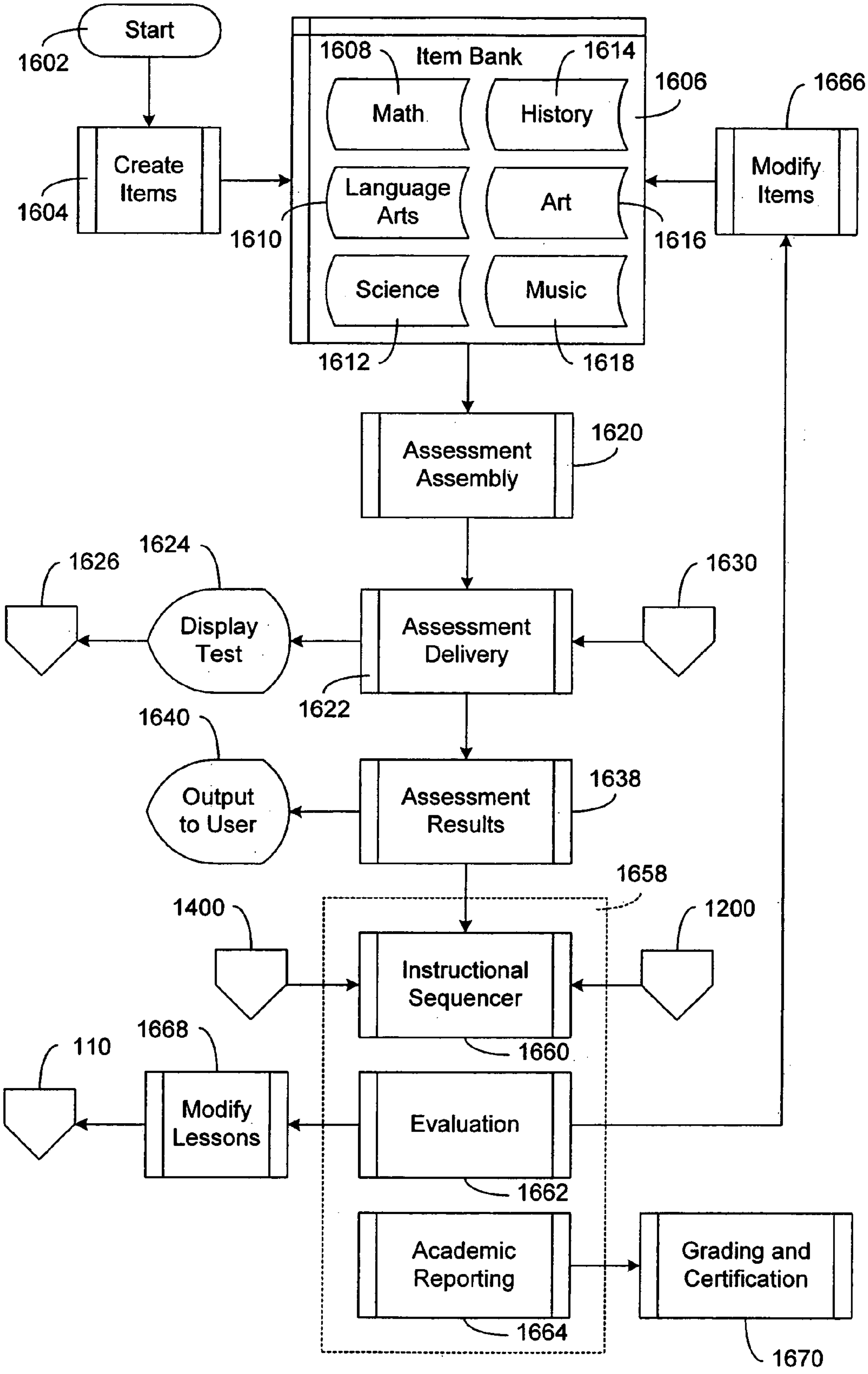
FIG. 16 is a first, generalized flowchart illustrating use of an assessment means according to the present invention.
Figure 17:
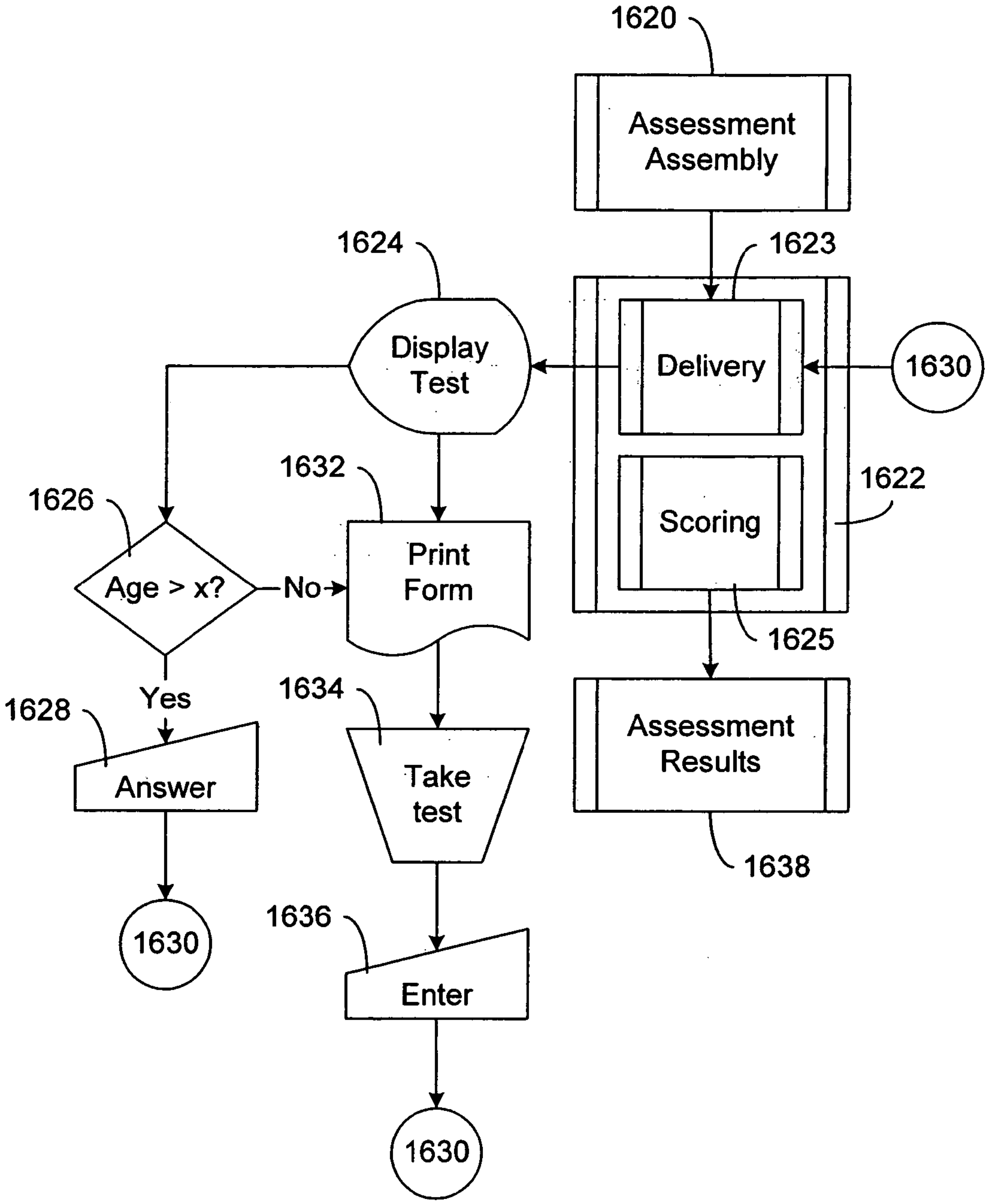
FIG. 17 is a second, more specific flowchart illustrating use of the assessment means shown in FIG. 16.
Figure 18:
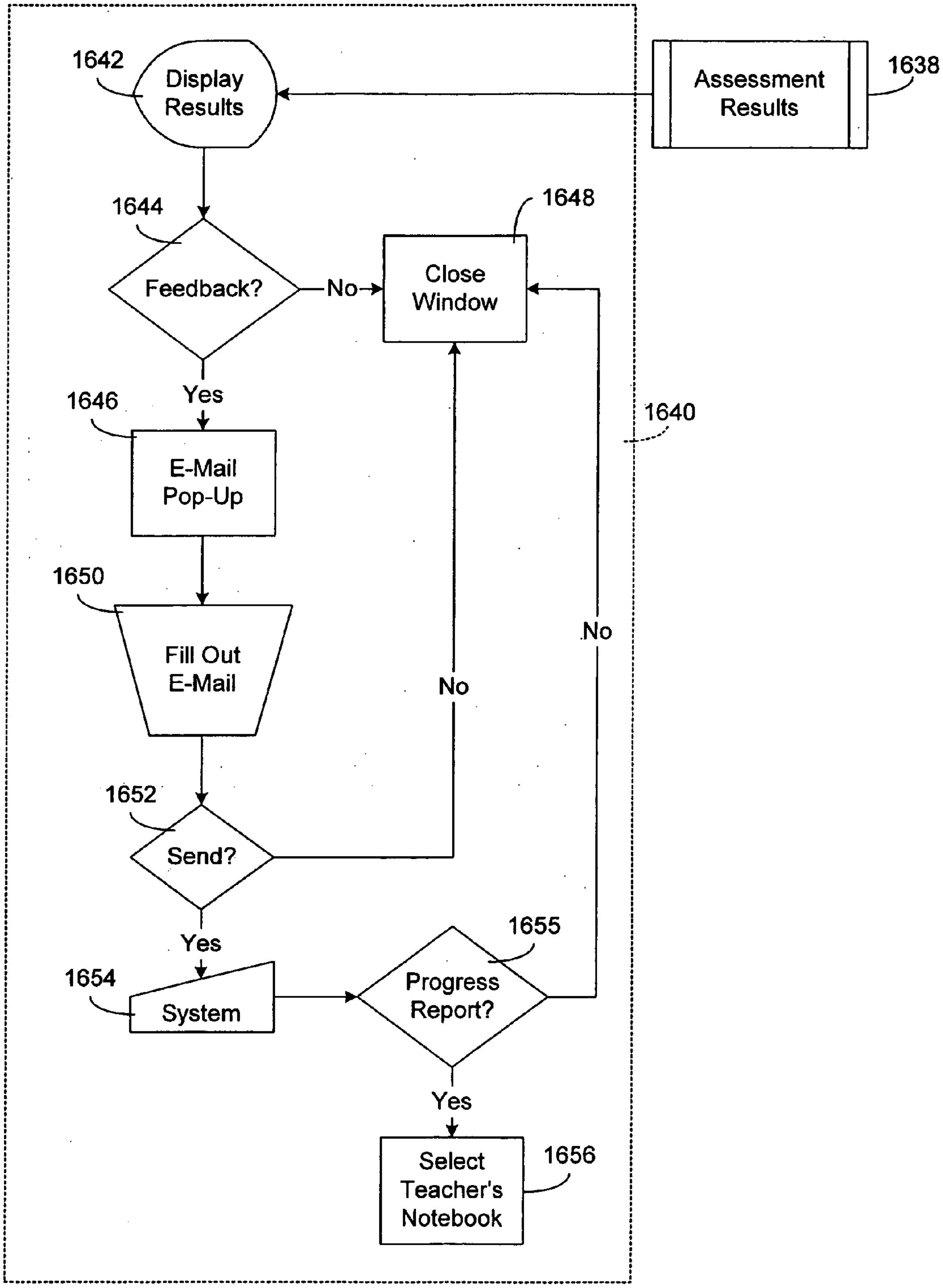
FIG. 18 is a third, more specific flowchart illustrating use of the assessment means shown in FIG. 16.

FIGS. 16–18 illustrate a presently preferred assessment means for use with the system 100 according to the present invention. Referring first to FIG. 16, a generalized flowchart of an assessment means according to the present invention is shown. The overall assessment process starts at step 1602 by creating a plurality of assessment items 1604 in the manner described herein above. The items created at step 1604 are then stored in an item bank 1606 within the database 108 (FIG. 1). Preferably, such plurality of items are grouped by subject matter (e.g., a plurality of math items 1608, a plurality of language arts items 1610, a plurality of science items 1612, a plurality of history items 1614, a plurality of art items 1616, a plurality of music items 1618, etc.). The items are assembled at runtime at step 1622, and delivered to the caring adult/pupil when selected at step 1624.

Referring for the moment to FIG. 17, it can be seen that the step 1622 of assessment delivery preferably comprises two distinct segments 1623, 1625. A first segment 1623 causes the test to be displayed on the client 102 (FIG. 1) at step 1624. If the pupil is older than a predetermined age (e.g., 6) as determined at step 1626, the pupil himself/herself answers the test at step 1628 and, when completed, submits the answered test at step 1630 for return to the assessment delivery segment 1623. In the event the pupil is younger than the predetermined age, the caring adult prints the test out at step 1632, and has the pupil complete the test offline at step 1634. When the pupil in this case had completed the test, the caring adult enters the completed test data at step 1636 for return to the assessment delivery segment 1623. The assessment delivery segment 1623 forwards the entered data in either case to the assessment scoring segment at step 1625. After the system 100 has scored the data at step 1625, the results are forwarded to an assessment results means at step 1638.

Referring again to FIG. 16, those assessment results are then forwarded at step 1640 as an output to the user (i.e., the caring adult or pupil). Preferably, the user is then given a plurality of alternatives as shown in FIG. 18. First, the results may be merely displayed at step 1642. The system 100 prompts to the user at step 1644 to make a decision with respect to whether any feedback to the system 100 is desired. If so, a pop-up window with appropriate data entry fields will appear at step 1646. If not, the browser window displaying the results will be closed at step 1648. Assuming the user wants to provide feedback to the system 100, the user then will fill out the pop-up window at step 1650. If satisfied with the feedback provided, the user will then be prompted by the system 100 to make a decision with respect to whether he/she wants to send the information at step 1652. If so, the user manually inputs that feedback to the system 100 (e.g., by clicking a "submit" button [not shown])

at step 1654. If not, the browser window displaying the results will be closed at step 1648. If the user wishes to see a project report, the user will select the teacher's notebook at step 1654. Otherwise, the browser window displaying the results will be closed at step 1648.

Referring again to FIG. 16, it can be seen that the system 100 also outputs the assessment results to other portions at step 1658. The instructional sequencer 114, for example, receives the assessment results at step 1660. The instructional sequencer 114 may use these results, for example, to determine the appropriate next steps. It should be understood at this juncture, however, that the results input to the instructional sequencer 114 from back-up assessments 1200 will count towards an assessment of the pupil's progress, while those from the challenges 1400 will not. The assessment results are also preferably output to an evaluation means at step 1662, and an academic reporting means at step 1664. Such evaluation means may be used to evaluate specific assessment items at step 1666, or lessons at step 1668. Administrators of the system 100 may, thus, utilize the assessment results to determine whether the assessments or lessons themselves need be changed or not.

Diagnostic and Prescriptive Curriculum Assessment

In addition to making placement assessments, lesson assessments, unit assessments, and mid-course assessments, system 100 may be used for the purposes of making diagnostic and prescriptive curriculum assessments. Some testers and educators have argued that many important uses of tests should not depend on norm groups (i.e., "norm referenced"), but on whether pupils have mastered specific instructional goals (i.e., "criterion referenced"). They reason that telling a pupil's position in such a norm group does not reveal whether the pupil can, in fact, follow written instructions, for example, or subtract two-digit numbers. Instead, they believe that, for decision making by teachers and others, testing should often be criterion referenced and not norm referenced. The differences between these two testing philosophies, however, were often exaggerated, and both kinds of test can serve either function.

In the 1960's and '70s, the criterion referenced view became fashionable and was the rationale of the National Assessment of Educational Progress (NAEP). Congress founded the NAEP in 1964 to determine what Americans at ages 9, 13, 17, and 26–35 know and can do. It was designed to measure the knowledge, skills, and attitudes of young Americans at key points in their education and to measure changes in their education attainments. At that time, the learning areas selected for assessment were: art, career and occupational development, citizenship, literature, mathematics, music, reading, science, social studies, and writing. The assessment of each area was based on the goals established for it by scholars, educators, and concerned laypersons.

The support for criterion referenced measurement originated in large part from the emphasis on behavioral objectives, the sequencing and individualization of instruction, the development of programmed materials, the learning theory that suggests that almost anybody can learn almost anything if given enough time, the increased interested in certification, and the belief that norm referencing promotes unhealthy competition and is injurious to low-scoring pupils' self-concepts.

The principal uses of criterion referenced measurement have been in mastery tests within the classroom; for minimum competency tests, for example, high school graduation; and for licensure tests. A mastery test is a particular type of criterion reference test. Mastery, as the word is typically used, connotes an either/or situation. The person has either achieved the objective(s) satisfactorily or has not. Criterion referenced testing in general could also measure degrees of performance. Mastery tests are used in programs of individualized instruction, such as the Individually Prescribed Instruction (IPI) program or the mastery learning model. These programs are composed of units or modules, usually considered hierarchical, each based on one or more instructional objective. Each individual is required to work on the unit until he or she has achieved a specific minimum level of achievement. At that point, he or she is considered to have mastered the unit.

In such programs, instructional decisions about a pupil are not dependent on how his or her performance compares to others. If he or she has performed adequately on the objectives, the decision is to move on to the next unit of study. If he or she has not, then he or she is usually required to restudy the material covered by the test until he or she performs adequately and, thus, masters the material. Mastery testing requires the tester to set a cut-off score. This should be done with the benefit of a careful rationale and procedure for choosing that cut-off score, since no useful information can be obtained regarding degree of proficiency above or below the cut-off score.

A related use of criterion referenced testing is minimum competency testing. Minimum competency testing is one area where cut-off scores are set, and degrees of performance above the cut-off are not considered in making promotion, graduation, or certification decisions. Licensure tests for teachers, for example, are considered criterion referenced. The purpose of a licensure test is to ensure that the public health, safety, and welfare will be protected. Thus, licensure tests are to help determine whether individuals have minimal competence to practice their profession. A cut-off score must, therefore, be established.

Employing the individually prescribed instruction or mastery model of learning, minimum competency testing and licensure are not the only uses for criterion referenced measures. One may also use such measures to help evaluate instructional programs. In order to determine whether specific instructional treatments or procedures have been successful, it is necessary to have data about the outcomes on the specific objectives the program was designed to teach. A measure comparing pupils to each other may not present data as effectively as a measure comparing each pupil's performance to the objective. Criterion referenced measurements also offer certain benefits for instructional decision making within the classroom. The diagnosis of specific difficulties accompanied by a prescription of certain instructional treatments is necessary in instruction whether or not the teacher uses a mastery approach to learning. Because criterion referenced tests are often narrower in scope, there may be enough items on a given objective to make inferences about an individual's general performance on that objective. This cannot typically be done on a traditional norm referenced test because there are too few items on any specific objective.

Research has indicated that commercially-published CRTs are often: (1) objectives referenced rather than domain referenced, which means that the performance on any objective cannot be generalized to all the other items in that domain; (2) lacking in content validity because conventional item statistics are used to select test items, which invariably results in the very easy and very hard items being eliminated; (3) lacking with respect to acceptable reliability; in many instances, the standard error of measurement is not reported; and (4) of such poor psychometric quality that care should be taken in their use and interpretation.

In order to avoid such pitfalls, the assessment means used in the system 100 of the present invention preferably comprises an expert system and a CRT coupled together to provide a diagnostic and prescriptive curriculum assessment. Such diagnostic and prescriptive curriculum assessment may be taken at any time. However, the method of administering such an assessment according to a presently preferred embodiment of the invention is as follows: (1) assembling the CRT from the plurality of items stored in the item bank 1606 (FIG. 16) within database 108 (FIG. 1). Preferably, such plurality of items are grouped by subject matter (e.g., a plurality of math items 1608, a plurality of language arts items 1610, a plurality of science items 1612, a plurality of history items 1614, a plurality of art items 1616, a plurality of music items 1618, etc.). The items are assembled at runtime and delivered to the to the caring adult/pupil when selected. In a manner similar to the steps shown in FIGS. 16–18, the diagnostic and prescriptive curriculum assessment is then taken, submitted, and scored. Gaps in the pupil's mastery of individual lessons, units, or subjects are then identified by the expert system. Having identified such gaps, system 100 is, thus, enabled to drop out units in subjects which the pupil has mastered, and use that time more efficiently to fill in the gaps identified by the CRT with additional lessons.

Progress Tracker

The caring adults and teachers must be able to view information about the progress of a pupil relative to a variety of benchmarks. For example, the caring adults and teachers must be able to view the following for a unit:

How far the pupil has progressed through all of the lessons in a unit

The status of each lesson in a unit

The lesson assessment scores for each lesson in a unit

The number of passed, failed and incomplete assessments in a unit

The assessment score for a particular unit

Whether or not a unit assessment has been completed

The caring adults and teachers must also be able to view the following for a semester:

How far the pupil has progressed through all of the units in a semester

The unit assessment scores for each unit in a semester

The number of passed, failed and incomplete unit assessments in a semester

The assessment score for a particular semester.

Whether or not a mid-course assessment has been completed

Likewise, the caring adults and teachers must be able to view the following for a subject for a given grade:

How far the pupil has progressed through all of the units in a subject

The unit assessment scores for each unit in a subject

The number of passed, failed and incomplete unit assessments in a subject

The assessment scores for unit and mid-course assessments in a subject

Whether or not unit and mid-course assessments have been completed

The caring adults and teachers must be able to view the following for a pupil for a given grade:

How far the pupil has progressed through all of the units in each subject

The mid-course and internal proctored assessment scores for each subject in a grade Whether or not the mid-course and internal proctored assessments have been taken for each subject Furthermore, the caring adults and teachers must be able to view the following for a pupil:

Progress against state standards for age, grade level and mastery by subject

Progress against national standards for age, grade level and mastery by subject

Figure 19:
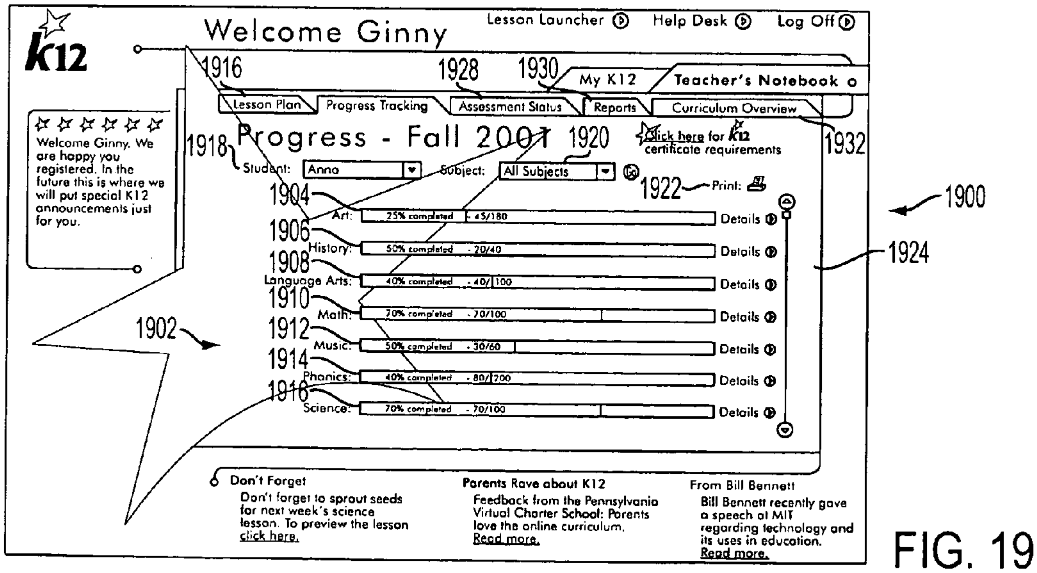
FIG. 19 is a first browser window illustrating use of the progress tracker shown in FIG. 1.

FIG. 19 is a first browser window 1900 illustrating use of the progress tracker 116 shown in FIG. 1. It generally comprises a bar chart 1902 rendition illustrating the progress made on each of a plurality of subject areas 1904, 1906, 1908, 1910, 1912, 1914, and 1916. For example, bar 1904 corresponding to "Art" indicates that the subject is 25% completed. Bar 1906 corresponding to "History" indicates that the subject is 50% completed. Likewise, bar 1908 corresponding to "Language Arts" indicates that the subject is 40% completed. Bar 1910 corresponding to "Math" indicates that the subject is 70% completed. Likewise, bar 1912 corresponding to "Music" indicates that the subject is 50% completed. Bar 1914 corresponding to "Phonics" indicates that the subject is 60% completed. Finally, bar 1916 corresponding to "Science" indicates that the subject is 70% completed.

Browser window 1900 further comprises a drop down list 1918 to facilitate the caring adult's selection of a particular pupil, and another drop down list 1920 to facilitate the caring adult's selection of whether browser window 1900 will display "all subjects" or selected ones of the plurality of subjects. It also comprises a means 1922 to print the bar chart 1902 representing the progress made by the selected pupil, and a scroll bar 1924 to enable scrolling down to other subjects included in the curriculum. At any point in time, the caring adult may navigate to other portions of the application 118 by selecting an appropriate tab 1926, 1928, 1930, or 1932.

Figure 20:
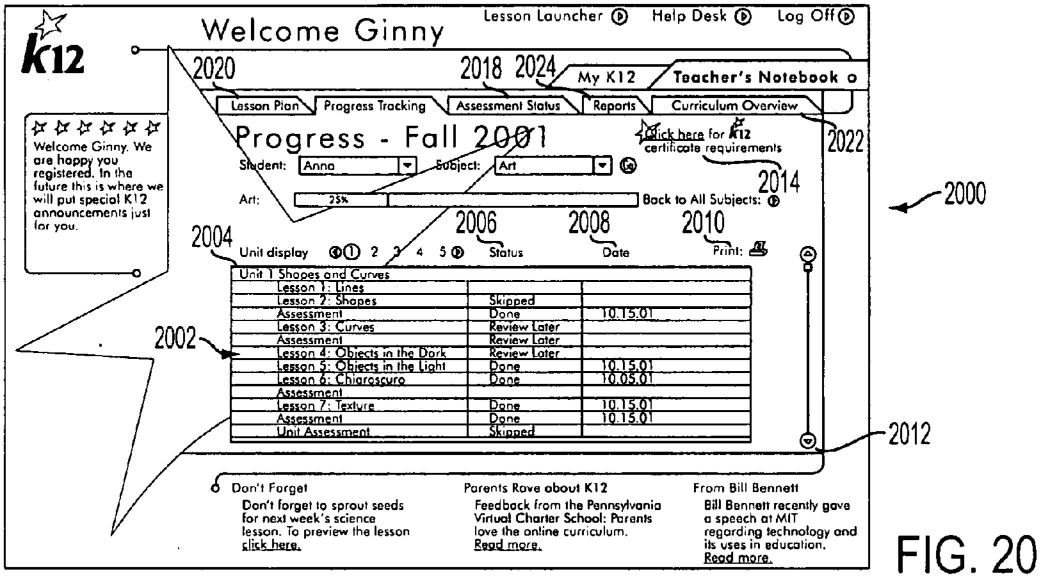
FIG. 20 is a second browser window illustrating use of the progress tracker shown in FIG. 1, particularly with respect to an exemplary unit.

FIG. 20 is a second browser window 2000 illustrating use of the progress tracker 120 shown in FIG. 1, particularly with respect to an exemplary unit. The exemplary unit shown in FIG. 20 may be reached, for example, by selecting a particular one of the bars 1904, 1906, 1908, 1910, 1912, 1914, and 1920 shown in FIG. 19. Browser window 2000 results from the selection of bar 1904 for the "Arts". As a result, a field 2002 illustrates a list of a plurality of units (e.g., unit #1 2004, entitled "Shapes and Curves"), with a first column 2006 showing the status of the lesson and a second column 2008 showing the date corresponding to such status. It also comprises a means 2010 to print the specific status 2002 representing the progress made by the selected pupil, a scroll bar 2012 to enable scrolling down to other subjects included in the curriculum, and a means 2014 to request feedback relating to the requirements for a certificate under the system 100 according to the present invention. At any point in time, the caring adult may navigate to other portions of the application 118 by selecting an appropriate tab 2020, 2018, 2024, or 2022.

Figure 21:
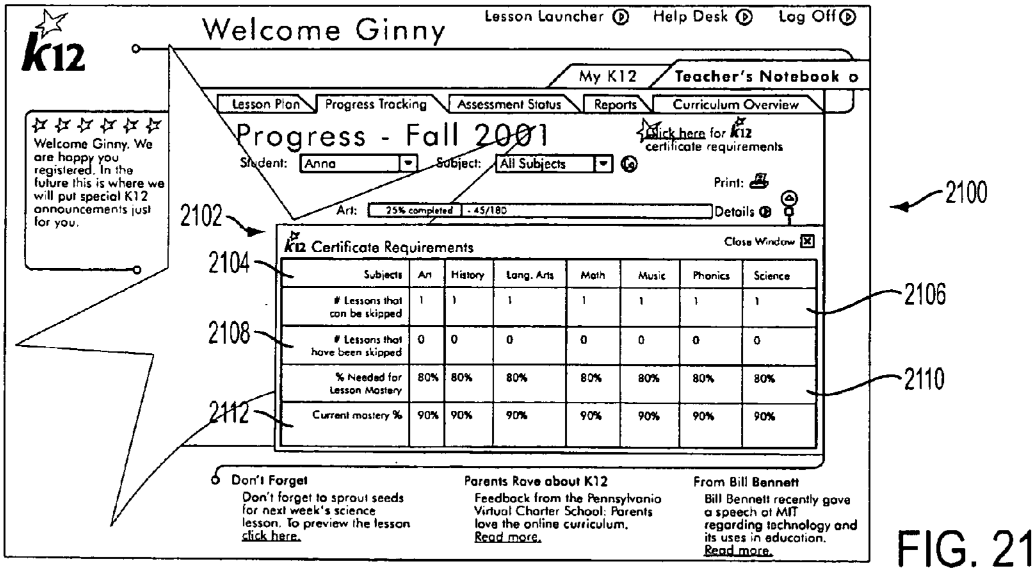
FIG. 21 is a third browser window illustrating use of the progress tracker shown in FIG. 1, particularly with respect to the requirements for a certificate to be issued as a result of a pupil's use of the virtual school system.

FIG. 21 is a third browser window 2100 illustrating use of the progress tracker 116 shown in FIG. 1, particularly with respect to the requirements for a certificate to be issued as a result of a pupil's use of system 100. Browser window 2100 is virtually identical to browser window 1600. It includes, however, a pop up window 2102 comprising a list of subjects 2104, a first list 2106 of the number of lessons that can be skipped for each of those subjects, a second list 2108 of the number of lessons that have been skipped for each of those subjects, a third list 2110 of the percentage needed for lesson mastery for each of those subjects, and a fourth list 2112 of the current mastery percentage for each of those subjects.

Figure 22:
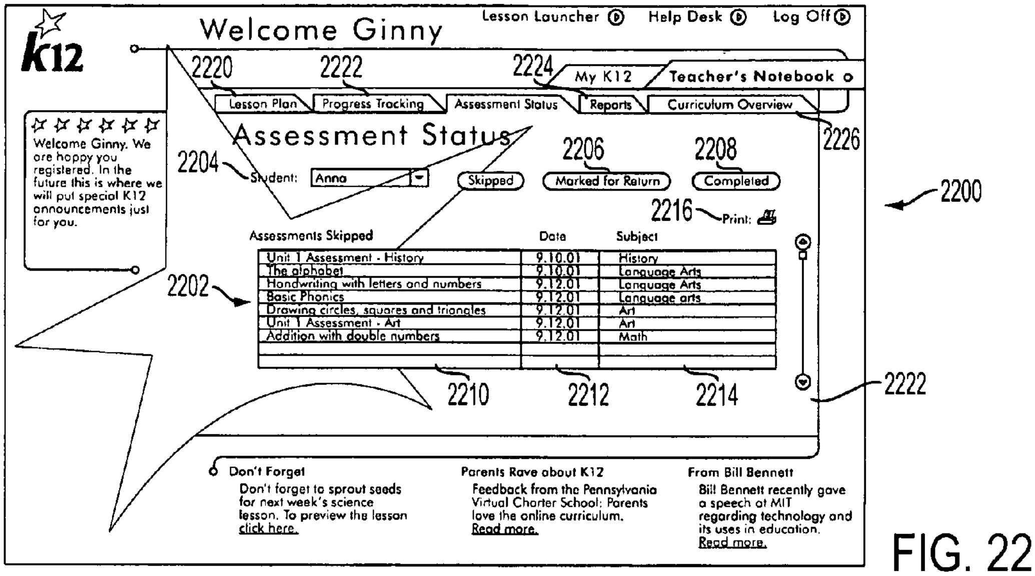
FIG. 22 is a fourth browser window illustrating use of the instructional sequencer shown in FIG. 1, particularly with respect to assessments skipped during a pupil's use of the virtual school system.

FIG. 22 is a fourth browser window 2200 illustrating use of the instructional sequencer 114 shown in FIG. 1, particularly with respect to assessments skipped during a pupil's use of system 100. For example, FIG. 20 indicates that "Lesson 2: Shapes" had been skipped. If the caring adult selected that row in the browser window 2000 shown in FIG. 20, a browser window like browser window 2200 would have appeared. Browser window 2200 generally comprises a list 2202 of the assessments skipped. The caring adult could select which pupil such list 2202 would be applicable by selecting the drop down list 2204 shown in FIG. 22. A list of those assessments "marked for return", or those that have been "completed", could also be selected by the caring adult by selecting buttons 2206 or 2208, respectively. The list of "assessments skipped", in any case, generally comprise a first column 2210 indicating the particular assessments skipped, a second column 2212 indicating the date on which such assessments had been skipped, and a third column 2214 indicating the subject in which such assessments had been skipped. Browser window 2200 also comprises means 2216 for printing the list 2202 of assessments skipped, and a scroll bar 2222 for use in scrolling down such list 2202. At any point in time, the caring adult may navigate to other portions of the application 122 by selecting an appropriate tab 2220, 2222, 2224, or 2226.

Figure 23:
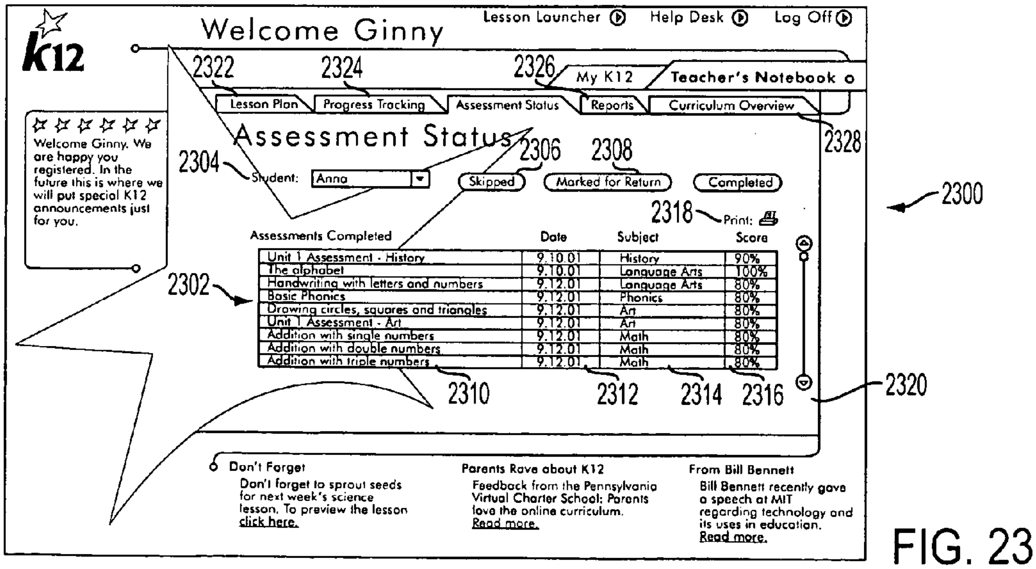
FIG. 23 is a fifth browser window illustrating use of the instructional sequencer shown in FIG. 1, particularly with respect to assessments completed during a pupil's use of the virtual school system.

FIG. 23 is a fifth browser window 2300 illustrating use of the instructional sequencer 114 shown in FIG. 1, particularly with respect to assessments completed during a pupil's use of system 100. For example, FIG. 20 indicates that "Lesson 7: Texture" assessment had been done. If the caring adult selected that row in the browser window 2000 shown in FIG. 20, a browser window like browser window 2300 would have appeared. Browser window 2300 generally comprises a list 2302 of the assessments completed. The caring adult could select which pupil such list 2302 would be applicable by selecting the drop down list 2304 shown in FIG. 23. A list of those assessments "skipped", or those that have been "marked for return", could also be selected by the caring adult by selecting buttons 2306 or 2308, respectively. The list of "assessments completed", in any case, generally comprise a first column 2310 indicating the particular assessments completed, a second column 2312 indicating the date on which such assessments had been completed, a third column 2314 indicating the subject in which such assessments had been completed, and a fourth column 2316 indicating the score achieved by the pupil. Browser window 2300 also comprises means 2318 for printing the list 2302 of assessments skipped, and a scroll bar 2320 for use in scrolling down such list 2302. At any point in time, the caring adult may navigate to other portions of the application 118 by selecting an appropriate tab 2322, 2324, 2326, or 2328.

Figure 24:
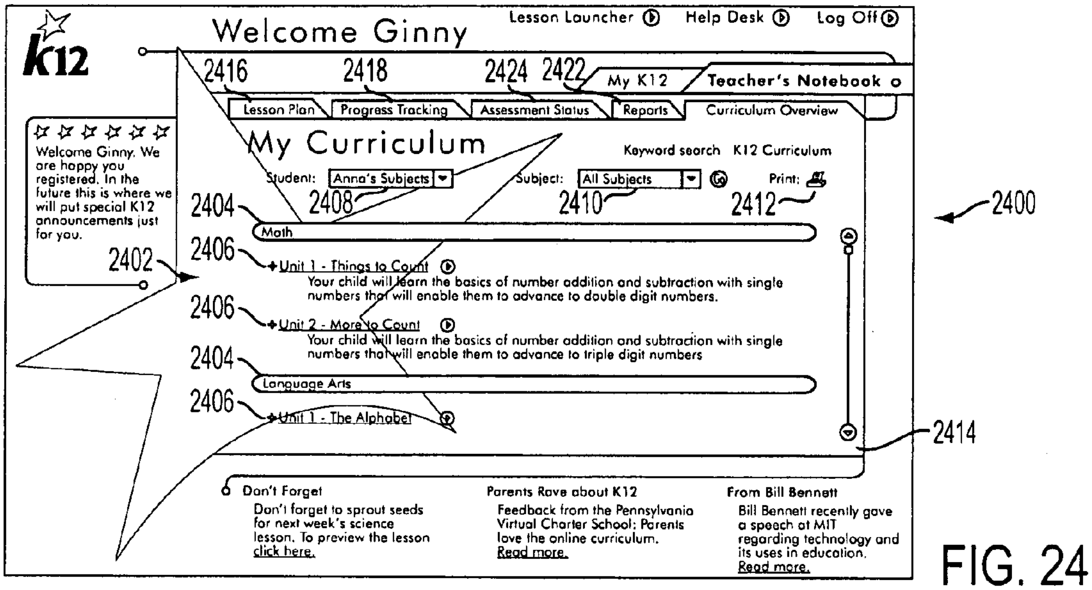
FIG. 24 is another browser window illustrating use of the curriculum planner shown in FIG. 1, particularly with respect to an overview of the curriculum planned by a caring adult using the virtual school system.

FIG. 24 is another browser window 2400 illustrating use of the curriculum planner 112 shown in FIG. 1, particularly with respect to an overview of the curriculum planned by a caring adult using system 100. It is selected in a similar manner by the caring adult, merely by selecting the "Teacher's Notebook" tab at any available browser window. It is comprised generally of a list 2402 of subjects 2404 having summaries 2406 of the individual units covered by the system 100. The caring adult could select which pupil such list 2402 would be applicable to by selecting the drop down list 2408 shown in FIG. 24, or determine which subjects 2404 would be displayed by selecting the drop down list 2410. Browser window 2400 also comprises means 2412 for printing the list 2402 of assessments skipped, and a scroll bar 2414 for use in scrolling down such list 2402. At any point in time, the caring adult may navigate to other portions of the application 118 by selecting an appropriate tab 2416, 2418, 2420, or 2422.

Content Manager

Figure 25:
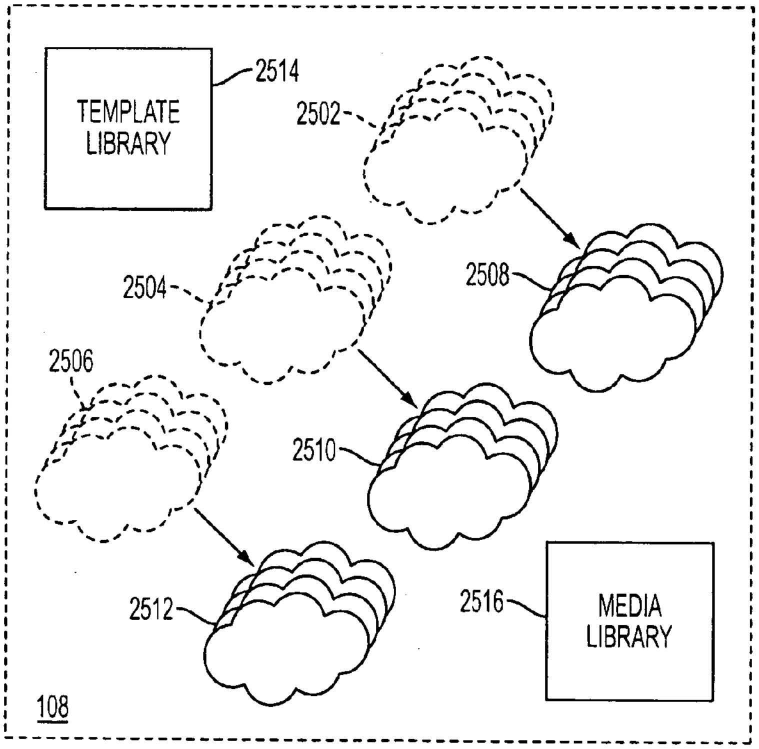
FIG. 25 is a block diagram illustrating exemplary classes, objects, and libraries stored within the database shown in FIG. 1.
Figure 26A:
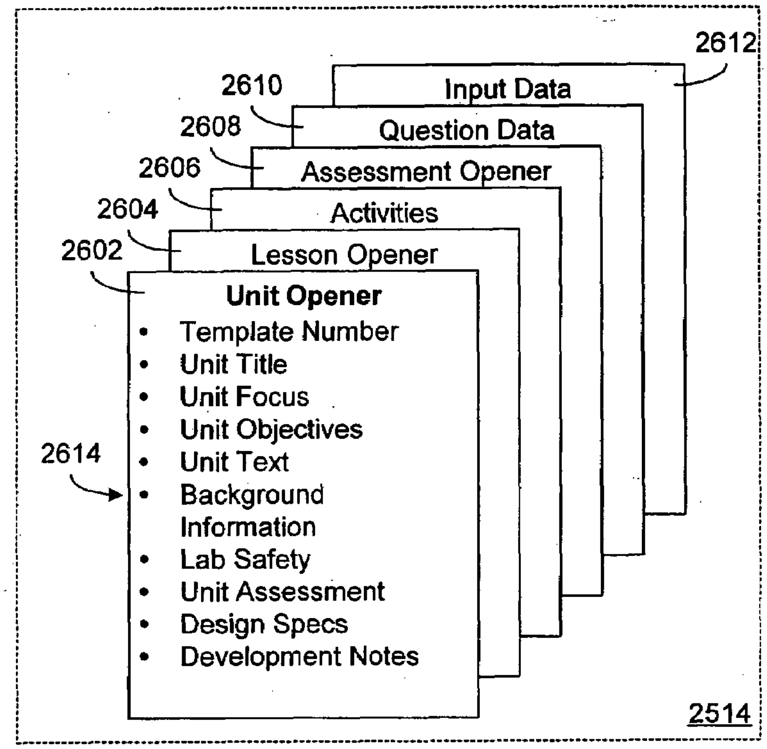
FIGS. 26(*a*) through 26(*m*) illustrate exemplary templates for use in creating the classes, objects, and libraries shown in FIG. 25.
Figure 26B:
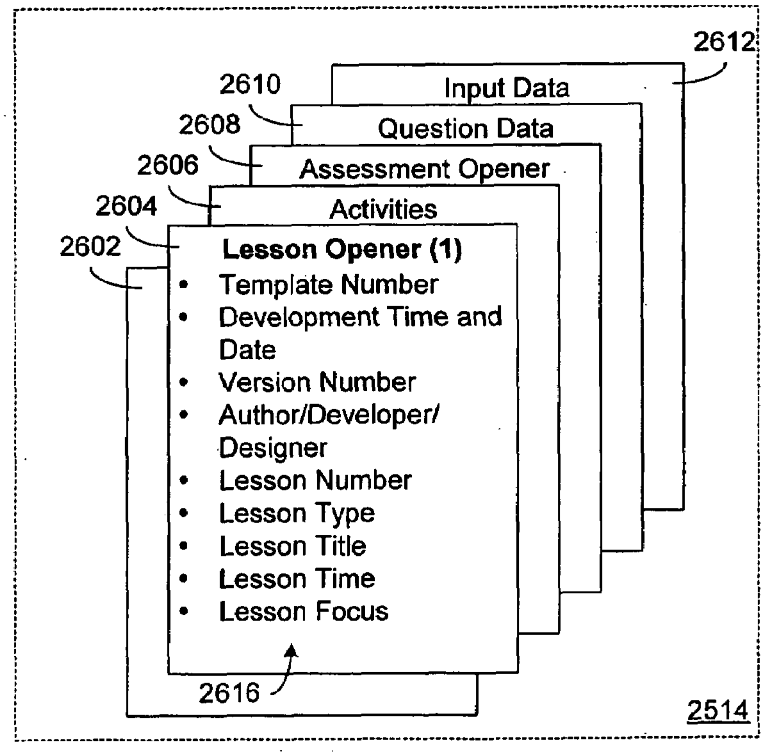
Figure 26C:
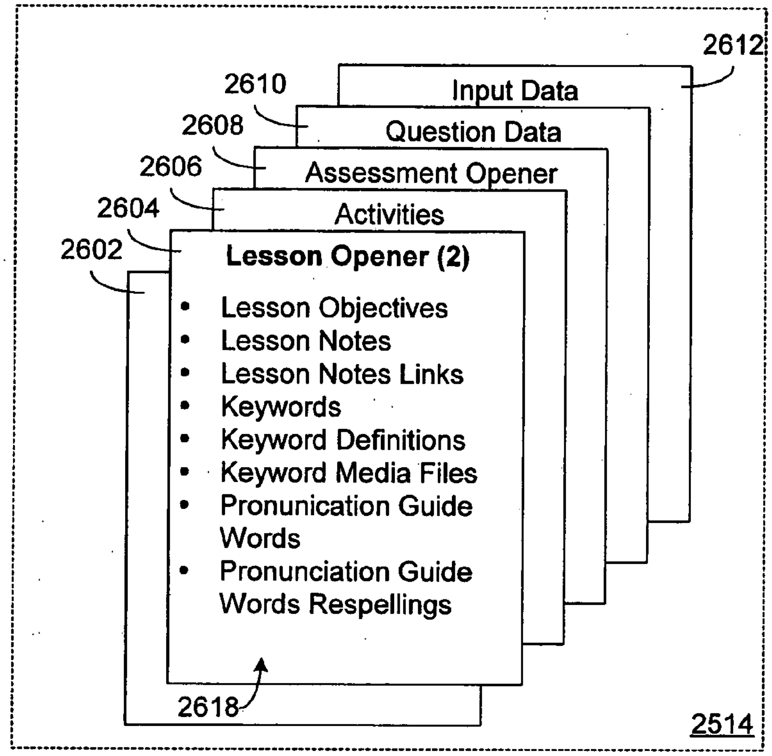
Figure 26D:
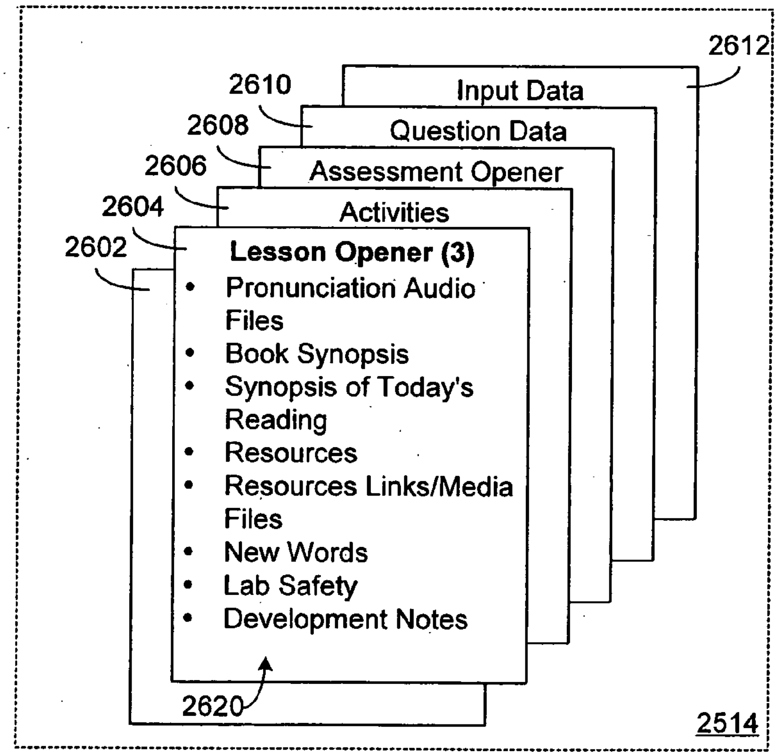
Figure 26E:
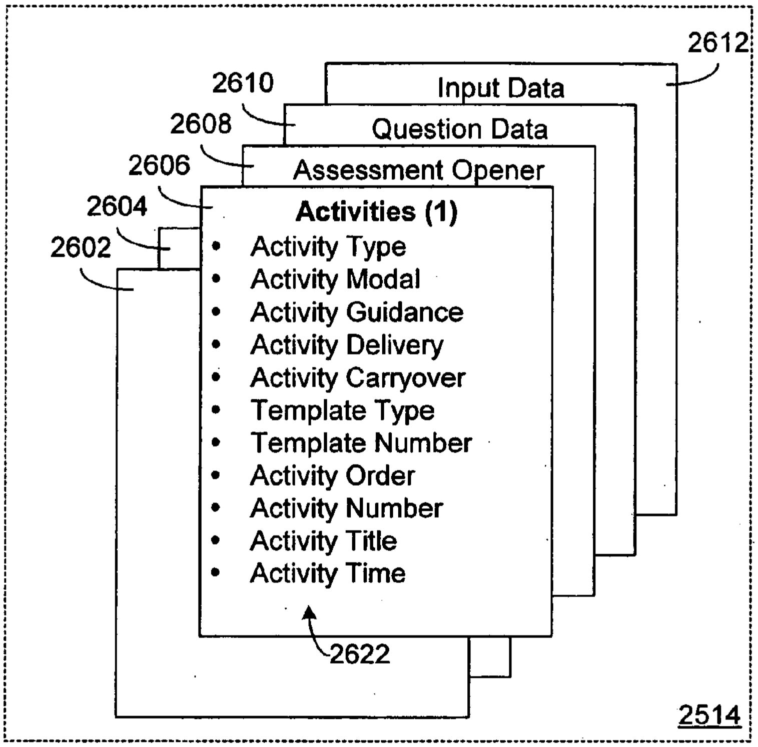
Figure 26F:
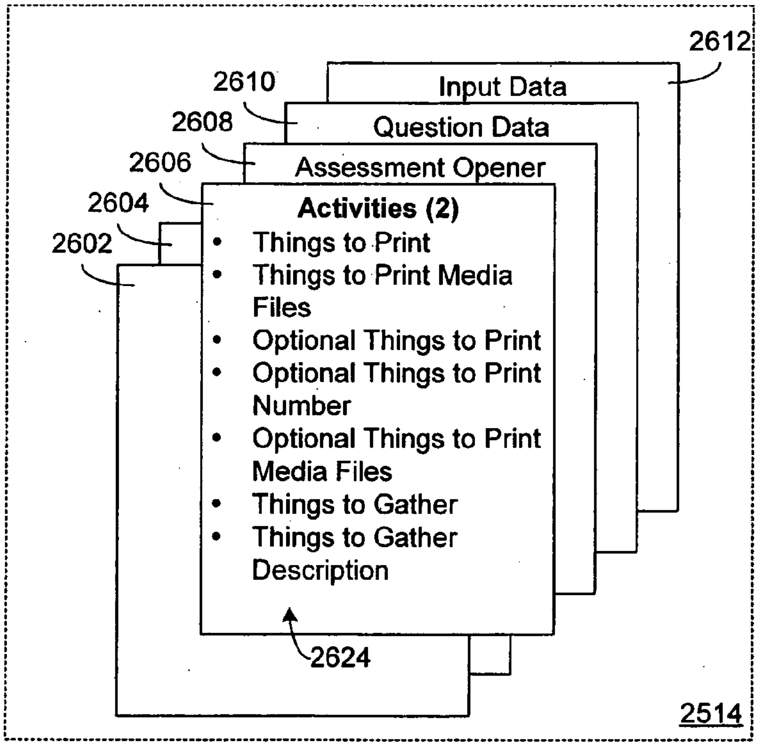
Figure 26G:
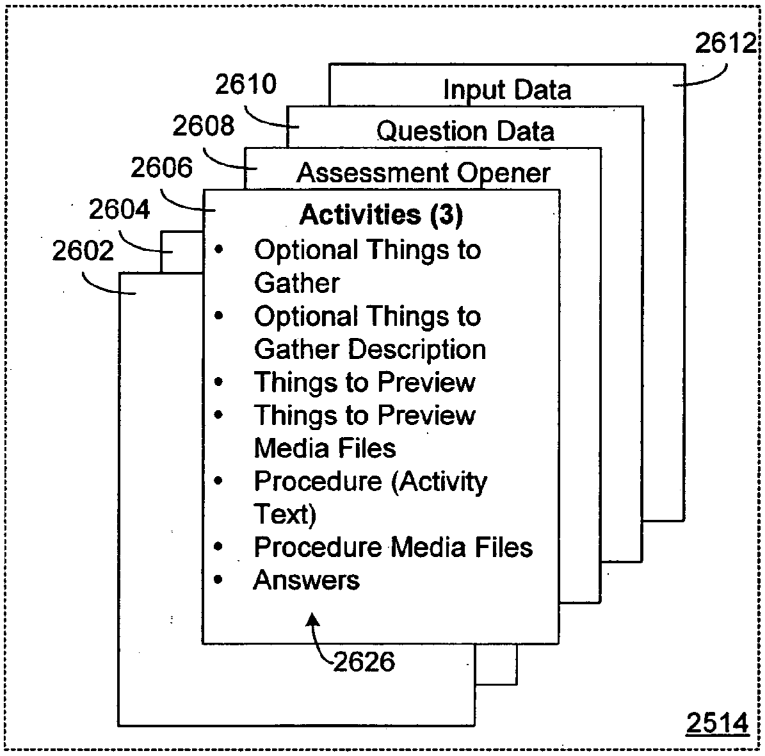
Figure 26H:
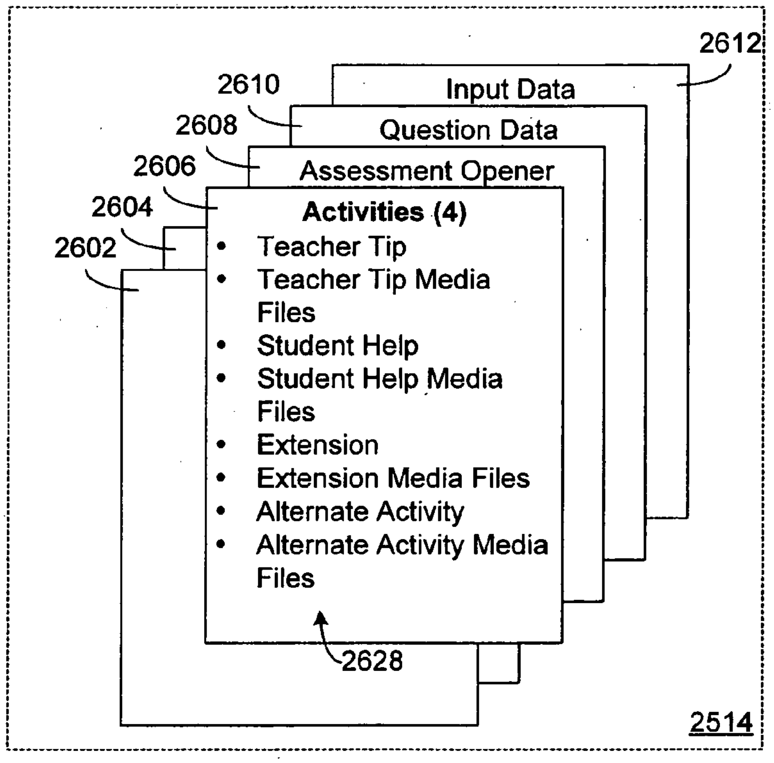
Figure 26I:
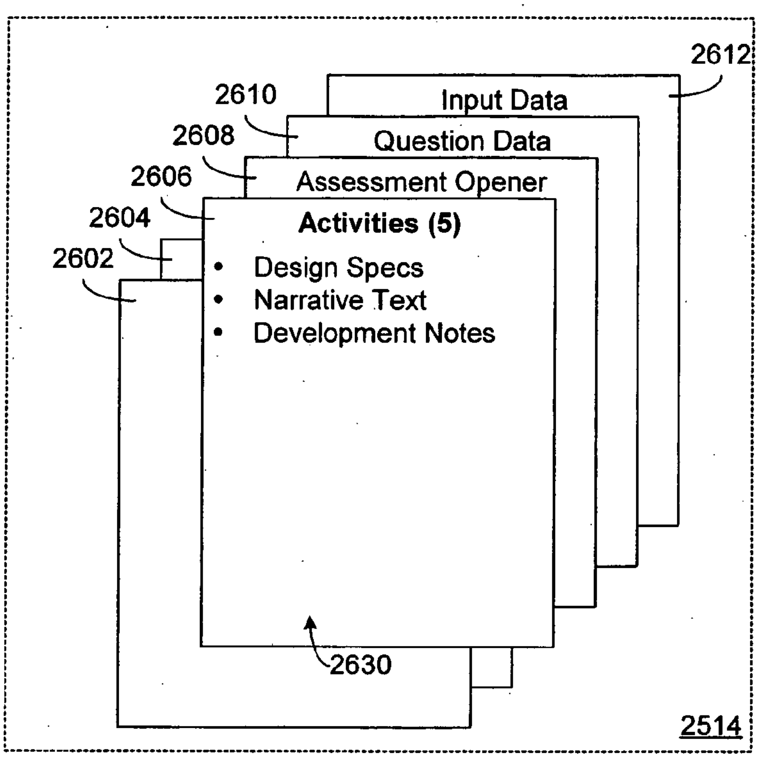
Figure 26J:
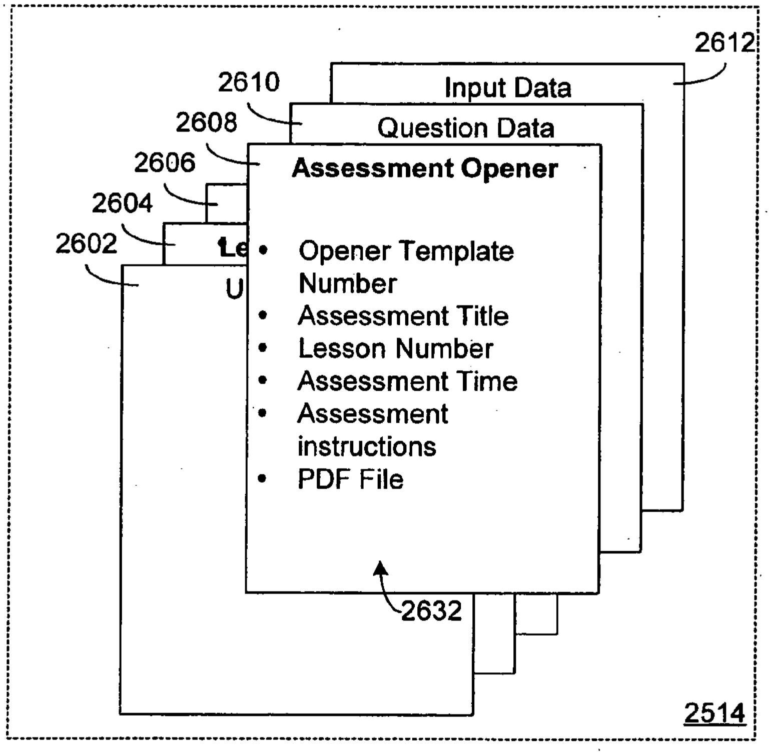
Figure 26K:
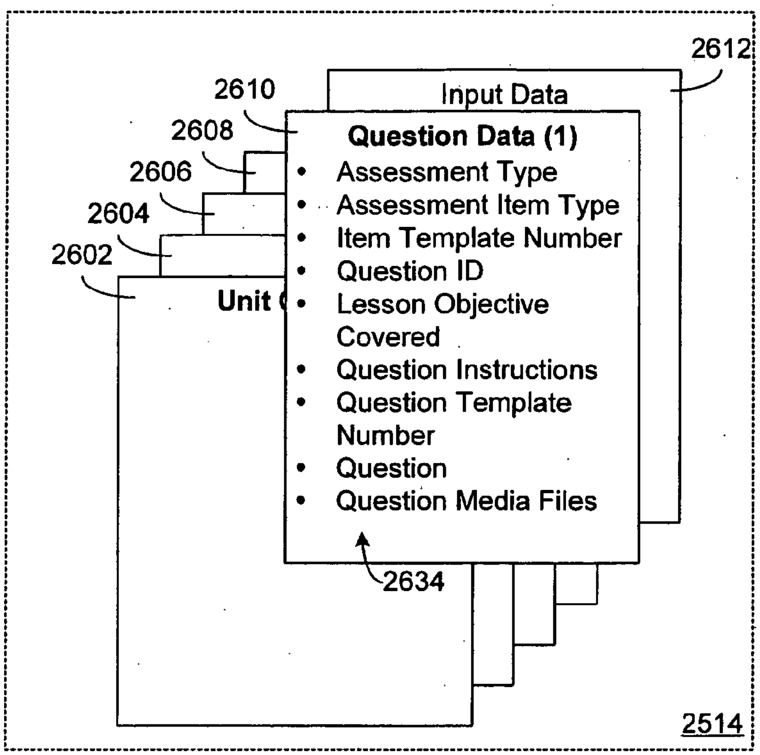
Figure 26L:
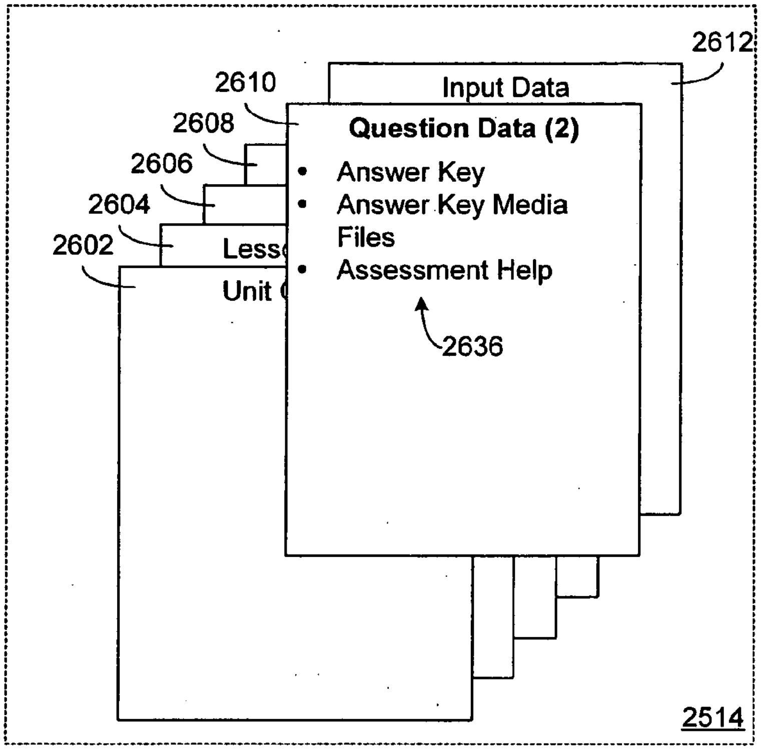
Figure 26M:
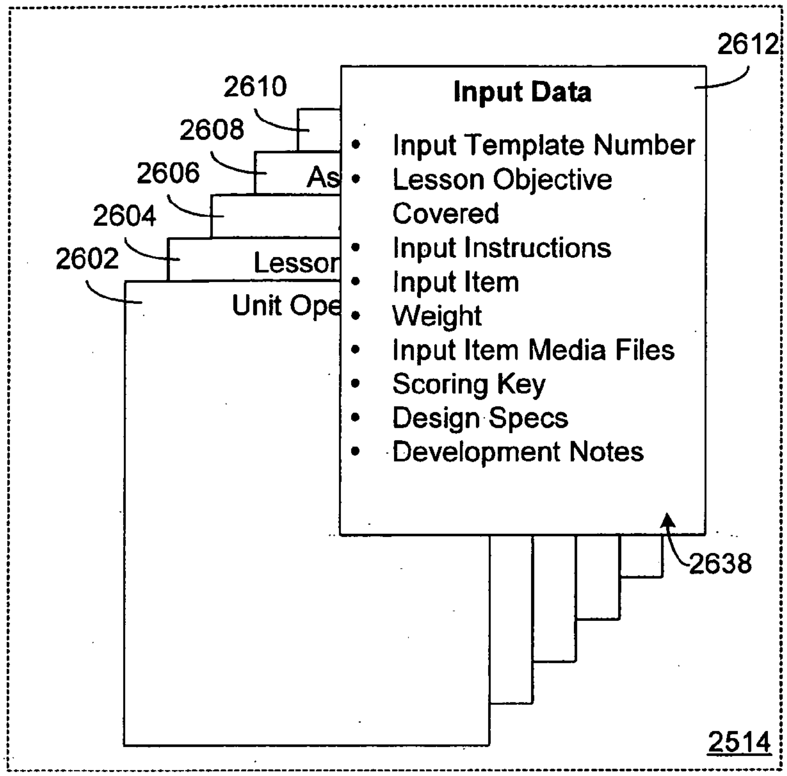

Referring now to FIG. 25, further details regarding the types of data stored in the database 108, particularly those types used in association with the content manager 110, will now be described. Content manager 110 preferably supports at least three types of objects 2508, 2510, and 2512. Content objects 2508 constitute the logical collections of content fields within the system 100. User objects 2510 define a user in the system 100. Role objects 2512 constitute the logical assemblies of possible tasks within the system 100 based on job functions. Additionally, role objects 2512 constitute the central focus of a security model for the system 100. Content objects 2508 and user objects 2510, as a result, will be assigned to a particular role. Role objects 2512 within the organization shall be the most stable object type. In such a manner, by using the role object 2512 as a pivot, changes in content objects 2508 and user objects 2510 can easily be accommodated.

Database 108 also stores corresponding classes 2502, 2504, and 2506. Content classes 2502 generally comprise templates or blueprints for their corresponding content objects 2508. They define the data encapsulated inside the content objects 2508 and how such objects 2508 will behave and communicate with other objects. In a similar manner, user classes 2504 and role classes 2506 generally comprise templates or blueprints for their respective user objects 2510 and role objects 2512. Therefore, each of the objects 2508, 2510, and 2512 is an instance (i.e., a run-time version) of a corresponding class 2502, 2504, and 2506. Objects managed by system 100 must be unique in nature, and the system 100 is adapted to allow for the management of different object groups.

System 100 supports a template library 2514, which will be used by users in order to input information within the system. It includes a method to graphically select templates that will be used by the user. These templates will dictate the output format of the system. Based on the template selected, system 100 will prompt the user for the information necessary to populate the template. Required fields on the temple will be distinguished from optional fields so that the user can easily discern field requirements.

Referring now to FIGS. 26(*a*) through 26(*m*), templates for use in creating the classes 2502, 2504, and 2506, and the objects 2508, 2510, and 2512 according to the present invention will now be described. Template library 2514, as will be seen from FIG. 26(*a*), generally comprises a plurality of templates 2602, 2604, 2606, 2608, 2610, and 2612.

Unit opener template 2602 further comprises a plurality of fields 2614. Such fields include, for example, a template number field, a unit title field, a unit focus field, a unit objectives field, a unit text field, a background information field, a lab safety field, a unit assessment field, a design specs field, and a development notes field. The template number field is a hidden field, which is used to identify text and media layout. The unit title field is created from unit data unless otherwise specified below, and preferably contains a maximum of 60 characters. The unit focus field introduces and relates the new concepts to the overall study of the subject, and includes background information written in paragraph form. It may reference a particular pupil's name (e.g., "Anna."), and preferably comprises a maximum of 360 characters.

The unit objectives field within the unit opener template 2602 is directed to the overall conceptual objectives taught in the lessons contained in a unit. It should include from 1–12 items, and preferably comprises a maximum of 2400 characters in total. Items are preferably separated with hard returns. The objectives described must be measurable, independent learning tasks, should begin with a verb (e.g., Identify . . . Read . . . Demonstrate . . . ), and end without periods. Lesson objectives that are not measurable should not be addressed in the unit objectives field, but instead in the unit focus field as described in greater detail herein below.

The unit text field contains additional information for the caring adult, to be used as needed. Preferably, it comprises a maximum of 400 characters. The background information field should set forth informative text, which provides the caring adult with a background and explanation of the unit concepts. Preferably, 15–20 subtopics will be identified with bullet points. Subtopics may be titled and written in paragraph form. A link from each lesson should be provided to the appropriate subtopics in this list. Preferably, it comprises a maximum of 4500 characters. The lab safety field comprises a paragraph detailing lab safety precautions and procedures. There may be more than one lab safety precaution per unit, each of which is separated by a bullet point. Each safety precaution should be titled and the text written in paragraph form.

The following fields within the unit opener template 2602 may be hidden from the user. For example, the unit assessment field comprises an appropriate compilation of the unit assessment exercises created with each lesson. Each of those exercises is chosen to create an assessment representative of the concepts taught in the unit. The design specs field comprises information directly related to the creation of this item. Notes, as needed, may be used to describe the relationship between texts and accompanying media. All file names of the described media (when complete media files are available) should be listed. Finally, the development notes field comprises information for future revisions/extensions of an item.

Referring now to FIGS. 26(*b*), 26(*c*), and 26(*d*), the fields 2616, 2618, and 2620 contained within the lesson opener template 2604 will now be described. Lesson opener template 2604, on a first page thereof as shown in FIG. 26(*b*), comprises a template number field, a development time and date field, a version number field, an author/developer/designer field, a lesson number field, a lesson type field, a lesson title field, a lesson time field, and a lesson focus field. The template number field, like its counterpart in the unit opener template 2602, is a hidden field, which is used to identify text and media layout. Also hidden is the development time and date field, which includes data identifying the date and time of the last revision. It sets forth the current version of an item, and should begin with the number "01" and increase by 1 each time a lesson is submitted. It, too, is hidden. The author/developer/designer field comprises data sufficient to identify the name of the particular author/developer/designer who created the lesson and the company with which that person is employed. It may be hidden.

The lesson number field also is a hidden field, which is used to identify specific screens for customer service procedures. It designates the number of a lesson in accordance with selected naming conventions. The lesson type field describes a unique lesson path, subject matter, and/or approach to instruction, and is identified in lesson content. The lesson title field is inserted from lesson content (insert "part 1" or "part 2" for two-part lessons), and preferably comprises a maximum of 60 characters. The lesson time field comprises an estimate of the time to complete all activities in a given lesson. That time should equal the time listed in the "time requirements by curricular" area. It should not include time necessary for optional, alternative, or "beyond the lesson" activities. Furthermore, it should be listed as a number with no accompanying text. The lesson focus field comprises a brief description of the central concept(s) of the lesson and the context within the overall course of study. Preferably, it should be written with an active voice. It may reference a particular pupil's name (e.g., "Anna."), and preferably comprises a maximum of 360 characters in paragraph form.

As shown in FIG. 26(*c*), a second page of the lesson opener template 2604 generally comprises a plurality of fields 2618. Such fields 2618 include a lesson objectives field, a lesson notes field, a lesson notes links field, a keywords field, a keyword definitions field, a keyword media files field, a pronunciation guide words field, and a pronunciation guide words respellings field.

The lesson objectives field preferably comprises 1 to 5 measurable, independent learning tasks. The objectives described must be measurable, independent learning tasks, should begin with a verb (e.g., Identify . . . Read . . . Demonstrate . . . ), may end without periods, and preferably comprise a maximum of 1000 characters in total. The lesson notes field generally comprises information regarding advanced preparation and continuing projects. It should include a lesson title and the materials to gather for carry-over activities. Preferably, the lesson notes field comprises a layered field, with a maximum of 500 characters. The lesson notes links, keywords, and keyword definitions fields also preferably comprise layered fields. In the lesson notes links field, URLs listed in lesson notes, with a maximum of 5 items.

The keywords field comprises words that capture the concepts being taught in the lesson (e.g., concept words, people, places), important words that the caring adult will use when explaining the concept of the lesson, words intrinsic to lesson concept and teaching of the lesson, and words that might appear in multiple lessons. Difficult to pronounce words should be repeated in the pronunciation guide words field as noted below. Preferably, words should be lowercase unless the word is a proper noun, a maximum of 10 items and maximum of 50 characters per item should be maintained. The keyword definitions field comprises, for each word, an adult-appropriate definition written at the sixth-grade level along with a pupil-appropriate example. Visual examples should also be provided whenever possible. Preferably, the keyword definitions field comprises a maximum of 265 characters per item.

The keyword media files field comprises media file names of visual examples accompanying keywords. It is preferably a hidden field. Also a layered field is the pronunciation guide words field. It provides a list of difficult-to-pronounce words that will be read aloud (e.g., people, places, concept words). When names are included, both first and last names should be pronounced. Words should be lowercase unless the word is a proper noun. Preferably, a maximum of 10 items will be entered, with a maximum of 50 characters per pronunciation word. Likewise also a layered field in the pronunciation guide words respellings field. It comprises a phonetic respelling (not diacritical) for each pronunciation guide word.

As shown in FIG. 26(*d*), a third page of the lesson opener template 2604 generally comprises a plurality of fields 2620. Such fields 2620 include a pronunciation audio files field, a book synopsis field, a synopsis of today's reading field, a resources field, a resources links/media files field, a new words field, a lab safety field, and a development notes field.

The pronunciation audio files field comprises a hidden field, which describes media file names for the audio clips that accompany pronunciation guide words. It follows the naming conventions outlined herein. The book synopsis field comprises a brief summary of read aloud books and guided reading books, and generally not textbooks or workbooks. It should be included on each lesson where a book is used, and preferably comprises a maximum of 400 characters. The synopsis of today's reading field generally comprises a brief summary of read aloud or guided reading book excerpts used in the lesson. Like the book synopsis field, it applies to read aloud and guided reading books only, not textbooks or workbooks, and preferably comprises a maximum of 400 characters. The resources field is a layered field, which comprises a description of links, books, games, and printable materials supplemental to the lesson objectives. Resources are listed to meet potential needs of the caring adult and pupil (e.g., Anna enjoyed learning about Australia so much that the caring adult wants to extend the time spent on this topic by reading more stories or related sites).

Rounding out this third page of the lesson opener template 2604 are four hidden fields. The resources links/media files field comprises file names of media resources, which generally follow naming conventions outlined herein. The new words field comprises 1–10 unfamiliar words from the reading selection introduced in the get ready portion of the lesson. The lab safety field comprises a paragraph detailing lab safety precautions and procedures relevant to the lesson. Finally, the development notes field comprises information for future revisions/extensions of the lesson.

Referring now to FIGS. 26(*e*), 26(*f*), 26(*g*), 26(*h*), and 26(*i*), the fields 2622, 2624, 2626, 2628, and 2630 contained within the activities template 2606 will now be described. Activities templates 2606 are used for teaching, practice, and challenge sections. On a first page thereof as shown in FIG. 26(*e*), they generally comprise an activity type field, an activity modal field, an activity guidance field, an activity delivery field, an activity carryover field, a template type field, a template number field, an activity order field, an activity number field, an activity time field, and an activity time field.

The activity type field comprises the instructional focus of the activity. The activity modal field generally comprises the modality by which a lesson is taught. Activity modals should be identified as one or more of the following: (a) verbal (i.e., information is conveyed through words that the pupil reads or discusses with the caring adult); (b) visual (i.e., where information is presented visually and organized spatially, typical formats including artworks, illustrations, maps, and pictures); (c) auditory (i.e., information is received aurally, as when the caring adult reads to the pupil); (d) active (i.e., where the pupil experiences the lesson topic through physical movement or physical interaction with the subject matter, such as for example, the use of manipulatives in math); and (e) musical (i.e., the pupil experiences the lesson topic through songs, patterns, rhythms, instruments or musical expression).

The activity guidance field identifies the type of attention needed during an activity by the adult. Generally, activity guidance should be identified as the caring adult only, the caring adult with pupil, or pupil only. The activity delivery field identifies the main delivery method of an activity. Generally, this delivery mode should be identified as computer, hands-on, printout, book, CD, or video. In that case, the video delivery mode preferably should only be used with beyond the lesson activities. The activity carryover field identifies the following types of materials used. For example, a project or material prepared during the activity will be completed or used in a future lesson activity, or the caring adult will continue a project or use a material prepared during a previous lesson activity. It should be checked as needed. Activity carryover preferably can only occur within a unit (i.e., carryover may not span multiple units). It should also be used to note that materials carryover occurring between lessons in the lesson notes field of each applicable lesson.

The template type field identifies sub-activities requiring a unique template. The template number field identifies text and media layout template. It determines appropriate template from master and media templates. Preferably, a master template number should be listed followed by media template number. Media position should be indicated by scanning the master template from left to right and top to bottom, as though reading a book; inserting two characters for each box (using, for example, a "xx" to indicate blank fields); and inserting a media template number in the proper sequence (e.g., 26ee_xxf2). It is preferably a hidden field.

The activity order field should identify the presentation order of the activity within a lesson, and begin with 01 for the first activity in the sequence. For activities occupying multiple screens, subsequent screens should be numbered with an activity order number +a, b, c, etc. (e.g., 01a, 01b, 01c indicates three screens of the first activity presented). A lesson may contain 2 to 3 activity choice options, and the activity order number +_1, _2, _3 should be used to distinguish among the options. Following this convention, activity choices presented as the fourth activity within a lesson would be labeled 04_1, 04_2, and 04_3. These guidelines should be continually followed for activities occupying multiple screens. For example, one multi-screen activity choice activity would be indicated as follows: 04a_1, 04b_1, and so on. The activity order field is preferably a hidden field.

The activity number field follows naming conventions described herein (e.g., 02mth01_02m_02a). It is also a hidden field. The activity title field comprises a 1 to 10 word representing the activity. Preferably, the maximum number of characters per title is 50. The activity time comprises an estimated time to complete activity. It should be listed as a two-digit number with no accompanying text (e.g., 05, 10, 15, etc.). Time should be listed in 5-minute increments.

As shown in FIG. 26(*f*), a second page of the activities template 2606 generally comprises a plurality of fields 2624. Such fields 2624 include a things to print field, a things to print media files field, an optional things to print field, and optional things to print number field, an optional things to print media files field, a things to gather field, and a things to gather description field.

The things to print field describes the materials needed to print to complete the activity. It preferably comprises a maximum of 5 items, with the maximum characters for each item generally comprising 50. The things to print number field provides print quantity of each item listed under things to print. It is a quantity stated as a numeral, and comprises a maximum of 2 characters for each item. The things to print media files field describes the file names of print media. Preferably, it is a hidden field. The optional things to print field describes the materials needed to print to complete optional activity components (i.e., alternate activity, extension, and beyond the lesson). It preferably comprises a maximum of 5 items, with a maximum of 50 characters for each item. The optional things to print number field provides print quantity of each item listed under optional things to print. It is a quantity stated as a numeral, and generally comprises a maximum of 2 characters for each item. The optional things to print media files field describes the file names of print media, follow naming conventions outlined herein, and is preferably a hidden field. The things to gather field describes the materials needed to complete the main activity procedure. Items must match materials list and notation convention. New items must be approved prior to use in a lesson. Preferably, it comprises a maximum of 10–25 items, with most lessons averaging about 5–10 items. The things to gather description field provides a description (e.g., color and number) of each item. Items should be listed in bullet format, lowercase, and not followed by a period. Commas should be used to separate descriptors. Quantities may be stated as a single numeral, a range (e.g. 3–5), or as text (e.g., “a few,” “several,” etc.). Preferably, it comprises a maximum of 25 characters for each item.

As shown in FIG. 26(*g*), a third page of the activities template 2606 generally comprises a plurality of fields 2626. Such fields 2626 include an optional things to gather field, an optional things to gather description field, a things to preview field, a things to preview media files field, a procedure (activity text) field, a procedure media files field, and an answers field. The optional things to gather field describes the materials needed to complete the optional activity components (i.e., alternate activity, extension, and beyond the lesson). New items must be approved prior to use in a lesson. It should comprise a maximum of 10–25 items, with most lessons averaging about 5–10. The optional things to gather description field provides description (e.g., color and number) of each optional things to gather item. Commas should be used to separate descriptors. Quantities may be stated as a single numeral, a range (e.g., 3–5), or as text (e.g., “a few,” “several,” etc.) Preferably, it comprises a maximum of 25 characters for each item.

The things to preview field describes the materials the caring adult should preview for the activity (e.g., books, embedded videos and on-line activities). It should comprise a maximum of 7 items, with a maximum of 50 characters per item. Preferably, it is a hidden field and may be a null field. The things to preview media files field describes the media file names accompanying the things to preview items. It, too, preferably is a hidden field and may be a null field. The procedure (activity text) field provides clear directions addressed to the caring adult. It may be used to refine content wording as needed. Direct questions should be referenced to the pupil (e.g., “Anna”) with bracketed numbers after the question mark (e.g., [1], [2], [3]). For single activities too lengthy to be displayed on a non-scrolling screen or for activities that will be enhanced by multi-screen presentation, logical, instructionally sound, and aesthetically pleasing breaks should be identified in procedure text and associated media. One should also be cognizant of continuity between identified breaks and the layout template selection. Media file names should not be listed in the procedure text. Preferably, a single blank line separates paragraphs.

The procedure media files field describes the media file names accompanying the procedure text. It is preferably a hidden field. Finally, the answers field provides solutions to questions posed within an activity. Questions with multiple answers should have all possible answers or a representative sample provided. Answers should not be provided for rhetorical questions with obvious answers. For questions that require an “opinion-type” response, one may list the answer, “any reasonable answer is acceptable.” Answers to questions located within procedure text are preferably referenced with bracketed numbers (e.g., [1], [2], [3]). An answer should be lowercase and not followed by a period, unless it is a complete sentence. Bracketed numbers linking questions to answers should be consecutive throughout an activity, even when an activity is displayed on multiple screens. Preferably, it should comprise a maximum total of 320 characters, including bracketed numbers. It is a layered field.

As shown in FIG. 26(*h*), a fourth page of the activities template 2606 generally comprises a plurality of fields 2628. Such fields 2628 include a teacher tip field, a teacher tip media files field, a pupil help field, a pupil help media files field, an extension field, an extension media files field, an alternate activity field, and an alternate activity media files field. The teacher tip field generally comprises a comparable approach to teaching the skill or concept. It may include visuals to support teaching. It may also include specific additional guidance that will assist a the caring adult in understanding the teaching of this activity. Preferably, it comprises a maximum of 300 characters, and is a layered field. The teacher tip media files field describes the media file name(s) accompanying the teacher tip. It is preferably a hidden field. The pupil help field comprises specific tasks to help pupil overcome predictable roadblocks in a concept due to learning style, difficult material, etc. These entries should always begin with, for example, “If Anna is having difficulty, . . . ”. Preferably, it comprises a maximum of 300 characters and is a layered field.

The pupil help media files field describes the media file name(s) accompanying the pupil help. It is preferably a hidden field. The extension field comprises a brief note on how to take this activity a step further to reinforce a concept or objective or to provide an opportunity for additional practice. It should be included only when appropriate. Preferably, it comprises a maximum of 300 characters and is a layered field. The extension media files field describes the media file names accompanying the extension. It is preferably a hidden field. The alternate activity field comprises a brief note including instructions for teaching the same concept in a different manner. It may contain multiple steps, but should not occupy multiple screens. Preferably, materials for alternate activities should be listed under “optional things to print/gather.” It should be included when appropriate. Preferably, it comprises a maximum of 500 characters and is a layered field. Finally, the alternate activity media files field describes the media file names accompanying the alternate activity. It is preferably a hidden field.

As shown in FIG. 26(*i*), a fifth page of the activities template 2606 generally comprises a plurality of fields 2630. Such fields 2630 include a design specs field, a narrative text field, and a development notes field. The design specs field comprises information directly related to the creation of this activity. Media type, placement, and function should be identified. Preferably, it is a hidden field. The narrative text field comprises narrative text to be developed as a media file. As with procedure text, answers to questions should appear in the answer field and be referenced in the narrative text and the answer field with bracketed numbers (e.g. [1], [2], [3]). It is preferably a hidden field. Finally, the development notes field comprises additional information for future revisions/ extensions of this item. Any sources used to develop a lesson, outside of the provided content, must be documented in this section. It is preferably a hidden field.

Referring now to FIG. 26(*j*), the fields 2632 contained within the assessment opener template 2608 will now be described. Such fields 2632 include an opener template number field, an assessment title field, a lesson number field, an assessment time, field, an assessment instructions field, and a PDF file field. The opener template number field identifies display layout of assessment opener. Preferably, it is a hidden field. The assessment title field comprises the lesson name plus the word "assessment". The lesson number field describes the number of the lesson, and is preferably a hidden field. The assessment time field comprises the estimated time suggested to complete entire assessment including subsets (if applicable). It applies only to items that the pupil completes, and not observational or input items. It should be listed in 5-minute increments. Also included is the time to complete observational items not listed or counted in lesson time. The assessment instructions field comprises information on how to effectively administer the entire assessment set and all subsets (if present). Finally, the PDF file field comprises the file name for any PDF file used in assessment.

Referring now to FIGS. 26(*k*) and 26(*l*), the fields 2634 and 2636 contained within the question data template 2608 will now be described. Fields 2634 include an assessment type field, an assessment item type field, an item template number field, a question ID field, a lesson objective covered field, a questions instructions field, a question template number field, a question field, and a question media files field. The assessment type field identifies the level of the assessment. Preferably, it should be identified as a lesson assessment, a unit assessment, or a mid-course assessment. It is a hidden field. The assessment item type field indicates the type of assessment item, and should be identified as a direct question (i.e., onscreen delivery), a direct question (i.e., PDF delivery), or an observational item (i.e., onscreen delivery). The item template number field, if the assessment is a direct question, delivered online. It identifies display layout for assessment item. If the assessment is a direct question, it is delivered via PDF, and the field should contain "PDF". If the assessment is an observational item, this field should be null. Preferably, it is a hidden field.

The question ID identifies individual questions within a lesson. Its number should correspond to the assessment question order as presented in the assessment content. If the assessment is an observational item, this field should be null. Preferably, it is a hidden field. The lesson objective covered field describes the specific lesson objective being tested by the direct question. If the assessment is an observational item, this field should be null. The question instructions field provides directions for answering a direct question, and should be inserted as needed. If the assessment is an observational item, this field should be null. The question template number field identifies display layout for question. If the assessment is an observational item, this field should be null. Preferably, it is a hidden field. The question field preferably comprises a single assessment item or task, and should direct questions that never teach or re-teach. If the assessment is an observational item, this field should be null. The question media files field generally comprises the file names of media resources. If the assessment is an observational item, this field should be null. Preferably, it is a hidden field.

As shown in FIG. 26(*l*), the fields 2636 include an answer key field, an answer key media files field, and an assessment help field. The answer key generally comprises a solution to question. Questions with multiple answers should have all possible correct answers or a representative sample provided in this field. If the assessment is an observational item, this field should be null. The answer key media files field generally comprises the file name of media resource. If the assessment is an observational item, this field should be null. Preferably, it is a hidden field. Finally, the assessment help field generally comprises specific additional guidance that will assist the caring adult in effectively delivering a question or administering or scoring the assessment. It may include guidance for use of manipulatives and methods of questioning. Preferably, it should be used when assessment is an observational item, and should not contain feedback information.

Referring now to FIG. 26(*m*), the fields 2638 contained within the input data template 2612 will now be described. Fields 2638 include an input template number field, a lesson objective covered field, an input instructions field, an input item field, a weight field, an input item media files field, a scoring key field, a design specs field, and a development notes field. The input template number identifies display layout of input screen. If the assessment is an observational item, this field should be null. Preferably, it is a hidden field. The lesson objective covered field sets forth the lesson objective covered by input item. The input instructions field generally comprises instructions to the caring adult for completing the input item.

The input item field comprises one or more questions that prompt the caring adult to enter assessment results for system 100 data capture. If a direct question to the pupil is listed in this matrix (i.e., question field), the input item addresses this question. If the question field is null, the input item is an observational assessment. The input template number field will indicate the type of question (e.g., yes/no, score entry, etc.) Preferably, multiple questions should be listed as a bulleted list. It will always be delivered onscreen. Items requiring score entry must be accompanied by a scoring rubric, and entered in the scoring key field. Observational items often may start with, for example, "based on your observation . . . " Preferably, it should include scoring criterion in phrasing of an item when appropriate (e.g., "Did Anna correctly identify 3 types of lines in this painting?").

The weight field comprises the numerical weight associated with each input item. It may be system-generated, and preferably a hidden field. The input item media files field comprises the file names of media resources. It, too, is a hidden field. The scoring key field should comprise an easy-to-use scoring rubric. Preferably, it describes levels of pupil accomplishment along with corresponding numeric values. It should be used only when guidance is required on how to score an accompanying input item. Moreover, it is a null field if the assessment question is just asking a right or wrong answer. The design specs field comprises information directly related to the creation of this item. It may include notes as necessary to describe the relationship between input item text and accompanying media. Preferably, it should list all file names of described media when complete media files are available. It is a hidden field. Finally, the development notes field suitably comprises additional information for future revisions/extensions of this item. Any sources used to develop a lesson, outside of the provided content, must be documented in this section. It, too, is a hidden field.

Workflow

Workflow is the chain of roles that a content object 2508 passes through from introduction in the content manager 110 through final approval. Content objects 2508 are controlled by the workflow for their duration in the content manager 110. Each content object 2508 will have a unique workflow process that is required to move it through the publishing stages. Each workflow, in turn, will have an unlimited number of steps required to complete the workflow. Content manager 110 ensures the data integrity of the content objects 2508 by ensuring that no object reaches the approved state without being reviewed by a minimum of two users. These two users comprise the original user that moved the content object 2508 to the approver and the approver of the content. Roles objects 2512 are be used in the workflow process to control what user roles 2510 have the ability to participate in the various workflow roles. Essentially, each step in the workflow for an object will be assigned to a particular role within the content manager 110. Content manager 110 tracks information as to the location of all content objects 2508 within a particular workflow process.

Moreover, content manager 110 records as part of the data it tracks the user and time that workflow steps are completed for every content object 2508 within the system 100. The content manager 110 alerts users via e-mail when a content object has been promoted to their role within the content manager 110. System 100 provides an interface for the user to easily view which content objects 2508 have been assigned to them via roles and the workflow engine. Approval steps within the workflow rules are, thus, adapted to accommodate the ability to approve multiple content objects 2508 at the same time.

Content manager 110 supports version control for every content object 2508 stored within the system 100. Every time a content object 2508 is modified, the version control number is increased. The system 100 supports a minimum of three version levels. For example, "1.1.1" (where each number separated by a period) represents a particular version level. Upon returning a modified content object 2508 to the system, the user will be permitted to select the version number. The user will be able to decide the extent of the revision. For example, a major change would move from 1.0 to 2.0, while a minor change would move from 1.0 to 1.1. Content manager 110 is able to roll back through a minimum of 10 revisions.

It also locks a content object 2508 that is in use by a user to ensure that multiple users cannot modify the same content object 2508 simultaneously. The system will record such data as necessary to document change tracking information for all content objects 2508. It will also track which user in the system modifies a content object 2508. The system will time stamp all modifications to a content object 2508. For each record (i.e., content object 2508) separate time stamps will be maintained for creation, modification and expiration. Accordingly, every content object 2508 carries a current status in the system. The intent of offering a content object status is to ensure that content that has not been reviewed and approved cannot move from the staging to the production environment.

The five status levels comprise: (a) Incomplete; (b) Complete; (c) Review; (d) Approved; and (e) Published. Incomplete shall mean a content object 2508 that is missing required fields and thus is not capable of being escalated through a workflow. Complete objects are those objects, which have all required fields populated and are capable of being moved to the next step of the workflow. Review is the flag for a content object 2508 that a user has submitted for review and approval for publishing. Approved shall mean a content object 2508 that has been approved for publishing and is awaiting migration to the production server. The Publish flag will mean a content object 2508 that has been migrated from the staging environment to the production environment. A change in the status of a content object 2508, however, does not constitute a change in the version number of the object.

A content object 2508 should contain at least one notes field for the purpose of annotations to the object. This will allow remarks to be saved without changing the core object. These notes are intended to be internal to the content manager 110, and serve to flag potential problems, alert reviewers to specific content nuance and to document other irregularities. Each content object 2508 is comprised of a number of data elements (i.e., fields). Each field within a content object 2508, in turn, is either required or optional. Required fields must be populated in order to promote a content object 2508 through a workflow. Each field will have minimum and maximum values (i.e., boundaries) defined for the field. Boundary checking occurs at the time the object is saved to the database and/or as a function of the input template. Inputs that violate boundary constraints will not be saved to the system. Errors will be reported to the user attempting to save invalid fields. These errors will include the type of error being generated.

Text fields stored within content objects 2508 are preferably stored as XML files. On the other hand, media files associated with a content object 2508 will be stored in the media tables and referenced by the content object 2508. Media files will not be stored within the activity page content objects. The system supports hierarchical data structures necessary to interrelate different content objects to one another. For example, media objects should be linked to a lesson page record with a single media object being available for deployment in a number of lessons.

The system facilitates moving content objects 2508 from the staging environment to the published environment. Published content objects 2508 will be migrated from the content manager server 212$_C$ to the production servers (i.e., application servers 212, 212$_2$, . . . 212$_n$) on a predetermined schedule, and preferably every 24 hours. The system supports on demand migration initiated by an administrator. The intent of this requirement is to be able to override the normal migration cycle in case there is an emergency content update required. Upon execution of a migration routine, only modified content will be migrated to the production servers 212$_1$, 252$_2$, . . . 212$_n$. Furthermore, the on demand migration routine allows the administrator to direct the migration to particular servers. The destination server or server should be capable of being chosen as opposed to the automated scripts which target pre-defined servers. Only administrator level users will have the ability to initiate, schedule or modify migration routines.

Figure 27:
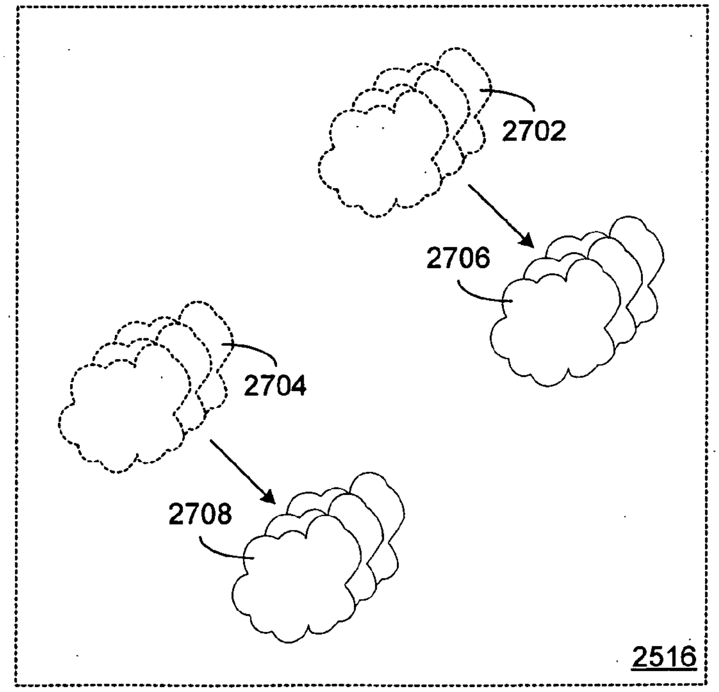
FIG. 27 is a block diagram illustrating exemplary media classes and objects stored in the media library shown in FIG. 25.

As shown in FIG. 27, media library 2516 allows internal users to browse and select media elements for inclusion in the building of content objects. Each media element will be treated as a content object 2508 within the system. Media elements will be placed in two categories, raw media objects 2706 and processed media objects 2708. Raw media objects 2706 are those files, which are acquired, for use in the system. Each raw asset shall be entered into the system one time only. Processed media objects 2708 are derived from raw media objects 2706, and are those assets being prepared for deployment in the system. Raw media objects 2706 elements have a "1 to many" relationship with processed media objects 2708 (ie., 1 raw element=many processed elements). Processed media objects 2708 are linkable to other content objects 2508. The goal of this is to have media elements in a common area and called from lesson activity pages. Accordingly, user interface 106 must include an internal user interface for the purpose of browsing all media elements stored within the system. A library browsing object, as well, must be available to use within the XML templates used for activity page creation. This object will allow for the selection and association of media elements with content objects 2508.

Figure 28:
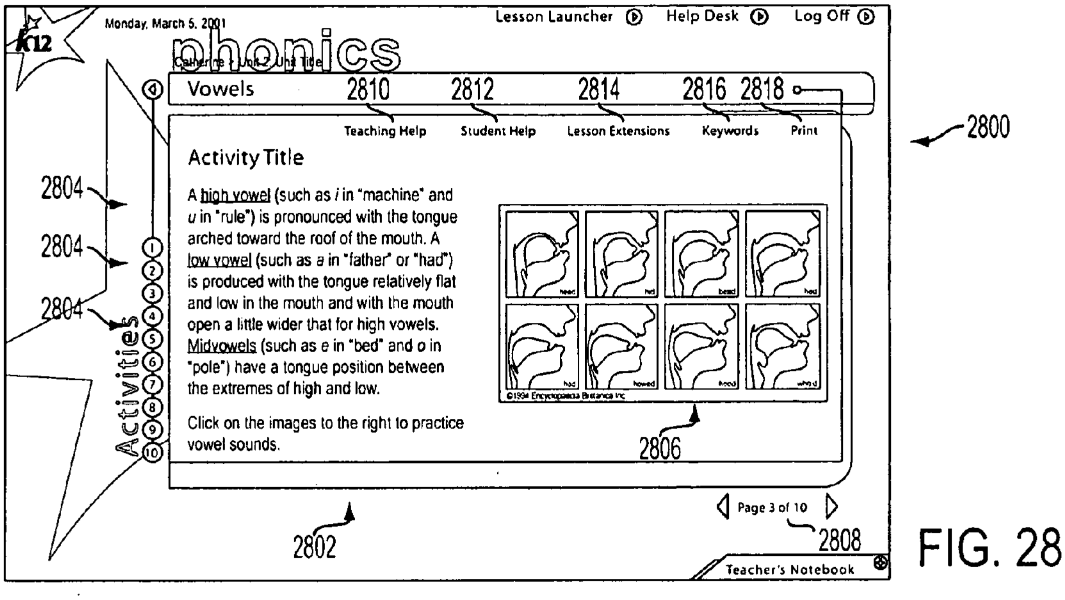
FIG. 28 is a first browser window illustrating use of a lesson according to a presently preferred embodiment of the invention, particularly with respect to the teaching of phonics for use in reading instruction with the virtual school system.

In accordance with a particularly preferable embodiment of the present invention, system 1100 includes means for interactively using phonics to efficiently teach a pupil how to read. FIG. 28, for example, illustrates a first browser window 2800 generally comprising a first field 2802 of instructional content, which includes a plurality of hyperlinks 2804, and a second field of images 2806, which supplement the instructional content. The hyperlinks 2804 permit the caring adult/pupil to navigate to additional, more specific instruction (e.g., regarding a "high vowel", a "low vowel", and a "midvowel"), while the images 2806 further illustrate associated phonemes. Each of the images 2806 preferably comprises a static graphics file (e.g., JPEG, GIF, BMP, etc.), which has associated therewith an audio file (e.g., WAV, MP3, etc.) that replicates the particular sounds associated with each type of vowel. Browser window 2800 also includes means 2808 for advancing or returning to other pages in the lesson.

Figure 29A:
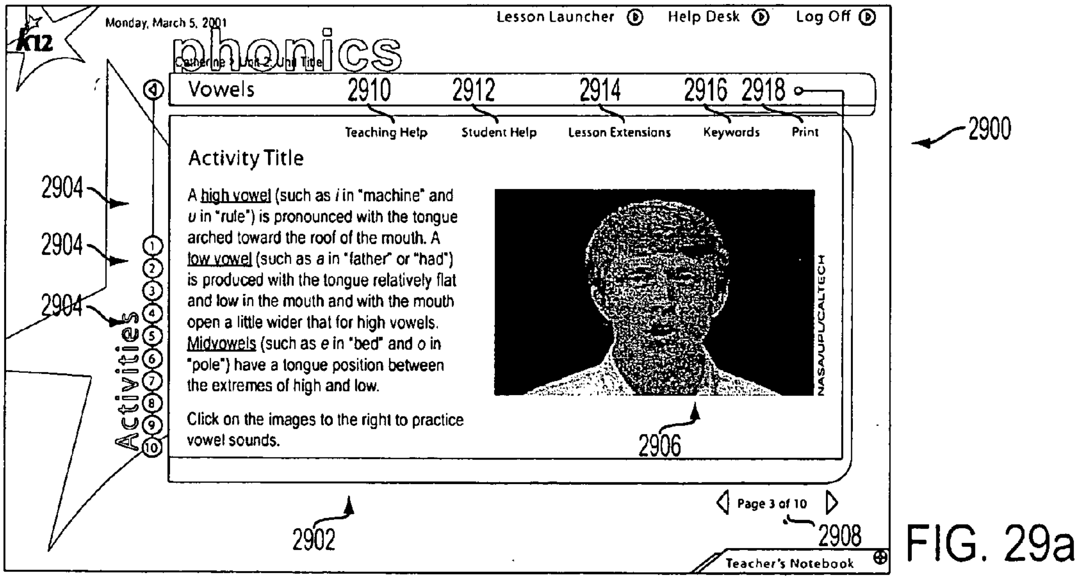
FIGS. 29(*a*) through 29(*c*) illustrate a second browser window with succeeding frames used in the instructional sequencer shown in FIG. 1, particularly with respect to the teaching of phonics for use in reading instruction with the virtual school system.
Figure 29B:
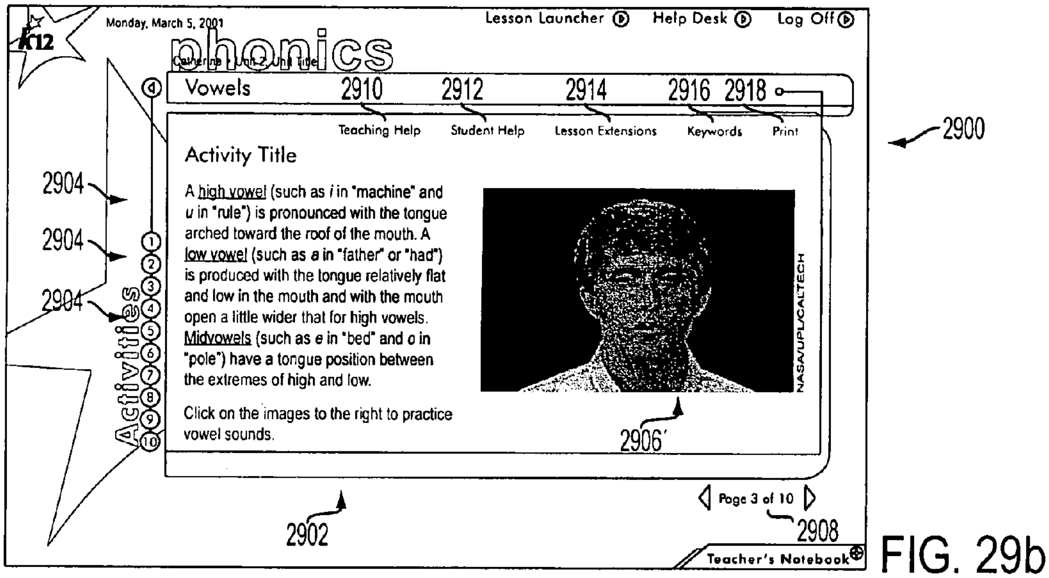
Figure 29C:
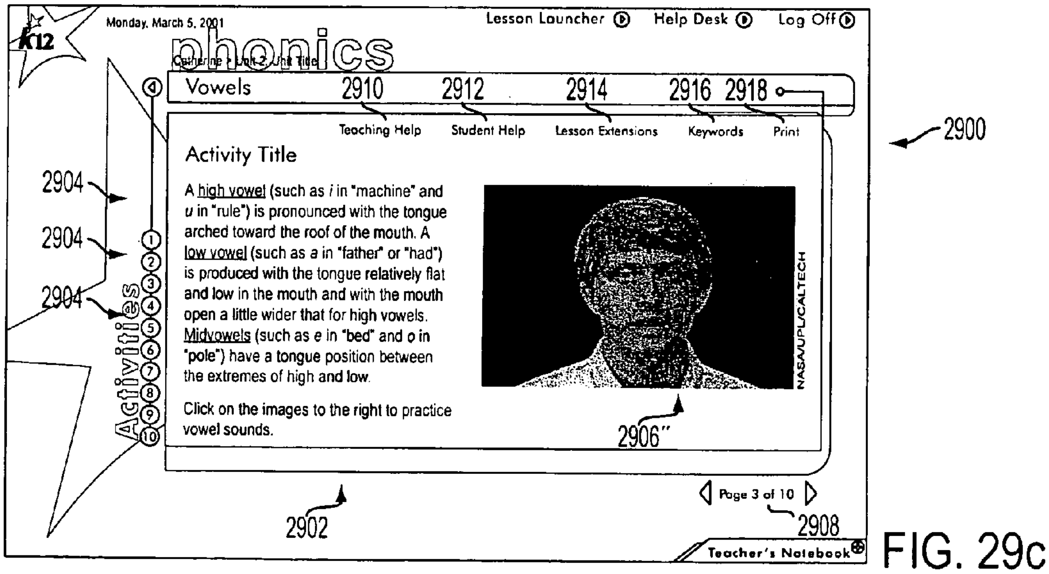

While the images 2806 shown in FIG. 28 are static, the browser window 2900 shown in FIGS. 29(*a*) through 29(*c*) includes a series of images 2906, 2906', and 2906", which are dynamic. That is, images 2906, 2906', and 2906" may suitably comprise any video file (e.g. QIC, RealVideo, Vivo, VDO, AVI, MPEG, etc.) or mixed media file (e.g., SWF, etc.). A plurality of dynamic images 2906, 2906', and 2906". . . $\mathbf{2906}_n$, specifically adapted for use with phonemes, may be produced using "Digital Personnel" technology as described in U.S. Pat. No. 6,097,381, the contents of which are incorporated herein by reference. Digital Personnel is a human-image animation computer system that manipulates stored images of a person's facial movements in response to phonemes. The system is driven by real-time spoken language rather than by manual animation requirements and controls. The result is a photo-realistic, animated rendering of a person speaking.

Because it uses images of actual individuals, the Digital Personnel technology retains the full detail of the face, including subtle shading and shadowing. Because the technology is based on 2-D images versus 3-D modeling, it uses less memory and requires less computing power to develop digital characterizations. In addition, the Digital Personnel technology enables individuals to create their personae with a relatively simple enrollment process that requires just a few minutes. Thus, caring adults/pupils themselves may be the subjects of the Digital Personnel images 2906, 2906', and 2906". . . $\mathbf{2906}_n$ used in the system 100 herein. Advantageously, similar uses of this technology could be made within system 100 by providing interactive Web-based user support for the caring adults/pupils. For on-line help desk applications, a live voice, presented through a digital person on the website would assist the user. The actual support representative or system teacher would then be free to search through support documentation or instructional materials while speaking directly to the user through the visual presence on the web.

Figure 30A:
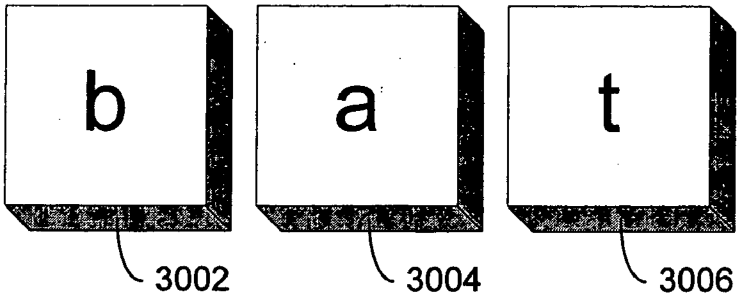
FIGS. 30(*a*) through 30(*c*) illustrate a plurality of tiles for use in conjunction with the browser windows shown in FIGS. 28 and 29(*a*) through 29(*c*), particularly with respect to the teaching of phonics for use in reading instruction with the virtual school system.
Figure 30B:
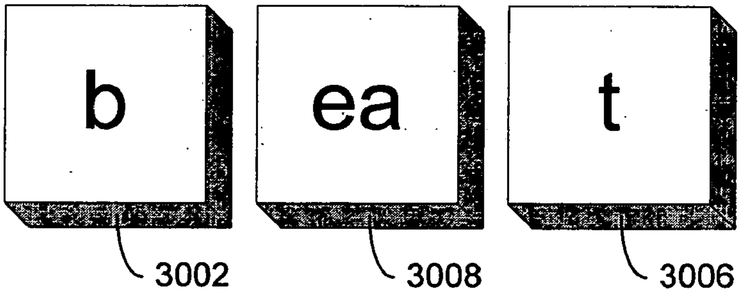
Figure 30C:
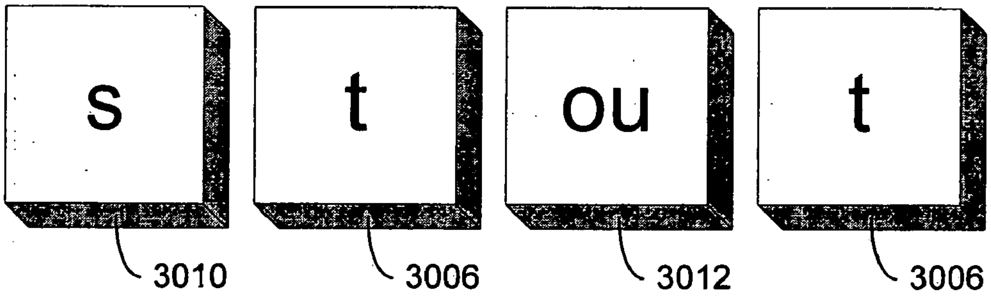

The means for interactively using phonics to efficiently teach a pupil how to read as shown in FIGS. 28 and 29(*a*) through 29(*c*) are further enhanced by use of a plurality of tiles 3002, 3004, 3006, 3008, 3010, 3012, etc. as shown in FIGS. 30(*a*) through 30(*c*). Each of the plurality of tiles 3002, 3004, 3006, 3008, 3010, 3012 is adapted to display a single phone, phoneme, allophone, or morpheme. Preferably As is well known, a "phone" is a speech sound, such as a simple vowel or consonant sound. A "phoneme", by way of contrast, is any of a small set of units, usually about 20 to 60 in number, and different for each language, considered to be the basic units of vocal sound. They are arrived at in a given language by determining which differences in sound indicate a difference in meaning. An "allophone" is a speech sound constituting one of the phonetic variants of a given phoneme such as the different t-sounds of toe, tree, hatpin, catcall, catnip, button, city, etc. Finally, a "morpheme" is any of the minimal grammatical units of a language, each consisting of a word or meaningful part of a word, that cannot be divided into smaller grammatical parts, for instance 'the', 'speak' or the 'en' of 'spoken'.

Phonemes are based on spoken language and may be recorded with special symbols, like those of the International Phonetic Alphabet. In transcription, linguists conventionally place symbols for phonemes between slash marks: /p/. The term phoneme is usually restricted to vowels and consonants, but some linguists extend its application to cover phonologically relevant differences of pitch, stress, and rhythm. Nowadays the phoneme has a less central place in phonological theory than it used to have, especially in American linguistics. Many linguists regard the phoneme as a set of simultaneous distinctive features, rather than as an unanalyzable unit. Accordingly, while it is presently preferable for the plurality of tiles 3002, 3004, 3006, 3008, 3010, 3012 to be adapted to display a single phoneme, they may also suitably comprise a single phone, allophone, or morpheme.

For example, speech is described in terms of syntax (i.e., rules for putting words together to form phrases, clauses, or sentences), lexicon (i.e., meanings of words or of morphemes, the smallest meaningful segments of words [e.g., the prefix un-]), and phonology (i.e., sounds). Phonological rules specify which sounds are used in a language to distinguish one meaning from another; these sounds are called phonemes. For instance, English phonology carries /b/ and /p/ as distinct phonemes, since the substitution of one for the other will change the meaning of some utterances (as in "bin" and "pin"). American English has 13 or more distinct vowel phonemes.

The phonological rules of a language also specify the alternate forms (i.e., allophones) of each phoneme and which allophone will be used in a given context. For instance, in English, the aspirated P and unaspirated P are allophones of the phoneme /p/, since it is the context of adjacent sounds, and not of meaning, that determines which is used; e.g., aspirated P occurs at the beginning of a word ("park"), unaspirated P occurs following S ("spark"). Thus, the lexicon of a language will consist of a list of combinations of phonemes, each combination representing the basic form of a word having a certain meaning. The phonological rules will yield the forms that each phoneme takes as it is combined with other phonemes to make the sentences allowed by the grammar.

Phonemes are in linguistics, the smallest unit of speech distinguishing one word (or word element) from another, as the sound p in "tap," which separates that word from "tab," "tag," and "tan." A phoneme may have more than one variant, or allophone, which functions as a single sound (e.g., the p's of "pat," "spat," and "tap" differ slightly phonetically, but that difference, determined by context, has no significance in English). In some languages, where the variant sounds of p can change meaning, they are classified as separate phonemes (e.g., in Thai the aspirated p [pronounced with an accompanying puff of air] and unaspirated p are distinguished one from the other. It can be readily appreciated, therefore, that the plurality of tiles 3002, 3004, 3006, 3008, 3010, 3012 comprising phones, phonemes, allophones, or morphemes will be an effective tool in teaching a pupil how to read with the interactive system 100.

System 100 and its virtual school application 118 according to the present invention are useful not only for online users, but it can also be used to connect standalone users and networks of users to access and update a virtual school database. Moreover, it may further comprise any biometric device (e.g., iris scan, retina scan, finger scan, hand geometry, voice verification, and dynamic signature verification devices, etc.) which can be used in order to verify the identity of a user of the system 100. Suitable such devices include face recognition devices manufactured and sold by Visionics Corporation, Exchange Place, N.J. U.S.A., fingerprint readers of the SecureTouch®97 type manufactured by Biometric Access Corporation, Round Rock, Tex. U.S.A., and multiple access devices manufactured by Keyware Technologies. Accordingly, various modifications of the methods and systems disclosed herein above are possible without departing from the true spirit and scope of the present invention. It should be understood, therefore, that within the scope of the following claims, the present invention may be practiced otherwise than as has been specifically described in the foregoing embodiments.

What we claim as our invention is:

1. A virtual school, comprising:

a computer network, including server means and a plurality of clients each of which is adapted to be connected to said server means over said network;

means for operating said server means and said plurality of clients, said operating means supporting a run-time environment for a virtual school application on said network;

graphical user interface means adapted to be displayed on said plurality of clients, said graphical user interface means including a plurality of personalized spaces;

a database storing a plurality of files with a plurality of different file formats, the database is adapted to be accessible to said server means over said network;

a plurality of collaborative modules, each of which is adapted to be run over said network, said collaborative modules including:

a content manager;

a curriculum planner, adapted to be used by a user to plan a curriculum comprising a plurality of lessons, said curriculum planner including calendar means accounting for a plurality of vacation days, a plurality of holidays, and a plurality of events occurring throughout the course of said curriculum at a location proximate to said user;

an instructional sequencer; and a progress tracker, adapted to track and display the progress of at least one student through at least one of: the curriculum and a series of lesson units.

2. The virtual school according to claim 1, wherein said server means comprises:

a plurality of web servers;

a plurality of application servers, each of which is connected to said plurality of web servers;

a file server connected between said database and each of said plurality of application servers; and a database server connected between said database and each of said plurality of application servers.

3. The virtual school according to claim 2, further comprising means for clustering said file server and said database server.

4. The virtual school according to claim 2, further comprising a server dedicated for use by said content manager.

5. The virtual school according to claim 1, wherein said plurality of files stored in said database comprises a plurality of classes and a plurality of objects.

6. The virtual school according to claim 5, wherein said plurality of classes comprise classes selected from the group consisting of content classes, user classes, and role classes.

7. The virtual school according to claim 6, wherein said plurality of objects comprise objects selected from the group consisting of content objects, user objects, and role objects.

8. The virtual school according to claim 7, wherein each said content object constitutes a logical collections of content fields within said database.

9. The virtual school according to claim 7, wherein each said user object defines a user of the virtual school.

10. The virtual school according to claim 9, wherein said user is selected from the group consisting of a plurality of pupils, a plurality of caring adults acting in concert with selected ones of said plurality of pupils, a plurality of system teachers, a plurality of content developers, and a plurality of system administrators administering and supporting the virtual school.

11. The virtual school according to claim 7, wherein each said role object constitutes a logical assembly of possible tasks within the virtual school, based on job functions.

12. The virtual school according to claim 7, wherein each said content object and each said user object is assigned to a particular role object.

13. The virtual school according to claim 1, wherein said plurality of files stored in said database further comprises a plurality of files selected from the group consisting of XML files, graphical files, audio files, video files, and mixed media files.

14. The virtual school according to claim 13, wherein said graphical files include JPEG files, GIF files, and BMP files.

15. The virtual school according to claim 13, wherein said audio files include WAV files and MP3 files.

16. The virtual school according to claim 13, wherein said video files include QIC files, Real files, AVI files, and MPEG files.

17. The virtual school according to claim 13, wherein said media files include SWF files.

18. The virtual school according to claim 1, wherein said plurality of files stored in said database comprises a plurality of series of components.

19. The virtual school according to claim 18, wherein each said series of components includes an element defining a unique identification.

20. The virtual school according to claim 19, wherein said series of components further define a plurality of objects.

21. The virtual school according to claim 20, further comprising a state server connected to each of said plurality of application servers, wherein said state server is adapted to maintain a state of an instance of each of said plurality of objects.

22. A method of operating a virtual school, comprising the steps of:

providing a computer network, including server means and a plurality of clients each of which is adapted to be connected to said server means over said network;

loading a means for operating said server means and said plurality of clients, said operating means supporting a run-time environment for a virtual school application on said network;

providing graphical user interface means adapted to be displayed on said plurality of clients;

connecting a database to said computer network;

storing within said database a first plurality of browser windows, each of which is adapted to display to a user on one of said plurality of clients individual parts of a lesson, a first plurality of text files, each of which is adapted to teach a given part of said lesson to said user, and a first plurality of image files, each of which is adapted to supplement said given part of said lesson;

operating the computer system to render said first plurality of browser windows on the display;

providing a first interactive module, which is adapted to be run over said network and be used by said user to plan a curriculum comprising a plurality of lessons, said first interactive module including calendar means accounting for a plurality of vacation days, a plurality of holidays, and a plurality of events occurring throughout the course of said curriculum at a location proximate to said user;

providing a second interactive module, which is adapted to be run over said network and interface with said first interactive module for sequencing said plurality of lessons based on an assessment of said user and said curriculum;

creating an assessment test for assessing a performance of said user at a plurality of selected points in time throughout said curriculum;

administering said assessment test with said first interactive module; and adjusting said curriculum with said second interactive module, based on a combination of factors selected from the group consisting of the results of said assessment test, said plurality of vacation days, said plurality of holidays, and said plurality of events occurring throughout the course of said curriculum at a location proximate to said user.

23. The method according to claim 22, wherein said curriculum further comprises a plurality of subjects and said method further comprises the steps of:

creating an assessment test for assessing a performance of said user within each one of said plurality of subjects;

administering said assessment test with said first interactive module; and adjusting said curriculum with said second interactive module, based on a combination of factors selected from the group consisting of the results of said assessment test, said plurality of vacation days, said plurality of holidays, said plurality of events occurring throughout the course of said curriculum at a location proximate to said user, and a relevance of each said plurality of events as it relates to each one of said plurality of subjects.

* * * * *